(12) United States Patent
Tabata et al.

(10) Patent No.: US 8,036,801 B2
(45) Date of Patent: Oct. 11, 2011

(54) CONTROL DEVICE FOR VEHICLE DRIVE DEVICE

(75) Inventors: Atsushi Tabata, Okazaki (JP); Yuji Inoue, Nisshin (JP); Atsushi Kamada, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 993 days.

(21) Appl. No.: 11/909,104

(22) PCT Filed: Mar. 29, 2006

(86) PCT No.: PCT/JP2006/307176
§ 371 (c)(1),
(2), (4) Date: Sep. 19, 2007

(87) PCT Pub. No.: WO2006/104253
PCT Pub. Date: Oct. 5, 2006

(65) Prior Publication Data
US 2009/0037061 A1    Feb. 5, 2009

(30) Foreign Application Priority Data
Mar. 29, 2005 (JP) .................. 2005-093854

(51) Int. Cl.
*B60W 20/00* (2006.01)
(52) U.S. Cl. ............... 701/55; 475/5; 475/150; 475/84; 701/64; 180/375
(58) Field of Classification Search .............. 701/55, 701/64; 477/3, 15, 35, 37, 5; 318/376, 434; 475/5, 35, 150, 84; 180/338, 375, 347; *B60W 20/00*
See application file for complete search history.

(56) References Cited

U.S. PATENT DOCUMENTS

| | | | | |
|---|---|---|---|---|
| 5,544,053 A * | 8/1996 | Nakashima | ............ | 701/57 |
| 5,580,333 A * | 12/1996 | Marusue et al. | ............ | 477/145 |
| 5,853,347 A * | 12/1998 | Aoki et al. | ............ | 477/45 |
| 5,873,426 A * | 2/1999 | Tabata et al. | ............ | 180/65.7 |
| 6,007,443 A * | 12/1999 | Onimaru et al. | ............ | 475/5 |
| 6,099,424 A * | 8/2000 | Tsai et al. | ............ | 474/12 |
| 6,311,115 B2 * | 10/2001 | Lohrenz | ............ | 701/57 |
| 6,677,685 B2 * | 1/2004 | Pfleger et al. | ............ | 290/40 C |
| 6,691,012 B2 * | 2/2004 | Nishida et al. | ............ | 701/60 |
| 6,705,961 B2 * | 3/2004 | Johnson et al. | ............ | 474/8 |
| 6,961,647 B2 * | 11/2005 | Matsumura et al. | ............ | 701/55 |
| 7,034,481 B2 * | 4/2006 | Imai | ............ | 318/376 |

(Continued)

FOREIGN PATENT DOCUMENTS

JP              9 229181           9/1997

(Continued)

*Primary Examiner* — Tuan C To
(74) *Attorney, Agent, or Firm* — Oblon, Spivak, McClelland, Maier & Neustadt, L.L.P.

(57) ABSTRACT

A control apparatus for a vehicular drive system including a differential mechanism including an electric motor. The drive system includes a switching clutch and switching brake to switch the transmission mechanism between a continuously-variable shifting state and a step-variable shifting state. A shifting control mechanism changes a manner of controlling shifting action of the transmission mechanism during shifting action of an automatic transmission portion, for reducing a shifting shock, depending upon whether a differential portion is placed in the continuously-variable shifting state in which engine speed is variable due to differential function irrespective of rotating speed of power transmitting member, or the non-continuously-variable shifting state in which the engine speed is more difficult to be variable than in the continuously-variable shifting state.

20 Claims, 18 Drawing Sheets

U.S. PATENT DOCUMENTS

| | | | |
|---|---|---|---|
| 7,392,120 B2 * | 6/2008 | Matsumoto et al. | 701/41 |
| 2005/0096822 A1 * | 5/2005 | Aoki | 701/51 |

FOREIGN PATENT DOCUMENTS

| | | | | |
|---|---|---|---|---|
| JP | 9 322312 | | 12/1997 | |
| JP | 11 217025 | | 8/1999 | |
| JP | 2000 2327 | | 1/2000 | |
| JP | 2000 346187 | | 12/2000 | |
| JP | 2001074131 A | * | 3/2001 | |
| JP | 2002130456 A | * | 5/2002 | |
| JP | 2002213604 A | * | 7/2002 | |
| JP | 2003 130203 | | 5/2003 | |
| JP | 2003 301731 | | 10/2003 | |
| JP | 2005023991 A | * | 1/2005 | |
| JP | 2006 64153 | | 3/2006 | |

\* cited by examiner

|  | C0 | C1 | C2 | B0 | B1 | B2 | B3 | SPEED RATIO | STEPPING RATIO |
|---|---|---|---|---|---|---|---|---|---|
| 1st | ◎ | ○ |  |  |  |  | ○ | 3.357 | 1.54 |
| 2nd | ◎ | ○ |  |  |  | ○ |  | 2.180 | 1.53 |
| 3rd | ◎ | ○ |  |  | ○ |  |  | 1.424 | 1.42 |
| 4th | ◎ | ○ | ○ |  |  |  |  | 1.000 | 1.42 |
| 5th |  | ○ | ○ | ◎ |  |  |  | 0.705 | SPREAD 4.76 |
| R |  |  | ○ |  |  |  | ○ | 3.209 |  |
| N |  | ○ |  |  |  |  |  |  |  |

○ ENGAGED
◎ ENGAGED FOR STEP-VARIABLE SHIFTING, AND RELEASED FOR CONTINUOUSLY-VARIABLE SHIFTING

| | C0 | C1 | C2 | B0 | B1 | B2 | SPEED RATIO | STEPPING RATIO |
|---|---|---|---|---|---|---|---|---|
| 1st | ◎ | ○ | | | | ○ | 2.804 | 1.54 |
| 2nd | ◎ | ○ | | | ○ | | 1.531 | 1.53 |
| 3rd | ◎ | ○ | ○ | | | | 1.000 | 1.42 |
| 4th | | ○ | ○ | ◎ | | | 0.705 | SPREAD 3.977 |
| R | | | ○ | | | ○ | 2.393 | |
| N | ○ | | | | | | | |

○ ENGAGED
◎ ENGAGED FOR STEP-VARIABLE SHIFTING, AND RELEASED FOR CONTINUOUSLY-VARIABLE SHIFTING

CONTROL DEVICE FOR VEHICLE DRIVE DEVICE

TECHNICAL FIELD

The present invention relates to a vehicular drive system including a differential mechanism operable to perform a differential function, and an electric motor, and more particularly to techniques for reducing the sizes of the electric motor and other components.

BACKGROUND ART

There is known a vehicular drive system including a differential mechanism operable to distribute an output of an engine to a first electric motor and its output shaft, and a second electric motor disposed between the output shaft of the differential mechanism and vehicle drive wheels. An example of such a vehicular drive system is a drive system for a hybrid vehicle disclosed in Patent Document 1. In this hybrid vehicle drive system, the differential mechanism is constituted by a planetary gear set, and a major portion of a drive force of the engine is mechanically transmitted to the drive wheels by the differential function of the differential mechanism, and the remaining portion of the drive force of the engine is electrically transmitted through an electric path between the first electric motor and the second electric motor, so that the drive system functions as an electrically controlled continuously variable transmission the speed ratio of which is continuously variable and which is controlled by a control apparatus to drive the vehicle while the engine is kept in its optimum operating condition, for thereby improving the fuel economy of the vehicle.

[Patent Document 1] JP-A-2003-301731

Generally, a continuously variable transmission is known as a device which permits improved fuel economy of the vehicle, while on the other hand a gear type transmission such as a step-variable automatic transmission is known as a device having a high degree of power transmitting efficiency. However, there is not available any power transmitting mechanism having the advantages of those two types of transmission. For example, the hybrid vehicle drive system disclosed in the above-identified Patent Document 1 includes the electric path for transmitting an electric energy from the first electric motor to the second electric motor, namely, a power transmitting path for transmitting a portion of the vehicle drive force as an electric energy, so that the first electric motor is required to be large-sized to meet a need for an increased output of the engine, and the second electric motor driven by the electric energy generated by the first electric motor is also required to be accordingly large-sized, whereby the overall size of the hybrid vehicle drive system tends to be large-sized. It is also noted that a portion of the output of the engine is once converted into an electric energy which is subsequently converted into a mechanical energy to be transmitted to the drive wheels, whereby the fuel economy of the vehicle may possibly be deteriorated under some running condition of the vehicle, for instance, during a high-speed running of the vehicle. Where the above-described differential mechanism is a transmission the speed ratio of which is electrically variable, for example, a continuously variable transmission so-called an "electric CVT", the vehicular drive system suffers from a similar problem.

In the hybrid vehicle drive system of the above-identified Patent Document 1, it is well known to provide a transmission in a power transmitting path between the output member of the differential mechanism (electrically controlled continuously variable transmission) and the vehicle drive wheels, for the purpose of reducing the required capacity of the second electric motor when a high vehicle drive torque is required. In this vehicular drive system, the output of the drive power source is transmitted to the drive wheels through the two transmission mechanisms consisting of the electrically controlled continuously variable transmission and the transmission, and the overall speed ratio of the drive system is determined by the speed ratios of the two transmission mechanisms.

When a shifting action of the transmission takes place, the drive system as a whole may not be able to function as a continuously variable transmission, during the shifting action, unlike a drive system including only the electrically controlled continuously variable transmission. Therefore, the drive system may suffer from a shifting shock, and deterioration of the fuel economy due to a failure of the engine to operate in its optimum condition. A vehicular drive system provided with a transmission disposed in the power transmitting path between the differential mechanism and the drive wheels so as to solve the problem of the hybrid vehicle drive system described above also may suffer from the shifting shock and the deterioration of the fuel economy due to the failure of the engine to operate in its optimum condition.

The present invention was made in view of the background art described above. It is therefore an object of this invention to provide a control apparatus for a vehicular drive system including a differential mechanism operable to perform a differential function for distributing an output of an engine to a first electric motor and its output shaft, another electric motor disposed in a power transmitting path between the differential mechanism and a drive wheel of a vehicle, the control apparatus permitting reduction of the required size or an improvement of the fuel economy of the vehicular drive system, and reduction of the shifting shock of the vehicular drive system.

DISCLOSURE OF THE INVENTION

The present invention according to claim 1 provides a control apparatus for (a) a vehicular drive system provided with a transmission mechanism constituted by a continuously-variable transmission portion operable as an electrically controlled continuously variable transmission, and a transmission portion, the continuously-variable transmission portion having a differential mechanism operable to distribute an output of an engine to a first electric motor and a power transmitting member, and a second electric motor disposed in a power transmitting path between the power transmitting member and a drive wheel of a vehicle, the transmission portion constituting a part of the power transmitting path, the control apparatus being characterized by comprising (b) a differential-state switching device provided in the differential mechanism and operable to place the continuously-variable transmission portion in a selected one of a continuously-variable shifting state in which the continuously-variable transmission portion is operable as the electrically controlled continuously variable transmission portion, and a non-continuously-variable shifting state in which the continuously-variable transmission portion is not operable as the electrically controlled continuously variable transmission; and (c) shifting control means for changing a manner of controlling a shifting action of the transmission mechanism during a shifting action of the transmission portion, depending upon whether the continuously-variable transmission portion is placed in the continuously-variable shifting state or not.

According to the control apparatus of the present invention constructed as described above, the continuously-variable transmission portion of the vehicular drive system is selectively switchable by the differential-state switching device, between the continuously-variable shifting state in which the continuously-variable transmission is operable as the electrically controlled continuously variable transmission, and the step-variable shifting state in which the continuously-variable transmission portion is not operable as the electrically controlled continuously variable transmission. Accordingly, the vehicular drive system controlled by the present control device has both an advantage of improved fuel economy of a transmission the speed ratio of which is electrically controllable, and an advantage of a high power transmitting efficiency of a gear type power transmitting device capable of mechanically transmitting power. For instance, the fuel economy of the vehicle is improved when the continuously-variable transmission portion is placed in its continuously-variable shifting state during a low-to-medium speed running or low-to-medium output running of the vehicle with the engine placed in a normal output state. The fuel economy is also improved when the continuously-variable transmission portion is placed in its step-variable shifting state during a high-speed running of the vehicle, since the output of the engine is primarily transmitted through a mechanical power transmitting path to the drive wheel, with reduction of a loss of conversion between mechanical and electric energies, which would take place in the transmission the speed ratio of which is electrically variable. When the continuously-variable transmission portion is placed in the step-variable sifting state during a high-output running of the vehicle, on the other hand, the vehicular drive system operates as the transmission the speed ratio of which is electrically variable, only at the low to medium running speed of the vehicle, so that the maximum electric energy that should be generated by the electric motor can be reduced, thereby making it possible to minimize the required size or capacity of the electric motor, and the required size of the vehicular drive system including the electric motor.

In the above-indicated vehicular drive system provided with the continuously-variable transmission portion switchable between the continuously-variable shifting state and the non-continuously-variable shifting state, the manner of controlling the shifting action of the transmission mechanism during the shifting action of the transmission portion is changed by the shifting control means, depending upon whether the continuously-variable transmission portion is placed in the continuously-variable shifting state or not. Accordingly, the shifting shock of the transmission mechanism can be reduced by controlling the amount of change of the engine speed during the shifting action of the transmission portion depending upon whether the continuously-variable transmission portion is placed in the continuously-variable shifting state in which the engine speed can be changed owing to its operation as the electrically controlled continuously variable transmission irrespective of the rotating speed of the power transmitting member determined by the vehicle speed, or in the non-continuously-variable shifting state in which the engine speed is more difficult to be variable than in the continuously-variable shifting state.

In the invention according to claim 2, the shifting control means controls a shifting action of the continuously-variable transmission portion in an inertia phase of the shifting action of the transmission portion in the continuously-variable shifting state of the continuously-variable transmission portion, so as to reduce an amount of change of a speed of the engine through an operation of the continuously-variable transmission portion as the electrically controlled continuously variable transmission. In this case, the amount of change of the engine speed is reduced in the process of the shifting action of the transmission portion, even when the speed ratio of the transmission portion is changed due to its shifting action, so that the shifting shock is reduced. Further, the transmission mechanism can function as a continuously variable transmission, so that the fuel economy is improved.

In the invention according to claim 3, the shifting control means changes a speed ratio of the continuously-variable transmission portion in a direction opposite to a direction of change of a speed ratio of the transmission portion, so as to reduce the amount of change of the speed of the engine. In this case, an amount of change of an overall speed ratio determined by the speed ratio of the continuously-variable transmission portion and the speed ratio of the transmission portion can be reduced, so that the amount of change of the engine speed is reduced.

In the invention according to claim 4, the shifting control means positively change a speed of the engine during the shifting action of the transmission portion, in the non-continuously-variable shifting state of the continuously-variable transmission portion, by using the first electric motor and/or the second electric motor. In this case, the rate of change of the engine speed can be made closer to a target value than in the case where the engine speed is changed without the control by the shifting control means, even while the continuously-variable transmission portion is placed in the non-continuously-variable shifting state in which the engine speed is more difficult to be variable than in the continuously-variable shifting state. This target value provides a compromise between a high shifting response with a high value of the rate of change that is felt comfortable by the vehicle driver, and a low shifting response with a low value of the rate of change effective to reduce the shifting shock.

In the invention according to claim 5, the shifting control means reduces a racing rise of the speed of the engine due to the shifting action of the transmission portion, in the continuously-variable shifting state of the continuously-variable transmission portion, by using the first electric motor and/or the second electric motor. In this case, the racing rise of the engine speed can be made smaller in the present embodiment, than in the case where the engine speed is changed without the control by the shifting control means, in the process of the shifting action of the transmission portion, even while the continuously-variable transmission portion is placed in the non-continuously-variable shifting state in which the engine speed $N_E$ is more difficult to be variable than in the continuously-variable shifting state. Accordingly, the shifting shock is reduced.

In the invention according to claim 6, the transmission portion is an automatic transmission a speed ratio of which is automatically changed by an engaging action of a frictional coupling device and a releasing action of another frictional coupling device, and the shifting control means controls an engaging pressure of the frictional coupling device in its engaging action during the shifting action of the transmission portion such that the engaging pressure is higher when the continuously-variable transmission portion is placed in the non-continuously-variable shifting state than when the continuously-variable transmission portion is placed in the continuously-variable shifting state. In this case, the frictional coupling device in its engaging action in the process of the shifting action of the transmission portion has an adequate torque capacity even in the non-continuously-variable shifting state of the continuously-variable transmission portion in which an inertia during the shifting action of the transmission portion is larger due to a change of the engine speed than in the continuously-variable shifting state of the continuously-variable transmission portion in which the amount of change of the engine speed due to the shifting action can be reduced.

The invention according to claim 7 provides a control apparatus for (a) a vehicular drive system provided with a transmission mechanism constituted by a differential portion operable as an electrically controlled continuously variable transmission, and a transmission portion, the differential portion having a differential mechanism operable to distribute an output of an engine to a first electric motor and a power transmitting member, and a second electric motor disposed in a power transmitting path between the power transmitting member and a drive wheel of a vehicle, the transmission portion constituting a part of the power transmitting path, the control apparatus being characterized by comprising (b) a differential-state switching device provided in the differential mechanism and operable to place the differential portion in a selected one of a continuously-variable shifting state in which the differential portion is operable as the electrically controlled differential portion, and a non-continuously-variable shifting state in which the differential portion is not operable as the electrically controlled continuously variable transmission; and (c) shifting control means for changing a manner of controlling a shifting action of the transmission mechanism during a shifting action of the transmission portion, depending upon whether the differential portion is placed in the continuously-variable shifting state or not.

According to the control apparatus of the present invention constructed as described above, the differential portion of the vehicular drive system is selectively switchable by the differential-state switching device, between the differential state in which the continuously-variable transmission is operable to perform its differential function, and the non-differential state, for example, a locked state in which the differential is not operable to perform its differential function. Accordingly, the vehicular drive system controlled by the present control device has both an advantage of improved fuel economy of a transmission the speed ratio of which is electrically controllable, and an advantage of a high power transmitting efficiency of a gear type power transmitting device capable of mechanically transmitting power. For instance, the fuel economy of the vehicle is improved when the differential portion is placed in its differential state during a low-to-medium speed running or low-to-medium output running of the vehicle with the engine placed in a normal output state. The fuel economy is also improved when the differential portion is placed in its non-differential state during a high-speed running of the vehicle, since the output of the engine is primarily transmitted through a mechanical power transmitting path to the drive wheel, with reduction of a loss of conversion between mechanical and electric energies, which would take place in the transmission the speed ratio of which is electrically variable. When the differential portion is placed in the non-differential state during a high-output running of the vehicle, on the other hand, the vehicular drive system operates as the transmission the speed ratio of which is electrically variable, only at the low to medium running speed of the vehicle, so that the maximum electric energy that should be generated by the electric motor can be reduced, thereby making it possible to minimize the required size or capacity of the electric motor, and the required size of the vehicular drive system including the electric motor.

In the above-indicated vehicular drive system provided with the differential portion switchable between the differential state and the non-differential state, the manner of controlling the shifting action of the transmission mechanism during the shifting action of the transmission portion is changed by the shifting control means, depending upon whether the differential portion is placed in the differential state or not. Accordingly, the shifting shock of the transmission mechanism can be reduced by controlling the amount of change of the engine speed during the shifting action of the transmission portion depending upon whether the differential portion is placed in the differential state in which the engine speed can be changed owing to its operation as the electrically controlled continuously variable transmission irrespective of the rotating speed of the power transmitting member determined by the vehicle speed, or in the non-differential in which the engine speed is more difficult to be variable than in the continuously-variable shifting state.

In the invention according to claim 8, the shifting control means controls a shifting action of the differential portion in an inertia phase of the shifting action of the transmission portion in the continuously-variable shifting state of the differential portion, so as to reduce an amount of change of a speed of the engine through an operation of the differential portion as the electrically controlled continuously variable transmission. In this case, the amount of change of the engine speed is reduced in the process of the shifting action of the transmission portion, even when the speed ratio of the transmission portion is changed due to its shifting action, so that the shifting shock is reduced. Further, the transmission mechanism can function as a continuously variable transmission, so that the fuel economy is improved.

In the invention according to claim 9, the shifting control means changes a speed ratio of the differential portion in a direction opposite to a direction of change of a speed ratio of the transmission portion, so as to reduce the amount of change of the speed of the engine. In this case, an amount of change of an overall speed ratio determined by the speed ratio of the differential portion and the speed ratio of the transmission portion can be reduced, so that the amount of change of the engine speed is reduced.

In the invention according to claim 10, the shifting control means positively change a speed of the engine during the shifting action of the transmission portion, in the non-continuously-variable shifting state of the differential portion, by using the first electric motor and/or the second electric motor. In this case, the rate of change of the engine speed can be made closer to a target value than in the case where the engine speed is changed without the control by the shifting control means, even while the differential portion is placed in the non-continuously-variable shifting state in which the engine speed is more difficult to be variable than in the continuously-variable shifting state. This target value provides a compromise between a high shifting response with a high value of the rate of change that is felt comfortable by the vehicle driver, and a low shifting response with a low value of the rate of change effective to reduce the shifting shock.

In the invention according to claim 11, the shifting control means reduces a racing rise of the speed of the engine due to the shifting action of the transmission portion, in the continuously-variable shifting state of the differential portion, by using the first electric motor and/or the second electric motor. In this case, the racing rise of the engine speed can be made smaller in the present embodiment, than in the case where the engine speed is changed without the control by the shifting control means, in the process of the shifting action of the transmission portion, even while the differential portion is placed in the non-continuously-variable shifting state in which the engine speed $N_E$ is more difficult to be variable than in the continuously-variable shifting state. Accordingly, the shifting shock is reduced.

In the invention according to claim 12, the transmission portion is an automatic transmission a speed ratio of which is automatically changed by an engaging action of a frictional coupling device and a releasing action of another frictional coupling device, and the shifting control means controls an engaging pressure of the frictional coupling device in its engaging action during the shifting action of the transmission portion such that the engaging pressure is higher when the differential portion is placed in the non-continuously-variable shifting state than when the differential portion is placed in the continuously-variable shifting state. In this case, the frictional coupling device in its engaging action in the process of the shifting action of the transmission portion has an adequate torque capacity even in the non-continuously-variable shifting state of the differential portion in which an inertia during the shifting action of the transmission portion is larger due to a change of the engine speed than in the continuously-variable shifting state of the differential portion in which the amount of change of the engine speed due to the shifting action can be reduced.

In the invention according to claim 13, the control apparatus further comprises torque-reduction control means for reducing a torque to be transmitted to the drive wheel, and wherein the torque-reduction control means reduces the torque to be transmitted to the drive wheels during the shifting action of the transmission portion. In this case, the torque to be transmitted to the drive wheel is reduced by the torque-reduction control means during the shifting action of the transmission portion, so as to offset an inertia torque generated as a result of a change of the rotating speed of a rotary element of the transmission portion or a change of the rotating speed of a rotary element of the continuously-variable transmission portion, whereby the shifting shock is reduced. For instance, the torque-reduction control means is arranged to implement a torque reduction control to reduce the torque to be transmitted to the drive wheel, by reducing the engine torque or by controlling the second electric motor.

In the invention according to claim 14, the transmission portion is a step-variable automatic transmission. In this case, an overall speed ratio determined by a speed ratio of the continuously-variable transmission portion and a speed ratio of the transmission portion is changed in steps as a result of the shifting action of the transmission portion, so that the overall speed ratio is more rapidly changed in a stepping fashion, than when the overall speed ratio is changed continuously. Thus, the transmission mechanism is not only able to function as a continuously variable transmission which permits a smooth change of the vehicle drive torque, but also permits a stepping change of the speed ratio and a rapid change of the vehicle drive torque.

Preferably, the differential-state switching device places the continuously-variable transmission portion in the differential state in which the continuously-variable transmission portion is operable to perform its differential function, to place the continuously-variable transmission portion in the continuously-variable shifting state in which the continuously-variable transmission portion is operable as the electrically controlled continuously variable transmission, and places the continuously-variable transmission portion in the non-differential state (e.g., locked state) in which the continuously-variable transmission portion is not operable to perform its differential function, to place the continuously-variable transmission portion in the step-variable shifting state in which the continuously-variable transmission portion is not operable as the electrically controlled continuously variable transmission. In this case, the continuously-variable transmission portion is switchable between the continuously-variable shifting state and the step-variable shifting state.

Preferably, the differential-state switching device places the differential portion in the differential state in which the differential portion is operable to perform its differential function, to place the differential portion in the continuously-variable shifting state in which the differential portion is operable as the electrically controlled continuously variable transmission, and places the differential portion in the non-differential state (e.g., locked state) in which the differential portion is not operable to perform its differential function, to place the differential portion in the step-variable shifting state in which the differential portion is not operable as the electrically controlled continuously variable transmission. In this case, the differential portion is switchable between the continuously-variable shifting state and the step-variable shifting state.

Preferably, the differential mechanism has a first element connected to the engine, a second element connected to the first electric motor and a third element connected to the power transmitting member, and the differential-state switching device is operable to place the differential mechanism in the differential state in which the first, second and third elements of the differential mechanism are rotatable relative to each other, and to place the differential mechanism in the non-differential state (e.g., locked state) in which the first, second and third elements are rotated as a unit or the second element is held stationary. In this case, the differential mechanism is switchable between the differential state and the non-differential state.

Preferably, the differential-state switching device includes a clutch operable to connect at least two of the first, second and third elements of the differential mechanism to each other for rotating the first, second and third elements as a unit, and/or a brake operable to fix the second element to a stationary member for holding the second element stationary. This arrangement permits the differential mechanism to be easily switched between the differential and non-differential states.

Preferably, the clutch and brake are released to place the differential mechanism in the differential state in which the first, second and third elements are rotatable relative to each other, and in which the differential mechanism is operable as an electrically controlled differential device, and the clutch is engaged to permit the differential mechanism to be operable as a transmission having a speed ratio of 1, or the brake is engaged to permit the differential mechanism to be operable as a speed-increasing transmission having a speed ratio lower than 1. In this arrangement, the differential mechanism is switchable between the differential state and the locked state, and is operable as a transmission having a single gear position with a single fixed speed ratio or a plurality of gear positions having respective fixed speed ratios.

Preferably the differential mechanism is a planetary gear set, and the first element is a carrier of the planetary gear set, and the second element is a sun gear of the planetary gear set, while the third element is a ring gear of the planetary gear set. In this arrangement, the axial dimension of the differential mechanism can be reduced, and is simply constituted by one planetary gear device.

Preferably, the planetary gear set is of a single-pinion type. In this case, the axial dimension of the differential mechanism can be reduced, and the differential mechanism is simply constituted by one planetary gear set of a single-pinion type.

Preferably, the overall speed ratio of the vehicular drive system is defined by the speed ratio of the continuously-variable transmission portion and the speed ratio of the transmission portion. In this case, the vehicle drive force can be obtained over a relatively wide range of the overall speed ratio, by utilizing the speed ratio of the transmission portion, so that the efficiency of the continuously-variable shifting control of the continuously-variable transmission portion is further improved.

Preferably, then overall speed ratio of the vehicular drive system is defined by the speed ratio of the differential portion and the speed ratio of the transmission portion. In this case, the vehicle drive force can be obtained over a relatively wide range of the overall speed ratio, by utilizing the speed ratio of the transmission portion.

The continuously-variable transmission portion placed in its continuously-variable shifting state and the transmission portion cooperate to constitute a continuously variable transmission, while the continuously-variable transmission portion placed in the non-continuously-variable shifting state cooperates the transmission portion to constitute a step variable transmission.

EXPLANATION OF REFERENCE SIGNS

8: Engine
10, 70: Transmission mechanism (Drive system)
11: Differential portion (Continuously-variable transmission portion)
16: Power distributing mechanism (Differential mechanism)
18: Power transmitting member
20, 72: Automatic transmission portion (Transmission portion)

38: Drive wheels
40: Electronic control device (Control device)
82: Shifting control means
86: Torque-reduction control means
M1: First electric motor
M2: Second electric motor
C0: Switching clutch (Differential-state switching device)
B0: Switching brake (Differential-state switching device)

BEST MODE FOR CARRYING OUT THE INVENTION

The embodiments of this invention will be described in detail by reference to the drawings.

Embodiment 1

Figures 1, 2:
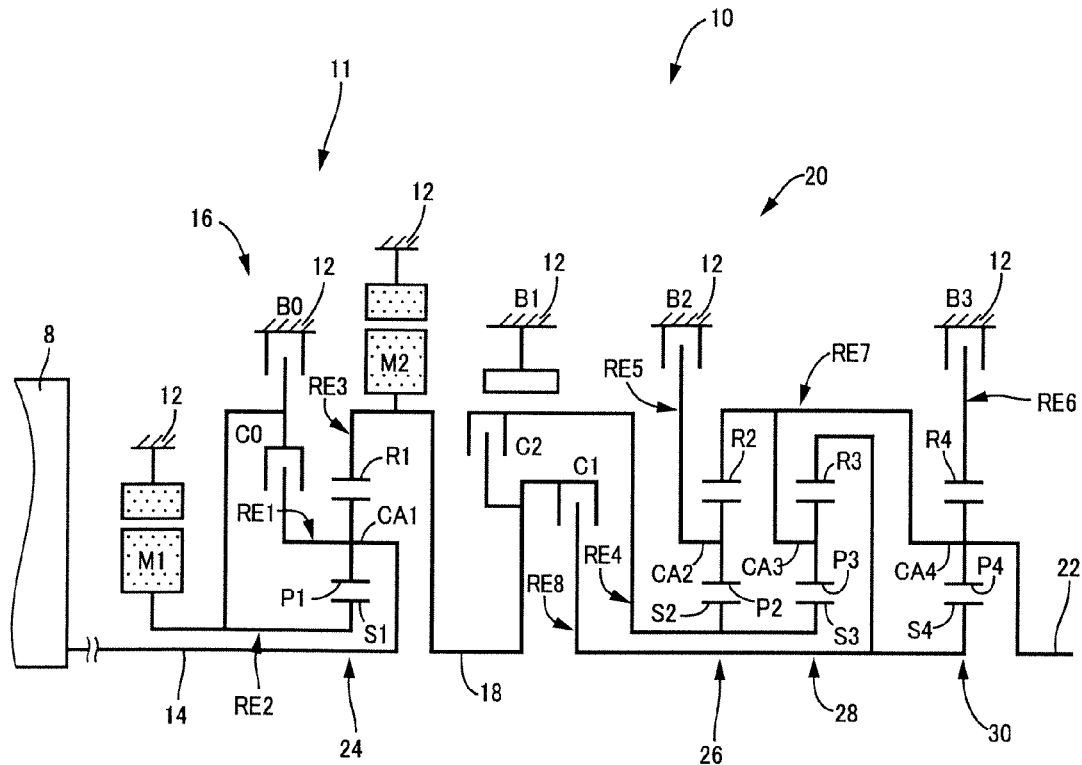
FIG. 1 is a schematic view showing an arrangement of a drive system of a hybrid vehicle, which is constructed according to one embodiment of the present invention.
FIG. 2 is a table indicating shifting actions of the hybrid vehicle drive system of FIG. 1, which is operable in a selected one of a continuously-variable shifting state and a step-variable shifting state, in relation to different combinations of operating states of hydraulically operated frictional coupling devices to effect the respective shifting actions.
Figure 5:
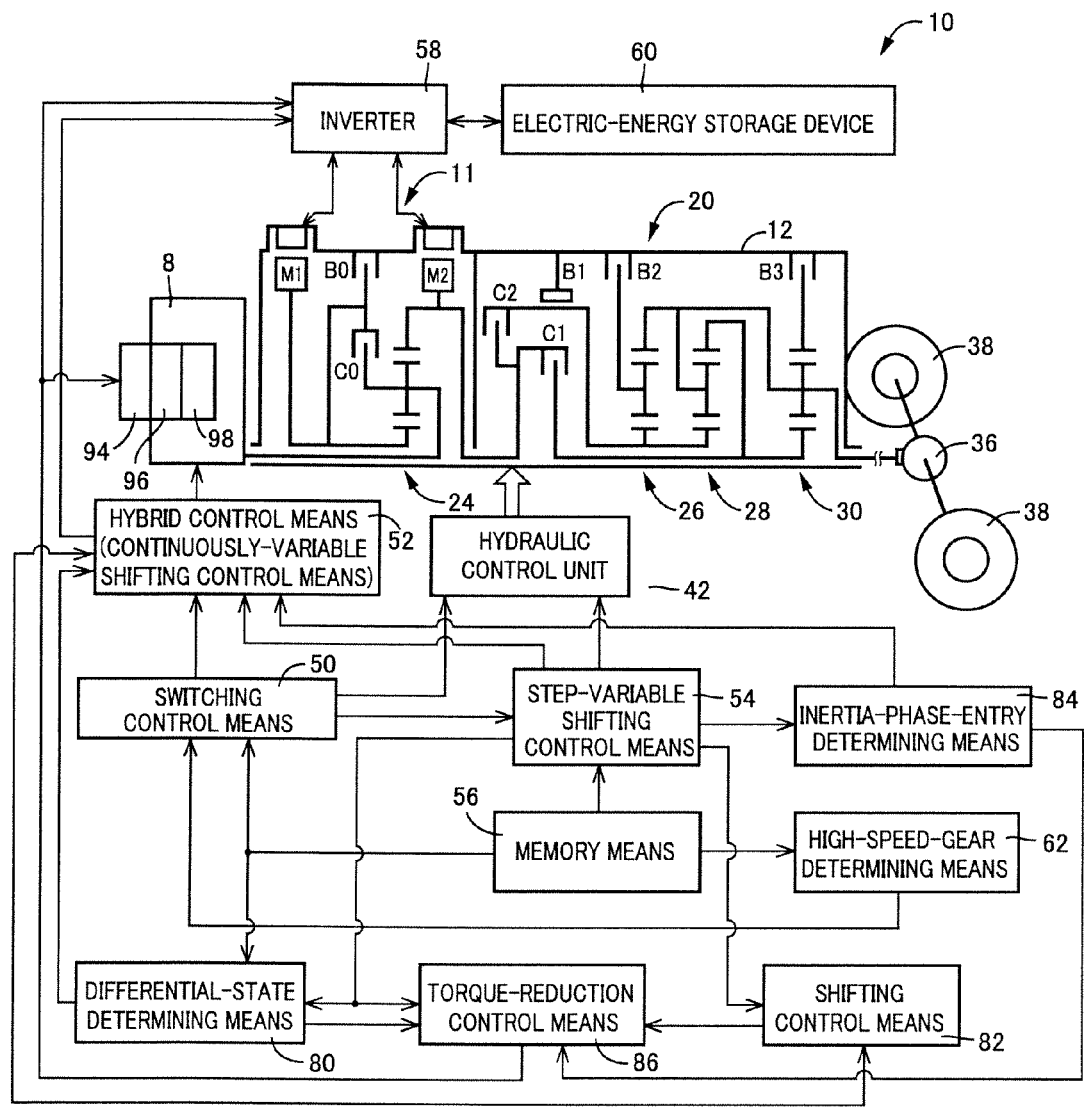
FIG. 5 is a functional block diagram illustrating major control functions of the electronic control device of FIG. 4.

Referring to the schematic view of FIG. 1, there is shown a transmission mechanism 10 constituting a part of a drive system for a hybrid vehicle, which drive system is controlled by a control apparatus according to one embodiment of this invention. In FIG. 1, the transmission mechanism 10 includes: an input rotary member in the form of an input shaft 14; a continuously-variable transmission portion in the form of a differential portion 11 connected to the input shaft 14 either directly, or indirectly via a pulsation absorbing damper (vibration damping device) not shown; a step-variable or multiple-step transmission portion in the form of an automatic transmission portion 20 disposed between the differential portion 11 and drive wheels 38 of the vehicle, and connected in series via a power transmitting member 18 (power transmitting shaft) to the differential portion 11 and the drive wheels 38; and an output rotary member in the form of an output shaft 22 connected to the automatic transmission portion 20. The input shaft 14, differential portion 11, automatic transmission portion 20 and output shaft 22 are coaxially disposed on a common axis in a transmission casing 12 (hereinafter referred to as casing 12) functioning as a stationary member attached to a body of the vehicle, and are connected in series with each other. This transmission mechanism 10 is suitably used for a transverse FR vehicle (front-engine, rear-drive vehicle), and is disposed between a drive power source in the form of an internal combustion engine 8 and the pair of drive wheels 38, to transmit a vehicle drive force from the engine 8 to the pair of drive wheels 38 through a differential gear device 36 (final speed reduction gear) and a pair of drive axles (as shown in FIG. 5). The engine 8 may be a gasoline engine or diesel engine and functions as a vehicle drive power source connected directly to the input shaft 14 or directly connected to the input shaft 14 via the pulsation absorbing damper.

Thus, the engine 8 and the differential portion 11 are directly connected to each other in the present transmission mechanism 10, without a fluid-operated power transmitting device such as a torque converter or a fluid coupling being disposed therebetween, except for the above-indicated pulsation absorbing damper. It is noted that a lower half of the transmission mechanism 10, which is constructed symmetrically with respect to its axis, is omitted in FIG. 1. This is also true to the other embodiments of the invention described below.

The differential portion 11 is provided with: a first electric motor M1; a power distributing mechanism 16 functioning as a differential mechanism operable to mechanically distribute an output of the engine 8 received by the input shaft 14, to the first electric motor M1 and the power transmitting member 18; and a second electric motor M2 which is rotated with the output shaft 22. The second electric motor M2 may be disposed at any portion of the power transmitting path between the power transmitting member 18 and the drive wheels 38. Each of the first and second electric motors M1 and M2 used in the present embodiment is a so-called motor/generator having a function of an electric motor and a function of an electric generator. However, the first electric motor M1 should function at least as an electric generator operable to generate an electric energy and a reaction force, while the second electric motor M2 should function at least as a drive power source operable to produce a vehicle drive force.

The power distributing mechanism 16 includes, as major components, a first planetary gear set 24 of a single pinion type having a gear ratio ρ1 of about 0.418, for example, a switching clutch C0 and a switching brake B1. The first planetary gear set 24 has rotary elements consisting of a first sun gear S1, a first planetary gear P1; a first carrier CA1 supporting the first planetary gear P1 such that the first planetary gear P1 is rotatable about its axis and about the axis of the first sun gear S1; and a first ring gear R1 meshing with the first sun gear S1 through the first planetary gear P1. Where the numbers of teeth of the first sun gear S1 and the first ring gear R1 are represented by ZS1 and ZR1, respectively, the above-indicated gear ratio ρ1 is represented by ZS1/ZR1.

In the power distributing mechanism 16, the first carrier CA1 is connected to the input shaft 14, that is, to the engine 8, and the first sun gear S1 is connected to the first electric motor M1, while the first ring gear R1 is connected to the power transmitting member 18. The switching brake B0 is disposed between the first sun gear S1 and the casing 12, and the switching clutch C0 is disposed between the first sun gear S1 and the first carrier CA1. When the switching clutch C0 and brake B0 are both released, the power distributing mechanism 16 is placed in a differential state in which three elements of the first planetary gear set 24 consisting of the first sun gear S1, first carrier CA1 and first ring gear R1 are rotatable relative to each other, so as to perform a differential function, so that the output of the engine 8 is distributed to the first electric motor M1 and the power transmitting member 18, whereby a portion of the output of the engine 8 is used to drive the first electric motor M1 to generate an electric energy which is stored or used to drive the second electric motor M2. Accordingly, the differential portion 11 (power distributing mechanism 16) is placed in the continuously-variable shifting state (electrically established CVT state), in which the rotating speed of the power transmitting member 18 is continuously variable, irrespective of the rotating speed of the engine 8, namely, placed in the differential state in which a speed ratio γ0 (rotating speed of the input shaft 14/rotating speed of the power transmitting member 18) of the power distributing mechanism 16 is continuously changed from a minimum value γ0 min to a maximum value γ0 max, that is, in the continuously-variable shifting state in which the power distributing mechanism 16 functions as an electrically controlled continuously variable transmission the speed ratio γ0 of which is continuously variable from the minimum value γ0 min to the maximum value γ0 max.

When the switching clutch C0 or brake B0 is engaged while the power distributing mechanism 16 is placed in the continuously-variable shifting state, the power distributing mechanism 16 is brought into a locked state or non-differential state in which the differential function is not available. Described in detail, when the switching clutch C0 is engaged, the first sun gear S1 and the first carrier CA1 are connected together, so that the power distributing mechanism 16 is placed in the locked state in which the three rotary elements of the first planetary gear set 24 consisting of the first sun gear S1, first carrier CA1 and first ring gear R1 are rotatable as a unit, namely, placed in a non-differential state in which the differential function is not available, so that the differential portion 11 is also placed in a non-differential state. In this non-differential state, the rotating speed of the engine 8 and the rotating speed of the power transmitting member 18 are made equal to each other, so that the differential portion 11 (power distributing mechanism 16) is placed in a fixed-speed-ratio shifting state or step-variable shifting state in which the mechanism 16 functions as a transmission having a fixed speed ratio $\gamma 0$ equal to 1.

When the switching brake B0 is engaged in place of the switching clutch C0, the first sun gear S1 is fixed to the casing 12, so that the power distributing mechanism 16 is placed in the locked state in which the first sun gear S1 is not rotatable, namely, placed in a non-differential state in which the differential function is not available, so that the differential portion 11 is also placed in the non-differential state. Since the rotating speed of the first ring gear R1 is made higher than that of the first carrier CA1, the differential portion 11 is placed in the fixed-speed-ratio shifting state or step-variable shifting state in which differential portion 11 (the power distributing mechanism 16) functions as a speed-increasing transmission having a fixed speed ratio $\gamma 0$ smaller than 1, for example, about 0.7.

Thus, the frictional coupling devices in the form of the switching clutch C0 and brake B0 function as a differential-state switching device operable to selectively switch the differential portion 11 (power distributing mechanism 16) between the differential state or non-locked state (non-connected state) and the non-differential state (namely, locked state), that is, between the continuously-variable shifting state in which the differential portion 11 (the power distributing mechanism 16) is operable as an electrically controlled continuously variable transmission the speed ratio of which is continuously variable, and the locked state in which the differential portion 11 is not operable as the electrically controlled continuously variable transmission capable of performing a continuously-variable shifting operation, and in which the speed ratio of the transmission portion 11 is held fixed, namely, the fixed-speed-ratio shifting state (non-differential state) in which the transmission portion 11 is operable as a transmission having a single gear position with one speed ratio or a plurality of gear positions with respective speed ratios, namely, the fixed-speed-ratio shifting state in which the transmission portion 11 is operated as a transmission having a single gear position with one speed ratio or a plurality of gear positions with respective speed ratios. The differential portion 11 is placed in the above-indicated non-connected state, when the switching clutch C0 or the switching brake B0 is placed in a partially engaged (slipping) state, as well as when the switching clutch C0 and the switching brake B0 are placed in the fully released state.

The automatic transmission portion 20 includes a single-pinion type second planetary gear set 26, a single-pinion type third planetary gear set 28 and a single-pinion type fourth planetary gear set 30. The second planetary gear set 26 has: a second sun gear S2; a second planetary P2; a second carrier CA2 supporting the second planetary gear P2 such that the second planetary gear P2 is rotatable about its axis and about the axis of the second sun gear S2; and a second ring gear R2 meshing with the second sun gear S2 through the second planetary gear P2. For example, the second planetary gear set 26 has a gear ratio $\rho 2$ of about 0.562. The third planetary gear set 28 has: a third sun gear S3; a third planetary gear P3; a third carrier CA3 supporting the third planetary gear P3 such that the third planetary gear P3 is rotatable about its axis and about the axis of the third sun gear S3; and a third ring gear R3 meshing with the third sun gear S3 through the third planetary gear P3. For example, the third planetary gear set 28 has a gear ratio $\rho 3$ of about 0.425. The fourth planetary gear set 30 has: a fourth sun gear S4; a fourth planetary gear P4; a fourth carrier CA4 supporting the fourth planetary gear P4 such that the fourth planetary gear P4 is rotatable about its axis and about the axis of the fourth sun gear S4; and a fourth ring gear R4 meshing with the fourth sun gear S4 through the fourth planetary gear P4. For example, the fourth planetary gear set 30 has a gear ratio $\rho 4$ of about 0.421. Where the numbers of teeth of the second sun gear S2, second ring gear R2, third sun gear S3, third ring gear R3, fourth sun gear S4 and fourth ring gear R4 are represented by ZS2, ZR2, ZS3, ZR3, ZS4 and ZR4, respectively, the above-indicated gear ratios $\rho 2$, $\rho 3$ and $\rho 4$ are represented by ZS2/ZR2. ZS3/ZR3, and ZS4/ZR4, respectively.

In the automatic transmission portion 20, the second sun gear S2 and the third sun gear S3 are integrally fixed to each other as a unit, selectively connected to the power transmitting member 18 through a second clutch C2, and selectively fixed to the casing 12 through a first brake B1. The second carrier CA2 is selectively fixed to the casing 12 through a second brake B2, and the fourth ring gear R4 is selectively fixed to the casing 12 through a third brake B3. The second ring gear R2, third carrier CA3 and fourth carrier CA4 are integrally fixed to each other and fixed to the output shaft 22. The third ring gear R3 and the fourth sun gear S4 are integrally fixed to each other and selectively connected to the power transmitting member 18 through a first clutch C1. Thus, the automatic transmission portion 20 and the power transmitting member 18 are selectively connected to each other through the first clutch C1 or the second clutch C2, which is used to shift the automatic transmission portion 20. In other words, the first and second clutches C1, C2 function as a coupling device operable to place the power transmitting path between the power transmitting member 18 and the automatic transmission portion 20, that is, the power transmitting path between the differential portion 11 (power transmitting member 18) and the drive wheels 38, in a selected one of a power transmitting state in which the drive force can be transmitted through the power transmitting path, and a power cutoff state in which the drive force cannot be transmitted through the power transmitting path. Namely, the power transmitting path is placed in the power transmitting state when at least one of the first and second clutches C1, C2 is engaged, and in the power cutoff state when the first and second clutches C1, C2 are released.

The above-described switching clutch C0, first clutch C1, second clutch C2, switching brake B0, first brake B1, second brake B2 and third brake B3 are hydraulically operated frictional coupling devices used in a conventional vehicular automatic transmission. Each of these frictional coupling devices is constituted by a wet-type multiple-disc clutch including a plurality of friction plates which are forced against each other by a hydraulic actuator, or a band brake including a rotary drum and one band or two bands which is/are wound on the outer circumferential surface of the rotary drum and tightened at one end by a hydraulic actuator. Each of the clutches C0-C2 and brakes B0-B3 is selectively engaged for connecting two members between which each clutch or brake is interposed.

In the transmission mechanism 10 constructed as described above, one of a first gear position (first speed position) through a fifth gear position (fifth speed position), a reverse gear position (rear drive position) and a neural position is selectively established by engaging actions of a corresponding combination of the two frictional coupling devices selected from the above-described first clutch C1, second clutch C2, first brake B1, second brake B2 and third brake B3, as indicated in the table of FIG. 2. The above-indicated positions have respective speed ratios γT (input shaft speed $N_{IN}$/output shaft speed $N_{OUT}$) which change as geometric series. In the present embodiment, the power distributing mechanism 16 is provided with the switching clutch C0 and the switching brake B0 one of which is engaged to place the differential portion 11 in the continuously-variable shifting state in which the differential portion 11 is operable as a continuously variable transmission, or in the step-variable shifting state (fixed-speed-ratio shifting state) in which the differential portion 11 is operable as a step-variable transmission having a fixed speed ratio or ratios. In the present transmission mechanism 10, therefore, the differential portion 11 placed in the fixed-speed-ratio shifting state by the engaging action of one of the switching clutch C0 and switching brake B0 cooperates with the automatic transmission portion 20 to constitute a step-variable transmission device, while the differential portion 11 placed in the continuously-variable shifting state with the switching clutch C0 and switching brake B0 being both held in the released state cooperates with the automatic transmission portion 20 to constitute an electrically controlled continuously variable transmission device. In other words, the transmission mechanism 10 is placed in its step-variable shifting state by engaging one of the switching clutch C0 and switching brake B9, and in its continuously-variable shifting state by releasing both of the switching clutch C0 and switching brake B0. Similarly, the differential portion 11 is selectively placed in one of its step-variable and continuously-variable shifting states.

Where the transmission mechanism 10 functions as the step-variable transmission, for example, the first gear position having the highest speed ratio γ1 of about 3.357, for example, is established by engaging actions of the switching clutch C0, first clutch C1 and third brake B3, and the second gear position having the speed ratio γ2 of about 2.180, for example, which is lower than the speed ratio γ1, is established by engaging actions of the switching clutch C0, first clutch C1 and second brake B2, as indicated in FIG. 2. Further, the third gear position having the speed ratio γ3 of about 1.424, for example, which is lower than the speed ratio γ2, is established by engaging actions of the switching clutch C0, first clutch C1 and first brake B1, and the fourth gear position having the speed ratio γ4 of about 1.000, for example, which is lower than the speed ratio γ3, is established by engaging actions of the switching clutch C0, first clutch C1 and second clutch C2. The fifth gear position having the speed ratio γ5 of about 0.705, for example, which is smaller than the speed ratio γ4, is established by engaging actions of the first clutch C1, second clutch C2 and switching brake B0. Further, the reverse gear position having the speed ratio γR of about 3.209, for example, which is intermediate between the speed ratios γ1 and γ2, is established by engaging actions of the second clutch C2 and the third brake B3. The neutral position N is established by engaging only the switching clutch C0, for example.

Where the transmission mechanism 10 functions as the continuously-variable transmission, on the other hand, the switching clutch C0 and the switching brake B0 indicated in FIG. 2 are both released, so that the differential portion 11 functions as the continuously variable transmission, while the automatic transmission portion 20 connected in series to the differential portion 11 functions as the step-variable transmission, whereby the speed of the rotary motion transmitted to the automatic transmission portion 20 placed in a selected one of the first, second, third and fourth gear positions, namely, the rotating speed of the power transmitting member 18 is continuously changed, so that the speed ratio of the drive system when the automatic transmission portion 20 is placed in the selected gear position is continuously variable over a predetermined range. Accordingly, the overall speed ratio γT of the transmission mechanism 10 determined by the speed ratio γ0 of the differential portion 11 and the speed ratio γ of the automatic transmission portion 20 is continuously variable.

Figure 3:
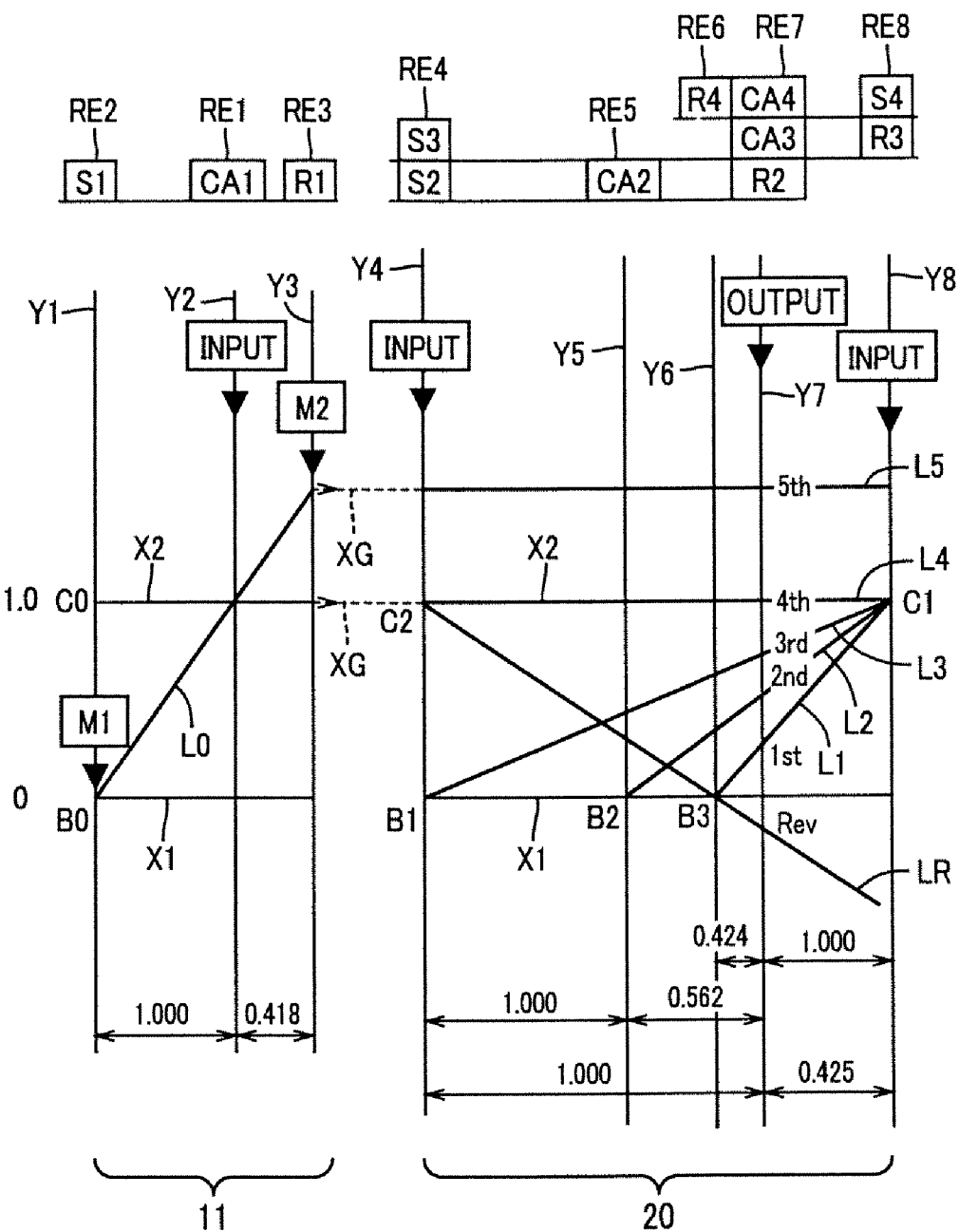
FIG. 3 is a collinear chart indicating relative rotating speeds of the hybrid vehicle drive system of FIG. 1 operated in the step-variable shifting state, in different gear positions of the drive system.

The collinear chart of FIG. 3 indicates, by straight lines, a relationship among the rotating speeds of the rotary elements in each of the gear positions of the transmission mechanism 10, which is constituted by the differential portion 11 functioning as the continuously-variable shifting portion or first shifting portion, and the automatic transmission portion 20 functioning as the step-variable shifting portion (step-variable transmission portion) or second shifting portion. The collinear chart of FIG. 3 is a rectangular two-dimensional coordinate system in which the gear ratios ρ of the planetary gear sets 24, 26, 28, 30 are taken along the horizontal axis, while the relative rotating speeds of the rotary elements are taken along the vertical axis. A lower one of three horizontal lines, that is, the horizontal line X1 indicates the rotating speed of 0, while an upper one of the three horizontal lines, that is, the horizontal line X2 indicates the rotating speed of 1.0, that is, an operating speed $N_E$ of the engine 8 connected to the input shaft 14. The horizontal line XG indicates the rotating speed of the power transmitting member 18.

Three vertical lines Y1, Y2 and Y3 corresponding to the power distributing mechanism 16 of the differential portion 11 respectively represent the relative rotating speeds of a second rotary element (second element) RE2 in the form of the first sun gear S1, a first rotary element (first element) RE1 in the form of the first carrier CA1, and a third rotary element (third element) RE3 in the form of the first ring gear R1. The distances between the adjacent ones of the vertical lines Y1, Y2 and Y3 are determined by the gear ratio ρ1 of the first planetary gear set 24. That is, the distance between the vertical lines Y1 and Y2 corresponds to "1", while the distance between the vertical lines Y2 and Y3 corresponds to the gear ratio ρ1. Further, five vertical lines Y4, Y5, Y6, Y7 and Y8 corresponding to the transmission portion 20 respectively represent the relative rotating speeds of a fourth rotary element (fourth element) RE4 in the form of the second and third sun gears S2, S3 integrally fixed to each other, a fifth rotary element (fifth element) RE5 in the form of the second carrier CA2, a sixth rotary element (sixth element) RE6 in the form of the fourth ring gear R4, a seventh rotary element (seventh element) RE7 in the form of the second ring gear R2 and third and fourth carriers CA3, CA4 that are integrally fixed to each other, and an eighth rotary element (eighth element) RE8 in the form of the third ring gear R3 and fourth sun gear S4 integrally fixed to each other. The distances between the adjacent ones of the vertical lines are determined by the gear ratios ρ2, ρ3 and ρ4 of the second, third and fourth planetary gear sets 26, 28, 30. In the relationship among the vertical lines of the collinear chart, the distances between the sun gear and carrier of each planetary gear set corresponds to "1", while the distances between the carrier and ring gear of each planetary gear set corresponds to the gear ratio ρ. In the differential portion 11, the distance between the vertical lines Y1 and Y2 corresponds to "1", while the distance between the vertical lines Y2 and Y3 corresponds to the gear ratio ρ. In the automatic transmission portion 20, the distance between the sun gear and carrier of each of the second, third and fourth planetary gear sets 26, 28, 30 corresponds to "1", while the distance between the carrier and ring gear of each planetary gear set 26, 28, 30 corresponds to the gear ratio ρ.

Referring to the collinear chart of FIG. 3, the power distributing mechanism 16 (differential portion 11) of the transmission mechanism 10 is arranged such that the first rotary element RE1 (first carrier CA1) of the first planetary gear set 24 is integrally fixed to the input shaft 14 (engine 8) and selectively connected to the second rotary element RE2 (first sun gear S1) through the switching clutch C0, and this second rotary element RE2 is fixed to the first electric motor M1 and selectively fixed to the casing 12 through the switching brake B0, while the third rotary element RE3 (first ring gear R1) is fixed to the power transmitting member 18 and the second electric motor M2, so that a rotary motion of the input shaft 14 is transmitted (input) to the automatic transmission portion 20 through the power transmitting member 18. A relationship between the rotating speeds of the first sun gear S1 and the first ring gear R1 is represented by an inclined straight line L0 which passes a point of intersection between the lines Y2 and X2.

When the transmission mechanism 10 is brought into the continuously-variable shifting state (differential state) by releasing actions of the switching clutch C0 and brake B0, for instance, the rotating speed of the first sun gear S1 represented by a point of intersection between the straight line L0 and the vertical line Y1 is raised or lowered by controlling the operating speed of the first electric motor M1, so that the rotating speed of the first carrier CA1 represented by the straight line L0 and the vertical line Y2 is raised or lowered. When the switching clutch C0 is engaged, the first sun gear S1 and the first carrier CA1 are connected to each other, and the power distributing mechanism 16 is placed in the non-differential state in which the above-indicated three rotary elements are rotated as a unit, so that the straight line L0 is aligned with the horizontal line X2, and the power transmitting member 18 is rotated at a speed equal to the engine speed $N_E$. When the switching brake B0 is engaged, on the other hand, the rotary motion of the first sun gear S1 is stopped, and the power distributing mechanism 16 is placed in the non-differential state in which the power distributing mechanism 16 functions as a speed increasing mechanism, so that the straight line L0 is inclined in the state indicated in FIG. 3, whereby the rotating speed of the first ring gear R1 represented by a point of intersection between the straight lines L0 and Y3, that is, the rotating speed of the power transmitting member 18 is made higher than the engine speed $N_E$ and transmitted to the automatic transmission portion 20.

In the automatic transmission portion 20, the fourth rotary element RE4 is selectively connected to the power transmitting member 18 through the second clutch C2, and selectively fixed to the casing 12 through the first brake B1, and the fifth rotary element RE5 is selectively fixed to the casing 12 through the second brake B2, while the sixth rotary element RE6 is selectively fixed to the casing 12 through the third brake B3. The seventh rotary element RE7 is fixed to the output shaft 22, while the eighth rotary element RE8 is selectively connected to the power transmitting member 18 through the first clutch C1.

When the first clutch C1 and the third brake B3 are engaged, the automatic transmission portion 20 is placed in the first gear position. The rotating speed of the output shaft 22 in the first gear position is represented by a point of intersection between the vertical line Y7 indicative of the rotating speed of the seventh rotary element RE7 fixed to the output shaft 22 and an inclined straight line L1 which passes a point of intersection between the vertical line Y8 indicative of the rotating speed of the eighth rotary element RE8 and the horizontal line X2, and a point of intersection between the vertical line Y6 indicative of the rotating speed of the sixth rotary element RE6 and the horizontal line X1, as indicated in FIG. 3. Similarly, the rotating speed of the output shaft 22 in the second gear position established by the engaging actions of the first clutch C1 and second brake B2 is represented by a point of intersection between an inclined straight line L2 determined by those engaging actions and the vertical line Y7 indicative of the rotating speed of the seventh rotary element RE7 fixed to the output shaft 22. The rotating speed of the output shaft 22 in the third gear position established by the engaging actions of the first clutch C1 and first brake B1 is represented by a point of intersection between an inclined straight line L3 determined by those engaging actions and the vertical line Y7 indicative of the rotating speed of the seventh rotary element RE7 fixed to the output shaft 22. The rotating speed of the output shaft 22 in the fourth gear position established by the engaging actions of the first clutch C1 and second clutch C2 is represented by a point of intersection between a horizontal line L4 determined by those engaging actions and the vertical line Y7 indicative of the rotating speed of the seventh rotary element RE7 fixed to the output shaft 22. In the first through fourth gear positions in which the switching clutch C0 is placed in the engaged state, the eighth rotary element RE8 is rotated at the same speed as the engine speed $N_E$, with the drive force received from the differential portion 11, that is, from the power distributing mechanism 16. When the switching clutch B0 is engaged in place of the switching clutch C0, the eighth rotary element RE8 is rotated at a speed higher than the engine speed $N_E$, with the drive force received from the power distributing mechanism 16. The rotating speed of the output shaft 22 in the fifth gear position established by the engaging actions of the first clutch C1, second clutch C2 and switching brake B0 is represented by a point of intersection between a horizontal line L5 determined by those engaging actions and the vertical line Y7 indicative of the rotating speed of the seventh rotary element RE7 fixed to the output shaft 22.

Figure 4:
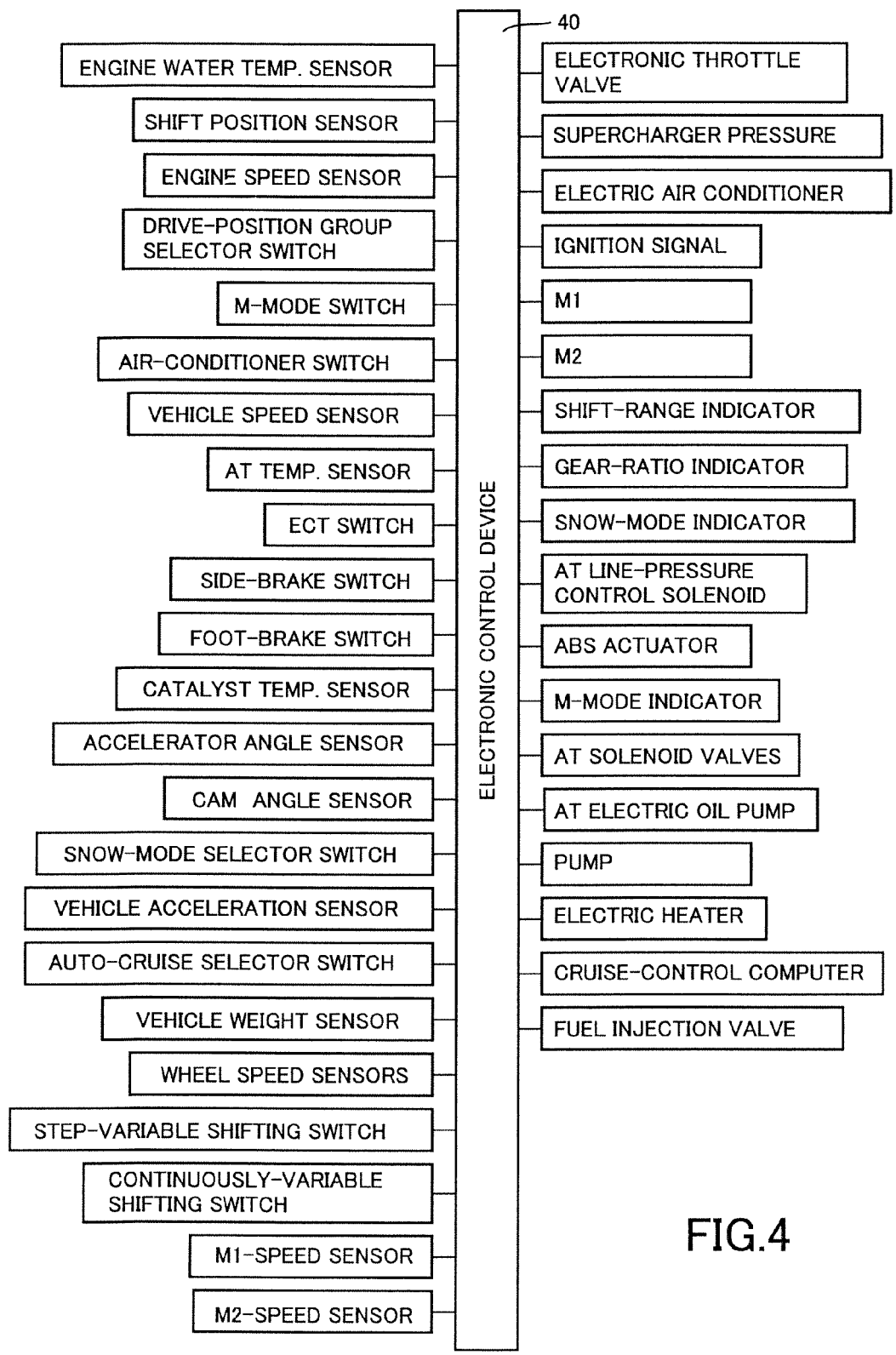
FIG. 4 is a view indicating input and output signals of an electronic control device for the drive system of FIG. 1.

FIG. 4 illustrates signals received by an electronic control device 40 provided to control the transmission mechanism 10, and signals generated by the electronic control device 40. This electronic control device 40 includes a so-called microcomputer incorporating a CPU, a ROM, a RAM and an input/output interface, and is arranged to process the signals according to programs stored in the ROM while utilizing a temporary data storage function of the ROM, to implement hybrid drive controls of the engine 8 and electric motors M1 and M2, and drive controls such as shifting controls of the transmission portion 20.

The electronic control device 40 is arranged to receive various sensors and switches shown in FIG. 4, various signals such as: a signal indicative of a temperature $\text{TEMP}_W$ of cooling water of the engine 8; a signal indicative of a selected operating position $P_{SH}$ of a shift lever; a signal indicative of the operating speed $N_E$ of the engine 8; a signal indicative of a value indicating a selected group of forward-drive positions of the transmission mechanism 10; a signal indicative of an M mode (manual shifting drive mode); a signal indicative of an operated state of an air conditioner; a signal indicative of a vehicle speed V corresponding to the rotating speed $N_{OUT}$ of the output shaft 22; a signal indicative of a temperature of a working oil of the automatic transmission portion 20; a signal indicative of an operated state of a side brake; a signal indicative of an operated state of a foot brake; a signal indicative of a temperature of a catalyst; a signal indicative of an amount of operation (an angle of operation) $A_{CC}$ of a manually operable vehicle accelerating member in the form of an accelerator pedal; a signal indicative of an angle of a cam; a signal indicative of the selection of a snow drive mode; a signal indicative of a longitudinal acceleration value G of the vehicle; a signal indicative of the selection of an auto-cruising drive mode; a signal indicative of a weight of the vehicle (vehicle weight); signals indicative of speeds of the drive wheels of the vehicle; a signal indicative of an operating state of a step-variable shifting switch provided to place the differential portion 11 (power distributing mechanism 16) in the fixed-speed-ratio shifting state in which the transmission mechanism 10 functions as a step-variable transmission; a signal indicative of a continuously-variable shifting switch provided to place the differential portion 11 in the continuously variable-shifting state (differential state) in which the transmission mechanism 10 functions as the continuously variable transmission; a signal indicative of a rotating speed $N_{M1}$ of the first electric motor M1 (hereinafter referred to as "first electric motor speed $N_{M1}$); a signal indicative of a rotating speed $N_{M2}$ of the second electric motor M2 (hereinafter referred to as "second electric motor speed $N_{M2}$); and a signal indicative of a charging amount (charging state) SOC of the electric-energy storage device 60 (shown in FIG. 5).

The electronic control device 40 is further arranged to generate various signals such as: a drive signal to drive a throttle actuator for controlling an angle of opening $\theta_{TH}$ of an electronic throttle valve 94; a fuel injection amount signal to control an amount of injection of a fuel by a fuel injecting device 96 into the engine 8; an ignition signal to control a timing of ignition of the engine 8 by an ignition device 98; a supercharger pressure adjusting signal for adjusting a supercharger pressure of the engine 8; an air conditioner drive signal to operate the electric air conditioner; signals to operate the electric motors M1 and M2; a signal to operate a shift-range indicator for indicating the selected operating or shift position of the shift lever; a signal to operate a gear-ratio indicator for indicating the gear ratio; a signal to operate a snow-mode indicator for indicating the selection of the snow drive mode; a signal to operate an ABS actuator for anti-lock braking of the wheels; a signal to operate an M-mode indicator for indicating the selection of the M-mode; valve drive signals to operate solenoid-operated valves incorporated in a hydraulic control unit 42 (shown in FIG. 5) provided to control the hydraulic actuators of the hydraulically operated frictional coupling devices of the differential portion 11 and automatic transmission portion 20; a drive signal to operate an electric oil pump used as a hydraulic pressure source for the hydraulic control unit 42; a signal to drive an electric heater; and a signal to be applied to a cruise-control computer.

FIG. 5 is a functional block diagram of FIG. 5 for explaining major control functions of the electronic control device. A step-variable shifting control means 54 shown in FIG. 5 is arranged to determine whether a shifting action of the automatic transmission portion 20 should take place, that is, to determine the gear position to which the automatic transmission portion 20 should be shifted. This determination is made on the basis of a condition of the vehicle in the form of the vehicle speed V and an output torque $T_{OUT}$ of the automatic transmission portion 20, and according to a shifting boundary line map (shifting control map) which is stored in memory means 56 and which is indicated by solid lines and one-dot chain lines in FIG. 5. The step-variable shifting control means 54 generates commands (shifting commands) to be applied to the hydraulic control unit 42, to selectively engage and release the respectively two hydraulically operated frictional coupling devices (except the switching clutch C0 and brake B0), for establishing the determined gear position of the automatic transmission portion 20 according to the table of FIG. 2. According to the generated commands, the appropriate solenoid-operated valves incorporated in the hydraulic control unit 42 are controlled to operate the hydraulic actuators of the two hydraulically operated frictional coupling devices which are to be released and engaged, respectively, to perform the appropriate shifting action of the automatic transmission portion 20.

A hybrid control means 52 functions as continuously-variable shifting control means and is arranged to control the engine 8 to be operated in an operating range of high efficiency, and control the first and second electric motors M1, M2 so as to optimize a proportion of drive forces generated by the engine 8 and the second electric motor M2, and a reaction force generated by the first electric motor M1 during its operation as the electric generator, for thereby controlling the speed ratio γ0 of the differential portion 11 operating as the electrically controlled continuously variable transmission, while the transmission mechanism 10 is placed in the continuously-variable shifting state, that is, while the differential portion 11 is placed in the differential state. For instance, the hybrid control means 52 calculates a target (required) vehicle output at the present running speed V of the vehicle, on the basis of the operating amount $A_{CC}$ of the accelerator pedal 46 used as an operator's required vehicle output and the vehicle running speed V, and calculate a target total vehicle output on the basis of the calculated target vehicle output and a required amount of generation of an electric energy by the first electric motor M1. The hybrid control means 52 calculates a target output of the engine 8 to obtain the calculated target total vehicle output, while taking account of a power transmission loss, a load acting on various devices of the vehicle, an assisting torque generated by the second electric motor M2, etc. The hybrid control means 52 controls the speed $N_E$ and torque $T_E$ of the engine 8, so as to obtain the calculated target engine output, and the amount of generation of the electric energy by the first electric motor M1.

The hybrid control means 52 is arranged to implement the hybrid control while taking account of the presently selected gear position of the automatic transmission portion 20, so as to improve the drivability of the vehicle and the fuel economy of the engine 8. In the hybrid control, the differential portion 11 is controlled to function as the electrically controlled continuously-variable transmission, for optimum coordination of the engine speed $N_E$ and vehicle speed V for efficient operation of the engine 8, and the rotating speed of the power transmitting member 18 determined by the selected gear position of the transmission portion 20. That is, the hybrid control means 52 determines a target value of the overall speed ratio γT of the transmission mechanism 10, so that the engine 8 is operated according to a stored highest-fuel-economy curve (fuel-economy map) stored in memory means and indicated by broken line in FIG. 7. The target value of the overall speed ratio γT of the transmission mechanism 10 permits the engine torque $T_E$ and speed $N_E$ to be controlled so that the engine 8 provides an output necessary for obtaining the target vehicle output (target total vehicle output or required vehicle drive force). The highest-fuel-economy curve is obtained by experimentation so as to satisfy both of the desired operating efficiency and the highest fuel economy of the engine 8, and is defined in a two-dimensional coordinate system defined by an axis of the engine speed $N_E$ and an axis of the output torque $T_E$ of the engine 8 (engine torque $T_E$). The hybrid control means 52 controls the speed ratio γ0 of the differential portion 11, so as to obtain the target value of the overall speed ratio γT, so that the overall speed ratio γT can be controlled within a predetermined range, for example, between 13 and 0.5.

In the hybrid control, the hybrid control means 52 controls an inverter 58 such that the electric energy generated by the first electric motor M1 is supplied to an electric-energy storage device 60 and the second electric motor M2 through the inverter 58. That is, a major portion of the drive force produced by the engine 8 is mechanically transmitted to the power transmitting member 18, while the remaining portion of the drive force is consumed by the first electric motor M1 to convert this portion into the electric energy, which is supplied through the inverter 58 to the second electric motor M2, so that the second electric motor M2 is operated with the supplied electric energy, to produce a mechanical energy to be transmitted to the output shaft 22. Thus, the drive system is provided with an electric path through which an electric energy generated by conversion of a portion of a drive force of the engine 8 is converted into a mechanical energy.

It is noted in particular that the automatic transmission portion 20 is shifted under the control of the step-variable shifting control means 54, to change its speed ratio in steps, whereby the overall speed ratio γT of the transmission mechanism 10 is changed in steps. Namely, the overall speed ratio γT of the transmission mechanism 10 is changed during a shifting action of the step-variable transmission portion 30, in steps or non-continuously, rather than continuously as in a continuously variation transmission the speed ratio of which is continuously changed. The vehicle drive torque can be changed more rapidly when the overall speed ratio γT is changed in steps, than when the overall speed ratio γT is changed continuously.

In view of the facts indicated above, the hybrid control means 52 is arranged to control the speed ratio of the differential portion 11 in synchronization with a shifting action of the automatic transmission portion 20, so as to reduce an amount of change of the overall speed ratio γT in steps during the shifting action of the automatic transmission portion 20, that is, to prevent a change of the engine speed $N_E$ upon a change of the input speed $N_{IN}$ of the automatic transmission portion 20, for example, to prevent the amount of change of the engine speed $N_E$ beyond a predetermined threshold $N_E'$, irrespective of a change of the rotating speed of the power transmitting member 18 (of the second electric motor M2), which is the input speed of the automatic transmission portion 20 during its shifting action. In other words, the hybrid control means 52 is arranged to control the speed ratio of the differential portion 11 in synchronization with the shifting action of the automatic transmission portion 20, so as to reduce the amount of change of the engine speed $N_E$ due to the electric CVT function (differential function) of the differential portion 11 during the shifting action of the automatic transmission portion 20. The above-indicated predetermined threshold $N_E'$ is a target value of the engine speed $N_E$ value used for controlling the speed ratio of the differential portion 11 so as to reduce the amount of change of the engine speed $N_E$ during the shifting action of the automatic transmission portion 20. This target value is obtained by experimentation and stored in memory.

For instance, the hybrid control means 52 is arranged to change the speed ratio γ0 of the differential portion 11 in a direction opposite to the direction of change of the speed ratio γ of the automatic transmission portion 20, by an amount equal to the amount of change of the speed ratio γ in steps, in synchronization with the shifting action of the automatic transmission portion 20, so as to prevent a non-continuous transient change of the overall speed ratio γT during the shifting action of the automatic transmission portion 20, that is, so as to hold the engine speed $N_E$ substantially constant before and after the shifting action of the automatic transmission portion 20, for thereby permitting a continuous change of the overall speed ratio γT. This arrangement is effective to reduce the amount of stepping change of the engine speed $N_E$ during the shifting action of the automatic transmission portion 20, for thereby reducing the shifting shock, in spite of the stepping change of the speed ratio γ of the automatic transmission portion 20 due to the shifting action.

Figure 7:
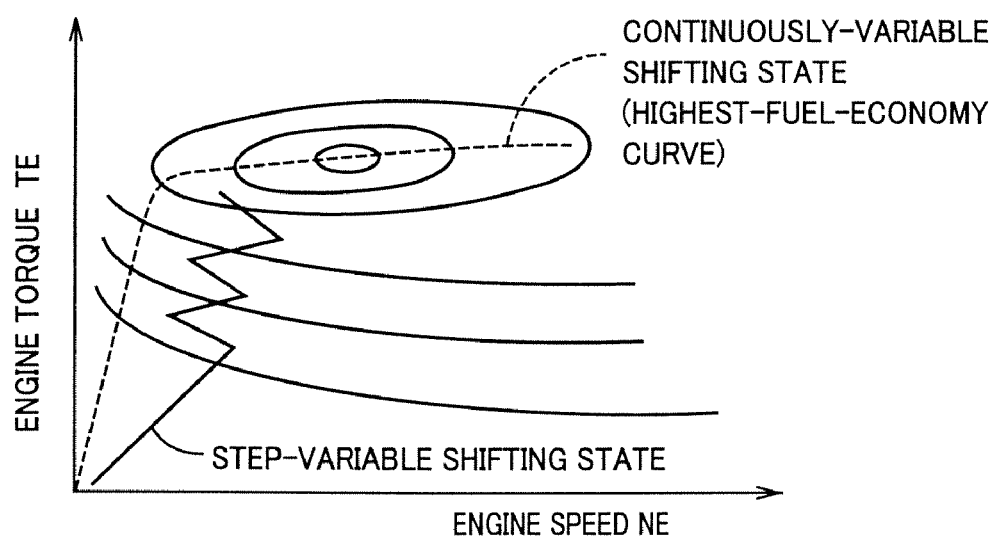
FIG. 7 is a view illustrating an example of a fuel consumption map defining a highest-fuel-economy curve of an engine, and explaining a difference between an operation of the engine in a continuously-variable shifting state (indicated by broken line) of the transmission mechanism and an operation of the engine in a step-variable shifting state (indicated by one-dot chain line) of the transmission mechanism.

Described in another point of view, the engine 8 is generally operated with a step-variable transmission, following a one-dot chain line indicated in FIG. 7, and with a continuously variable transmission, following the highest-fuel-economy curve indicated by broken line in FIG. 7, or following a line closer to the highest-fuel-economy curve, than when the engine 8 is operated with the step-variable transmission. Accordingly, the engine torque $T_E$ for obtaining the required vehicle drive torque (drive force) is obtained at the engine speed $N_E$ which is closer to the highest-fuel-economy curve, when the engine 8 is operated with the continuously variable transmission than when it is operated with the step-variable transmission. This means that the continuously variable transmission permits a higher degree of fuel economy that the step-variable transmission. Therefore, the hybrid control means 52 is arranged to control the speed ratio γ of the differential portion 11 such that the engine 8 is operated following the highest-fuel-economy line indicated by the broken line in FIG. 7, for preventing deterioration of the fuel economy, in spite of a change of the speed ratio of the automatic transmission portion 20 in steps during its shifting action. This arrangement enables the transmission mechanism 10 as a whole to function as a continuously variable transmission, thereby assuring an improved fuel economy.

As described above, the hybrid control means 52 is arranged to implement a so-called "synchronous speed ratio control" of the differential portion 11 in synchronization with the shifting action of the automatic transmission portion 20. This synchronous speed ratio control is initiated at a moment which is determined by taking account of a response delay from a moment of determination by the step-variable control means 54 of a shifting action of the automatic transmission portion 20 to a moment of initiation of an actual change of the input speed $N_{IN}$ of the automatic transmission portion 20 caused by operations of the appropriate hydraulically operated frictional coupling devices, namely, a response delay up to a moment of initiation of a so-called "inertia phase" in which the input speed $N_{IN}$ of the automatic transmission portion 20, that is, the rotating speed of the power transmitting member 18 changes in the process of the shifting action of the automatic transmission portion 20. For example, the response delay is obtained by experimentation and stored in memory. Alternatively, the hybrid control means 52 initiates the synchronous speed ratio control of the differential portion 11 at a moment of detection of initiation of an actual change of the input speed $N_{IN}$ of the automatic transmission portion 20.

The synchronous speed ratio control of the differential portion 11 is terminated at a moment of termination of the inertia phase in the process of the shifting action of the automatic transmission portion 20. For example, a length of duration of the shifting action of the automatic transmission portion 20 is obtained by experimentation and stored in memory. Alternatively, the hybrid control means 52 terminates the synchronous speed ratio control of the differential portion 11 at a moment of detection that the actual change of the input speed $N_{IN}$ of the automatic transmission portion 20 has been zeroed.

As described above, the hybrid control means 52 implements the synchronous speed ratio control of the differential portion 11, during the time period of the inertia phase in the process of the shifting action of the automatic transmission portion 20, for example, during a time period obtained by experimentation, or during a length of time from the moment of initiation of the actual change of the input speed $N_{IN}$ of the automatic transmission portion 20 to the moment of detection of zeroing of the actual change of the input speed $N_{IN}$. In other words, the hybrid control means 52 controls the speed ratio of the differential portion 11 in the inertia phase of the automatic transmission portion 20, such that the control of the speed ratio of the differential portion 11 is effected in synchronization with the shifting action of the automatic transmission portion 20.

The hybrid control means 52 includes engine output control means functioning to control the engine 8, so as to provide a required output, by controlling the throttle actuator to open and close the electronic throttle valve 94, and controlling an amount and time of fuel injection by the fuel injecting device 96 into the engine 8, and/or the timing of ignition of the igniter by the ignition device 98, alone or in combination. For instance, the hybrid control means 52 is basically arranged to control the throttle actuator on the basis of the operating amount $A_{CC}$ of the accelerator pedal 45 and according to a predetermined stored relationship (not shown) between the operating amount $A_{CC}$ and the opening angle $\theta_{TH}$ of the electronic throttle valve such that the opening angle $\theta_{TH}$ increases with an increase of the operating amount $A_{CC}$.

Figure 6:
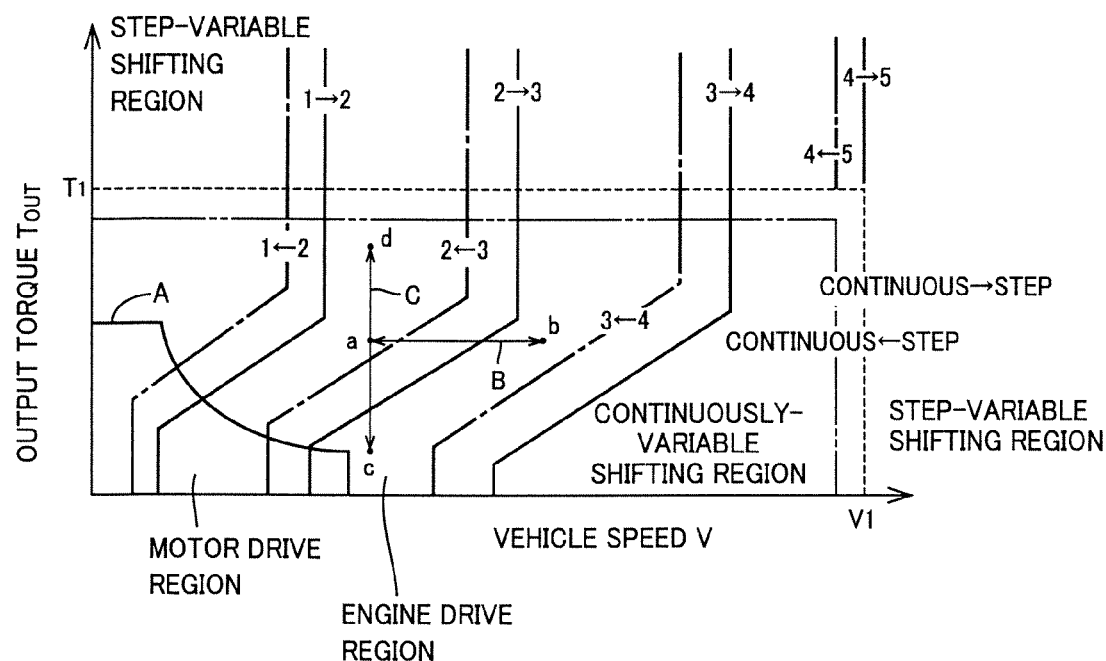
FIG. 6 is a view illustrating an example of a stored shifting boundary line map used for determining a shifting action of an automatic transmission portion, an example of a stored switching boundary line map used for switching the shifting state of a transmission mechanism, and an example of a stored drive-power-source switching boundary line map defining boundary lines between an engine drive region and a motor drive region for switching between an engine drive mode and a motor drive mode, in the same two-dimensional coordinate system defined by control parameters in the form of a running speed and an output torque of the vehicle, such that those maps are related to each other.

The hybrid control means 52 is capable of establishing a motor-drive mode to drive the vehicle by the electric motor, by utilizing the electric CVT function of the differential portion 11, irrespective of whether the engine 8 is in the non-operated state or in the idling state. Solid line A in FIG. 6 represents an example of a boundary line defining an engine-drive region and a motor-drive region, for switching the vehicle drive power source for starting and driving the vehicle (hereinafter referred to as "drive power source"), between the engine 8 and the electric motor (e.g., second electric motor M2). In other words, the vehicle drive mode is switchable between a so-called "engine drive mode" corresponding to the engine-drive region in which the vehicle is started and driven with the engine 8 used as the drive power source, and the so-called "motor-drive mode" corresponding to the motor-drive region in which the vehicle is driven with the second electric motor M2 used as the drive power source. A predetermined stored relationship representing the boundary line (solid line A) of FIG. 6 for switching between the engine-drive mode and the motor-drive mode is an example of a drive-power-source switching map (drive-power-source map) in a two-dimensional coordinate system defined by control parameters in the form of the vehicle speed V and a drive-force-related value in the form of the output torque $T_{OUT}$. This drive-power-source switching map is stored in the memory means 56, together with the shifting boundary line map (shifting map) indicated by solid lines and one-dot chain lines in FIG. 6.

The hybrid control means 52 determines whether the vehicle condition is in the motor-drive region or engine-drive region, and establishes the motor-drive mode or engine-drive mode. This determination is made on the basis of the vehicle condition represented by the vehicle speed V and the required output torque $T_{OUT}$, and according to the drive-power-source switching map of FIG. 6. As is understood from FIG. 6, the motor-drive mode is generally established by the hybrid control means 52, when the output torque $T_{OUT}$ is in a comparatively low range in which the engine efficiency is comparatively low, namely, when the engine torque $T_E$ is in a comparatively low range, or when the vehicle speed V is in a comparatively low range, that is, when the vehicle load is comparatively low. Usually, therefore, the vehicle is started in the motor-drive mode, rather than in the engine-drive mode.

When the vehicle condition upon starting of the vehicle is outside the motor-drive region defined by the drive-power-source switching map of FIG. 6, as a result of an increase of the required output torque $T_{OUT}$ or engine torque $T_E$ due to an operation of the accelerator pedal, the vehicle may be started in the engine-drive mode.

For reducing a dragging of the engine 8 in its non-operated state and improving the fuel economy in the motor-drive mode, the hybrid control means 52 is arranged to hold the engine speed $N_E$ at zero or substantially zero as needed, owing to the electric CVT function (differential function) of the differential portion 11, that is, by controlling the differential portion 11 to perform its electric CVT function (differential function), so that the first electric motor speed 1 is controlled so as to be freely rotated to have a negative speed $N_{M1}$.

The hybrid control means 52 is further capable of performing a so-called "drive-force assisting" operation (torque assisting operation) to assist the engine 8, by supplying an electric energy from the first electric motor M1 or the electric-energy storage device 60 to the second electric motor M2 through the electric path, so that the second electric motor M2 is operated to transmit a drive torque to the drive wheels 38. Thus, the second electric motor M2 may be used in addition to the engine 8, in the engine-drive mode.

The hybrid control means 52 is arranged to hold the engine 8 in an operated state owing to the electric CVT function of the differential portion 11, irrespective of whether the vehicle is stationary or running at a relatively low speed. When the first electric motor M1 is required to be operated to charge the electric-energy storage device 60 while the vehicle is stationary, in order to charge the electric-energy storage device 60 where the electric energy amount SOC stored in the storage device 60 is reduced, the speed $N_E$ of the engine 8 which is operated to operate the first electric motor M1 at a relatively high speed can be kept high enough to permit the operation of the engine 8 by itself, owing to the differential function of the power distributing mechanism 16, even while the operating speed of the second electric motor M2 determined by the vehicle speed V is zero (substantially zero) when the vehicle is stationary.

The hybrid control means 52 is further arranged to control the first electric motor speed $N_{M1}$ and/or the second electric motor speed $N_{M2}$, by using the electric CVT function of the differential portion 11, for thereby holding the engine speed $N_E$ constant or changing the engine speed $N_E$ to a desired value, irrespective of whether the vehicle is stationary or running. In other words, the hybrid control means 52 is capable of controlling the first electric motor speed $N_{M1}$ and/or the second electric motor speed $N_{M2}$, while holding the engine speed $N_E$ constant or changing the engine speed $N_E$ to the desired value. When the engine speed $N_E$ is raised during running of the vehicle, for example, the hybrid control means 52 raises the first electric motor speed $N_{M1}$, while holding substantially constant the second electric motor speed $N_{M2}$ which is influenced by the vehicle speed V (speed of the drive wheels 38).

A high-speed-gear determining means 62 is arranged to determine whether the gear position to which the transmission mechanism 10 should be shifted on the basis of the vehicle condition and according to the shifting boundary line map stored in the memory means 56 and indicated in FIG. 6 by way of example is a high-speed-gear position, for example, the fifth gear position. This determination is made by determining whether the gear position selected by the step-variable shifting control means 54 is the fifth gear position or not, to determine which one of the switching clutch C0 and brake B0 should be engaged to place the transmission mechanism 10 in the step-variable shifting state.

The switching control means 50 is arranged to selectively switch the transmission mechanism 10 between the continuously-variable shifting state and the step-variable shifting state, that is, between the differential state and the locked state, by engaging and releasing the coupling devices (switching clutch C0 and brake B0) on the basis of the vehicle condition. For example, the switching control means 50 is arranged to determine whether the shifting state of the transmission mechanism 10 (differential portion 11) should be changed, on the basis of the vehicle condition represented by the vehicle speed V and the required output torque $T_{OUT}$ and according to the switching boundary line map (switching control map or relation) stored in the memory means 56 and indicated by two-dot chain line in FIG. 6 by way of example, namely, whether the vehicle condition is in the continuously-variable shifting region for placing the transmission mechanism 10 in the continuously-variable shifting state, or in the step-variable shifting region for placing the transmission mechanism 10 in the step-variable shifting state.

Described in detail, when the switching control means 50 determines that the vehicle condition is in the step-variable shifting region, the switching control means 50 disables the hybrid control means 52 to implement a hybrid control or continuously-variable shifting control, and enables the step-variable shifting control means 54 to implement a predetermined step-variable shifting control in which the transmission portion 20 is automatically shifted according to the shifting boundary line map stored in the memory means 56 and indicated in FIG. 6 by way of example. FIG. 2 indicates the combinations of the engaging actions of the hydraulically operated frictional coupling devices C0, C1, C2, B0, B1, B2 and B3, which are stored in the memory means 56 and which are selectively used for automatic shifting of the automatic transmission portion 20. In the step-variable shifting state, the transmission mechanism 10 as a whole constituted by the differential portion 11 and the automatic transmission portion 20 functions as a so-called step-variable automatic transmission which is automatically shifted according to the table of FIG. 2.

When the high-speed-gear determining means 62 has determined that the transmission mechanism 10 should be shifted to the fifth gear position, the switching control means 50 commands the hydraulic control unit 42 to release the switching clutch C0 and engage the switching brake B0, for enabling the differential portion 11 to function as an auxiliary transmission having a fixed speed ratio γ0 of 0.7, for example, so that the transmission mechanism 10 as a whole is placed in a high-speed gear position so-called "an overdrive gear position" having a speed ratio lower than 1.0. When the high-speed-gear determining means 62 has not determined that the transmission mechanism 10 should be shifted to the fifth gear position, the switching control means 50 commands the hydraulic control unit 42 to engage the switching clutch C0 and release the switching brake B0, for enabling the differential portion 11 to function as an auxiliary transmission having a fixed speed ratio γ0 of 1.0, for example, so that the transmission mechanism 10 as a whole is placed in a speed-reducing gear position having a speed ratio not lower than 1.0. Thus, when the transmission mechanism 10 is switched to the step-variable shifting state by the switching control means 50, the differential portion 11 operable as the auxiliary transmission is placed in a selected one of two gear positions under the control of the switching control means 50 while the automatic transmission portion 20 connected in series to the differential portion 11 functions as a step-variable transmission, so that the transmission mechanism 10 as a whole functions as the so-called step-variable automatic transmission.

When the switching control means 50 has determined that the vehicle condition is in the continuously-variable shifting region for placing the transmission mechanism 10 in the continuously-variable shifting state, the switching control means 50 commands the hydraulic control unit 42 to release both of the switching clutch C0 and brake B0, for placing the differential portion 11 in the continuously-variable shifting state. At the same time, the switching control means 50 enables the hybrid control means 52 to implement the hybrid control, and commands the step-variable shifting control means 54 to select and hold a predetermined one of the gear positions, or to permit the automatic transmission portion 20 to be automatically shifted according to the shifting boundary line map stored in the map memory 56 and indicated in FIG. 6 by way of example. In the latter case, the variable-step shifting control means 54 implements the automatic shifting control by suitably selecting the combinations of the operating states of the frictional coupling devices indicated in the table of FIG. 2, except the combinations including the engagement of the switching clutch C0 and brake B0. Thus, the differential portion 11 switched to the continuously-variable shifting state under the control of the switching control means 50 functions as the continuously variable transmission while the automatic transmission portion 20 connected in series to the differential portion 11 functions as the step-variable transmission, so that the transmission mechanism 10 provides a sufficient vehicle drive force, such that the input speed $N_{IN}$ of the automatic transmission portion 20 placed in one of the first through fourth gear positions, namely, the rotating speed $N_{18}$ of the power transmitting member 18 is continuously changed, so that the speed ratio of the transmission mechanism 10 when the transmission portion 20 is placed in one of those gear positions is continuously variable over a predetermined range. Accordingly, the speed ratio of the automatic transmission portion 20 is continuously variable across the adjacent gear positions, whereby the total speed ratio γT of the transmission mechanism 10 is continuously variable.

The maps of FIG. 6 will be described in detail. The shifting boundary line map (shifting control map or relation) shown in FIG. 6 by way of example and stored in the memory means 56 is used for determining whether the automatic transmission portion 20 should be shifted, and is defined in a two-dimensional coordinate system by control parameters consisting of the vehicle speed V and the drive-force-related value in the form of the required output torque $T_{OUT}$. In FIG. 6, the solid lines indicate the shift-up boundary lines, while the one-dot chain lines indicate the shift-down boundary lines.

The broken lines in FIG. 6 represent the upper vehicle-speed limit V1 and the upper output-torque limit T1 which are used for the switching control means 50 to determine whether the vehicle condition is in the step-variable shifting region or the continuously-variable shifting region. In other words, the broken lines represent a high-speed-running boundary line indicative of the upper vehicle-speed limit V1 above which it is determined that the hybrid vehicle is in a high-speed running state, and a high-output-running boundary line indicative of the upper output-torque limit T1 of the output torque $T_{OUT}$ of the automatic transmission portion 20 above which it is determined that the hybrid vehicle is in a high-output running state. The output torque $T_{OUT}$ is an example of the drive-force-related value which relates to the drive force of the hybrid vehicle. FIG. 6 also shows two-dot chain lines which are offset with respect to the broken lines, by a suitable amount of control hysteresis for determination as to whether the step-variable shifting state is changed to the continuously-variable shifting state or vice versa. Thus, the broken lines and two-dot chain lines of FIG. 6 constitute the stored switching boundary line map (switching control map) used by the switching control means 50 to determine whether the vehicle condition is in the step-variable shifting region or the continuously-variable shifting region, depending upon whether the control parameters in the form of the vehicle speed V and the output torque $T_{OUT}$ are higher than the predetermined upper limit values V, T1. This switching boundary line map may be stored in the memory means 56, together with the shifting boundary line map. The switching boundary line map may use at least one of the upper vehicle-speed limit V1 and the upper output-torque limit T1, or at least one of the vehicle speed V and the output torque $T_{OUT}$, as at least one parameter.

The above-described shifting boundary line map, switching boundary line, and drive-power-source switching map may be replaced by stored equations for comparison of the actual vehicle speed V with the limit value V1 and comparison of the actual output torque $T_{OUT}$ with the limit value T1. In this case, the switching control means 50 switches the transmission mechanism 10 in the step-variable shifting state by engaging the switching brake B0, when the actual vehicle speed V has exceeded the upper limit V1, or by engaging the switching clutch C0, when the output torque $T_{OUT}$ of the automatic transmission portion 20 has exceeded the upper limit T1.

The switching control means 50 may be arranged to place the transmission mechanism 10 in the step-variable shifting state even when the vehicle condition is in the continuously-variable shifting region, upon detection of any functional failure or deterioration of the electric components such as the electric motors which are operable to operate the differential portion 11 as the electrically controlled continuously variable transmission. Those electric components include components such as the first electric motor M1, second electric motor M2, inverter 58, electric-energy storage device 50 and electric lines interconnecting those components, which are associated with the electric path through which an electric energy generated by the first electric motor M1 is converted into a mechanical energy. The functional deterioration of the components may be caused by their failure or a drop of their temperatures.

The drive-force-related value indicated above is a parameter corresponding to the drive force of the vehicle, which may be the output torque $T_{OUT}$ of the automatic transmission portion 20, the engine output torque $T_E$ or an acceleration value G of the vehicle, as well as a drive torque or drive force of drive wheels 38. The parameter may be: an actual value calculated on the basis of the operating amount $A_{CC}$ of the accelerator pedal 45 or the opening angle of the throttle valve (or intake air quantity, air/fuel ratio or amount of fuel injection) and the engine speed $N_E$; or any one of estimated values of the required (target) engine torque $T_E$, required (target) output torque $T_{OUT}$ of the transmission portion 20 and required vehicle drive force, which are calculated on the basis of the operating amount $A_{CC}$ of the accelerator pedal 45 or the operating angle of the throttle valve. The above-described vehicle drive torque may be calculated on the basis of not only the output torque $T_{OUT}$, etc., but also the ratio of the differential gear device 36 and the radius of the drive wheels 38, or may be directly detected by a torque sensor or the like.

For instance, the upper vehicle-speed limit V1 is determined so that the transmission mechanism 10 is placed in the step-variable shifting state while the vehicle is in the high-speed running state. This determination is effective to reduce a possibility of deterioration of the fuel economy of the vehicle if the transmission mechanism 10 were placed in the continuously-variable shifting state while the vehicle is in the high-speed running state. On the other hand, the upper output-torque limit T1 is determined depending upon the operating characteristics of the first electric motor M1, which is small-sized and the maximum electric energy output of which is made relatively small so that the reaction torque of the first electric motor M1 is not so large when the engine output is relatively high in the high-output running state of the vehicle.

Figure 8:
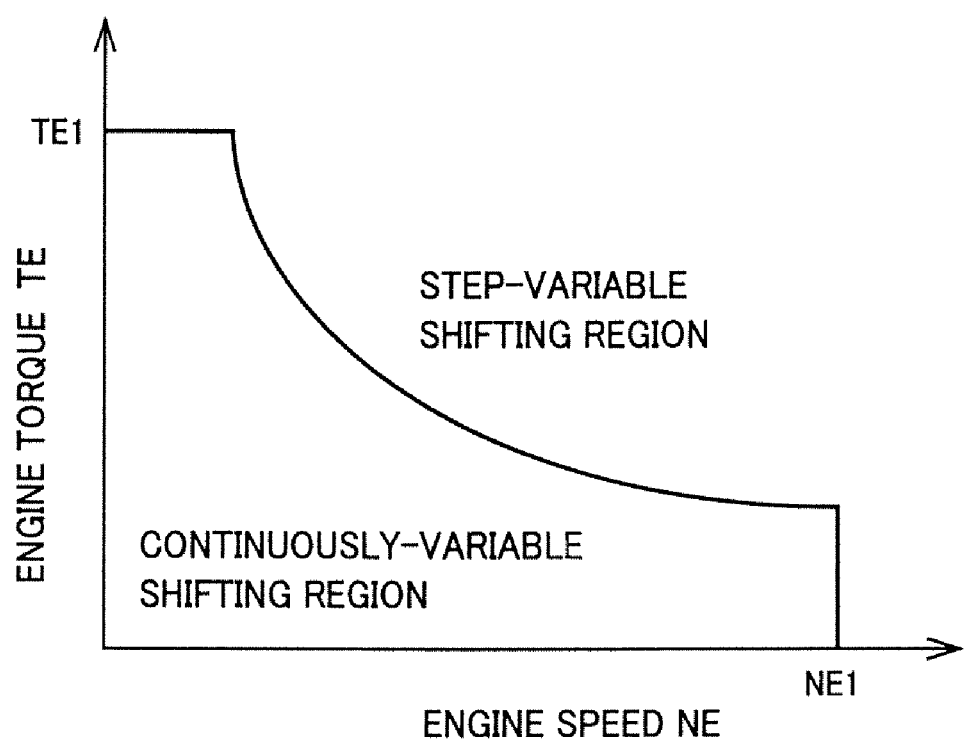
FIG. 8 is a view illustrating a stored relationship defining boundary lines between a continuously-variable shifting region and a step-variable shifting region, which relationship is used to map boundary lines defining the continuously-variable and step-variable shifting regions which are indicated by broken lines in FIG. 6.

Referring to FIG. 8, there is shown a switching boundary line map (switching control map) which is stored in the memory means 56 and which defines engine-output lines serving as boundary lines used by the switching control means 50 to determine whether the vehicle condition is in the step-variable or continuously-variable shifting region. These engine-output lines are defined by control parameters in the form of the engine speed $N_E$ and the engine torque NT. The switching control means 50 may use the switching boundary line map of FIG. 8 in place of the switching boundary line map of FIG. 6, to determine whether the vehicle condition is in the continuously-variable or step-variable shifting region, on the basis of the engine speed $N_E$ and engine torque $T_E$. The switching boundary line map of FIG. 6 may be based on the switching boundary line map of FIG. 8. In other words, the broken lines in FIG. 6 may be determined on the basis of the relation (map) of FIG. 8, in the two-dimensional coordinate system defined by the control parameters in the for of the vehicle speed V and the output torque $T_{OUT}$.

The step-variable shifting region defined by the switching boundary line map of FIG. 6 is defined as a high-torque drive region in which the output torque $T_{OUT}$ is not lower than the predetermined upper limit T1, or a high-speed drive region in which the vehicle speed V is not lower than the predetermined upper limit V1. Accordingly, the step-variable shifting control is implemented when the torque of the engine 8 is comparatively high or when the vehicle speed V is comparatively high, while the continuously-variable shifting control is implemented when the torque of the engine 8 is comparatively low or when the vehicle speed V is comparatively low, that is, when the engine 8 is in a normal output state.

Similarly, the step-variable shifting region defined by the switching boundary line map of FIG. 8 is defined as a high-torque drive region in which the engine torque $T_E$ is not lower than the predetermined upper limit TE1, or a high-speed drive region in which the engine speed $N_E$ is not lower than the predetermined upper limit NE1, or alternatively defined as a high-output drive region in which the output of the engine 8 calculated on the basis of the engine torque NT and speed $N_E$ is not lower than a predetermined limit. Accordingly, the step-variable shifting control is implemented when the torque $T_E$, speed $N_E$ or output of the engine 8 is comparatively high, while the continuously-variable shifting control is implemented when the torque $T_E$, speed $N_E$ or output of the engine 8 is comparatively low, that is, when the engine 8 is in the normal output state. The boundary lines of the switching boundary switching map of FIG. 8 may be considered as high-speed threshold lines or high-engine-output threshold lines, which define upper limit of the vehicle speed V or engine output.

In the present embodiment described above, the transmission mechanism 10 is placed in the continuously-variable shifting state in a low-speed or medium-speed running state of the vehicle or in a low-output or medium-output running state of the vehicle, for example, assuring a high degree of fuel economy of the vehicle. In a high-speed running of the vehicle at the vehicle speed V higher than the upper limit V1, the transmission mechanism 10 is placed in the step-variable shifting state in which the output of the engine 8 is transmitted to the drive wheels 38 primarily through the mechanical power transmitting path, so that the fuel economy is improved owing to reduction of a loss of conversion of the mechanical energy into the electric energy, which would take place when the differential portion 11 functions as the electrically controlled continuously variable transmission.

In a high-output running state of the vehicle with the output torque $T_{OUT}$ higher than the upper limit T1, too, the transmission mechanism 10 is placed in the step-variable shifting state. Therefore, the transmission mechanism 10 is placed in the continuously-variable shifting state only when the vehicle speed V is relatively low or medium or when the engine output is relatively low or medium, so that the required amount of electric energy generated by the first electric motor M1, that is, the maximum amount of electric energy that must be transmitted from the first electric motor M1 can be reduced, whereby the required electrical reaction force of the first electric motor M1 can be reduced, making it possible to minimize the required size of the first electric motor M1, and the required size of the drive system including the first electric motor M1.

Namely, the upper limit TE1 is determined such that the first electric motor M1 can withstand the reaction torque when the engine output $T_E$ is not higher than the upper limit TE1, and the differential portion 11 is placed in the step-variable shifting state when the vehicle is in the high-output running state in which the engine torque $T_E$ is higher than the upper limit TE1. In the step-variable shifting state of the transmission portion 11, therefore, the first electric motor M1 need not withstand the reaction torque with respect to the engine torque $T_E$ as in the continuously-variable shifting state of the transmission portion 11, making it possible to reduce deterioration of durability of the first electric motor M1 while preventing an increase of its required size. In other words, the required maximum output of the first electric motor M1 in the present embodiment can be made smaller than its reaction torque capacity corresponding to the maximum value of the engine output $T_E$. That is, the required maximum output of the first electric motor M1 can be determined such that its reaction torque capacity is smaller than a value corresponding to the engine torque $T_E$ exceeding the upper limit TE1, so that the first electric motor M1 can be small-sized.

The maximum output of the first electric motor M1 is a nominal rating of this motor which is determined by experimentation in the environment in which the motor is operated. The above-described upper limit of the engine torque $T_E$ is determined by experimentation such that the upper limit is a value which is equal to or lower than the maximum value of the engine torque $T_E$, and below which the first electric motor M1 can withstand the reaction torque, so that the deterioration of durability of the first electric motor M1 can be reduced.

Figure 9:
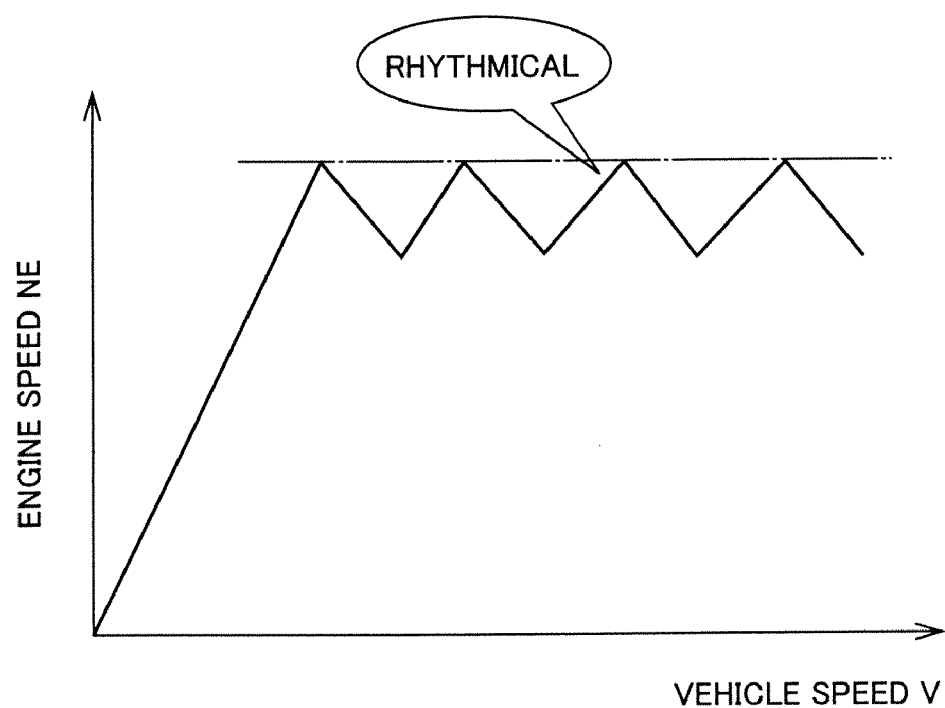
FIG. 9 is a view indicating an example of a change of the engine speed as a result of a shift-up action of the step-variable transmission.

According to the other concept, the transmission mechanism 10 is placed in the step-variable shifting state (fixed-speed-ratio shifting state), rather than in the continuously-variable shifting state, in the high-output running state of the vehicle in which the vehicle operator has a stronger desire for improved drivability of the vehicle rather than improved fuel economy. In this case, the engine speed $N_E$ changes with a shift-up action of the automatic transmission portion 20, assuring a comfortable rhythmic change of the engine speed $N_E$ as the transmission portion 20 is shifted up, as indicated in FIG. 9.

Figure 10:
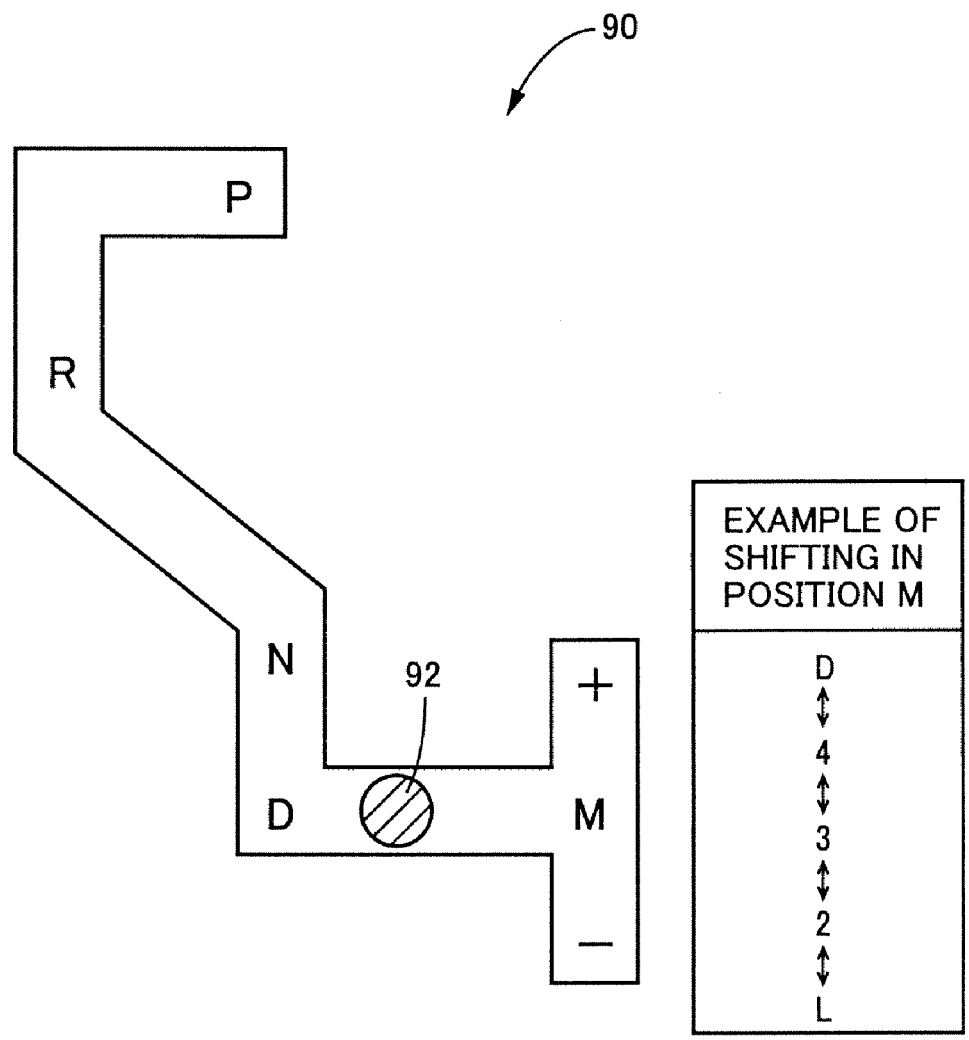
FIG. 10 is a view showing an example of a manually operated shifting device including a shift lever and operable to select one of a plurality of shift positions.

FIG. 10 shows an example of a manually operable shifting device in the form of a shifting device 90. The shifting device 90 includes the shift lever 92, which is disposed laterally adjacent to an operator's seat, for example, and which is manually operated to select one of a plurality of positions consisting of: a parking position P for placing the drive system 10 (namely, automatic transmission portion 20) in a neutral state in which a power transmitting path is disconnected with both of the switching clutch C0 and brake B0 placed in the released state, and at the same time the output shaft 22 of the automatic transmission portion 20 is in the locked state; a reverse-drive position R for driving the vehicle in the rearward direction; a neutral position N for placing the drive system 10 in the neutral state; an automatic forward-drive shifting position D; and a manual forward-drive shifting position M.

When the shift lever 92 is operated to a selected one of the shift positions, a manual valve incorporated in the hydraulic control unit 42 and operatively connected to the shift lever 92 is operated to establish the corresponding state of the hydraulic control unit 42. In the automatic forward-drive position D or the manual forward-drive position M, one of the first through fifth gear positions ($1^{st}$ through $5^{th}$) indicated in the table of FIG. 2 is established by electrically controlling the appropriate solenoid-operated valves incorporated in the hydraulic control unit 42.

The above-indicated parking position P and the neutral position N are non-drive positions selected when the vehicle is not driven, while the above-indicated reverse-drive position R, and the automatic and manual forward-drive positions D, M are drive positions selected when the vehicle is driven. In the non-drive positions P, N, the power transmitting path in the automatic transmission portion 20 is in the power-cut-off state established by releasing both of the clutches C1 and C2, as shown in the table of FIG. 2. In the drive positions R, D, M, the power transmitting path in the automatic transmission portion 20 is in the power-transmitting state established by engaging at least one of the clutches C1 and C2, as also shown in the table of FIG. 2.

Described in detail, a manual operation of the shift lever 92 from the parking position P or neutral position N to the reverse-drive position R causes the second clutch C2 to be engaged for switching the power transmitting path in the automatic transmission portion 20 from the power-cut-off state to the power-transmitting state. A manual operation of the shift lever 92 from the neutral position N to the automatic forward-drive position D causes at least the first clutch C1 to be engaged for switching the power transmitting path in the automatic transmission portion 20 from the power-cut-off state to the power-transmitting state. The automatic forward-drive position D provides a highest-speed position, and positions "4" through "L" selectable in the manual forward-drive position M are engine-braking positions in which an engine brake is applied to the vehicle.

The manual forward-drive position M is located at the same position as the automatic forward-drive position D in the longitudinal direction of the vehicle, and is spaced from or adjacent to the automatic forward-drive position D in the lateral direction of the vehicle. The shift lever 92 is operated to the manual forward-drive position M, for manually selecting one of the above-indicated positions "D" through "L". Described in detail, the shift lever 92 is movable from the manual forward-drive position M to a shift-up position "+" and a shift-down position "−", which are spaced from each other in the longitudinal direction of the vehicle. Each time the shift lever 92 is moved to the shift-up position "+" or the shift-down position "−", the presently selected position is changed by one position. The five positions "D" through "L" have respective different lower limits of a range in which the overall speed ratio γT of the transmission mechanism 10 is automatically variable, that is, respective different lowest values of the overall speed ratio γT which corresponds to the highest output speed of the transmission mechanism 10. Namely, the five positions "D" through "L" select respective different numbers of the speed positions (gear positions) of the automatic transmission portion 20 which are automatically selectable, so that the lowest overall speed ratio γT available is determined by the selected number of the gear positions. The shift lever 92 is biased by biasing means such as a spring so that the shift lever 92 is automatically returned from the shift-up position "+" and shift-down position "−" back to the manual forward-drive position M. The shifting device 46 is provided with a shift-position sensor (not shown) operable to detect the presently selected position of the shift lever 92, so that signals indicative of the presently selected operating position of the shift lever 48 and the number of shifting operations of the shift lever 92 in the manual forward-shifting position M.

When the shift lever 92 is operated to the automatic forward-drive position D, the switching control means 50 effects an automatic switching control of the transmission mechanism 10 according to the stored switching boundary line map indicated in FIG. 6, for example, and the hybrid control means 52 effects the continuously-variable shifting control of the power distributing mechanism 16, while the step-variable shifting control means 54 effects an automatic shifting control of the automatic transmission portion 20. When the transmission mechanism 10 is placed in the step-variable shifting state, for example, the shifting action of the transmission mechanism 10 is automatically controlled to select an appropriate one of the first through the fifth gear position indicated in FIG. 2. When the drive system is placed in the continuously-variable shifting state, the speed ratio of the power distributing mechanism 16 is continuously changed, while the shifting action of the automatic transmission portion 20 is automatically controlled to select an appropriate one of the first through fourth gear positions, so that the overall speed ratio γT of the transmission mechanism 10 is controlled so as to be continuously variable within the predetermined range. The automatic forward-drive position D is a position selected to establish an automatic shifting mode (automatic mode) in which the transmission mechanism 10 is automatically shifted.

When the shift lever 92 is operated to the manual forward-drive position M, on the other hand, the shifting action of the transmission mechanism 10 is automatically controlled by the switching control means 50, hybrid control means 52 and step-variable shifting control means 54, such that the overall speed ratio γT is variable within a predetermined range the lower limit of which is determined by the gear position having the lowest speed ratio, which gear position is determined by the manually selected one of the shift positions. When the transmission mechanism 10 is placed in the step-variable shifting state, for example, the shifting action of the transmission mechanism 10 is automatically controlled within the above-indicated predetermined range of the overall speed ratio γT. When the transmission mechanism 10 is placed in the step-variable shifting state, the speed ratio of the power distributing mechanism 16 is continuously changed, while the shifting action of the automatic transmission portion 20 is automatically controlled to select an appropriate one of the gear positions the number of which is determined by the manually selected one of the shift positions, so that the overall speed ratio γT of the transmission mechanism 10 is controlled so as to be continuously variable within the predetermined range. The manual forward-drive position M is a position selected to establish a manual shifting mode (manual mode) in which the selectable gear positions of the transmission mechanism 10 are manually selected.

As described above, the transmission mechanism 10 of the present embodiment is selectively switchable between the continuously-variable shifting state (differential state) and the step-variable shifting state (locked state), with the differential portion 11 being selectively switched to one of the continuously-variable and step-variable shifting states, under the control of the switching control means 50, on the basis of the vehicle condition. In the step-variable shifting state of the differential portion 11, the hybrid control means 52 cannot control the speed ratio of the differential portion 11 in synchronization with a shifting action of the automatic transmission portion 20, so as to reduce the amount of change of the engine speed $N_E$ due to the electric CVT function (differential function) of the differential portion 11 during the shifting action of the automatic transmission portion 20. Therefore, there is a risk of generation of a shifting shock upon a shifting action of the automatic transmission portion 20 while the differential portion 11 is placed in the step-variable shifting state.

In view of the above, the present embodiment is arranged to change the manner of controlling the shifting action of the transmission mechanism 10 depending upon whether the differential portion 11 is placed in the continuously-variable shifting state or not, so that the generation of the shifting shock is reduced during a shifting action of the automatic transmission portion 20, not only while the differential portion 11 is placed in the continuously-variable shifting state, but also while the differential portion 11 is placed in the step-variable shifting state.

Differential-state determining means 80 is operable upon determination of a shifting action of the automatic transmission portion 20 by the step-variable shifting control means 54, for example, upon determination of the gear position to which the automatic transmission portion 20 should be shifted according to the shifting map shown in FIG. 6 and on the basis of the vehicle condition. The differential-state determining means 80 is arranged to determine whether the power distributing mechanism 16 is placed in the differential state, that is, whether the differential portion 11 is placed in the continuously-variable shifting state, so that the shifting action of the transmission mechanism 10 is changed depending upon the state of the differential portion 11. For instance, the differential-state determining means 80 determines whether the differential portion 11 is placed in the continuously-variable shifting state, by determining whether the vehicle condition represented by the vehicle speed V and the output torque $T_{OUT}$ is in the continuously-variable shifting region. The determination as to whether the vehicle condition is in the continuously-variable shifting region is made according to the switching map shown in FIG. 6 by way of example, which is formulated to define the step-variable shifting region in which the transmission mechanism 10 should be switched to the step-variable shifting state, and the continuously-variable shifting region in which the transmission mechanism 10 should be shifted to the continuously-variable shifting state.

Shifting control means 82 is operable upon determination of a shifting action of the automatic transmission portion 20 by the step-variable shifting control means 54, to change the manner of controlling the shifting action of the transmission mechanism 10, depending upon the determination by the differential-state determining means 80 as to whether the differential portion 11 is placed in the continuously-variable shifting state or not.

Described in detail, the shifting control means 82 is configured to command the hybrid control means 52 to control the shifting action of the differential portion 11 in an inertia phase of the shifting action of the automatic transmission portion 20, so as to hold the engine speed $N_E$ substantially constant through the differential function of the differential portion 11 or its operation as the electrically controlled continuously variable transmission, when the differential-state determining means 80 has determined that the differential portion 11 is placed in the continuously-variable shifting state after the determination of the shifting action of the automatic transmission portion 20 by the step-variable shifting control means 54. For instance, the shifting control means 82 commands the hybrid control means 52 to change the speed ratio γ0 of the differential portion 11 in a direction opposite to the direction of change of the speed ratio γ of the automatic transmission portion 20, in the inertia phase of the shifting action of the automatic transmission portion 20, so as to hold the engine speed $N_E$ substantially constant.

Inertia-phase-entry determining means 84 is arranged to determine whether the automatic transmission portion 20 has entered the inertia phase in the process of its shifting action. This determination is made by determining whether a change of the rotating speed of the power transmitting member 18 (second electric motor M2) is initiated with initiation of transmission of a torque through a frictional coupling device to be engaged after a releasing action of another frictional coupling device for effecting the shifting action of the automatic transmission portion 20 under the control of the step-variable shifting control means 54.

For example, the inertial-phase-entry determining means 84 determines whether a change of the second electric motor speed $N_{M2}$ is initiated with initiation of transmission of a torque through the frictional coupling device in its engaging action in the process of the shifting action of the automatic transmission portion 20 under the control of the step-variable shifting control means 54. This determination is made by determining whether the amount of change of the actual rotating speed of the power transmitting member 18, that is, the second electric motor speed $N_{M2}$ has reached a predetermined value which is obtained by experimentation to make the determination as to whether the inertia phase of the shifting action is initiated. Alternatively, the determination is made by determining whether a predetermined time has passed after the moment of the determination of the shifting action by the step-variable shifting control means 54. This predetermined time is obtained by experimentation, as a length of time from the moment of the determination of the shifting action to the moment at which the frictional coupling device in the process of its engaging action begins to transmit a torque. Further alternatively, the determination is made by determining whether the transient hydraulic pressure (command value) applied to the frictional coupling device in its engaging action has reached a predetermined value $P_C$, which is obtained by experimentation, as the hydraulic pressure at which the frictional coupling device in its engaging action begins to transmit the torque.

When the differential-state determining means 80 has determined that the differential portion 11 is not placed in the continuously-variable shifting state, namely, that the differential portion 11 is placed in the non-continuously-variable shifting state, after the determination of the shifting action of the automatic transmission portion 20 by the step-variable shifting control means 54, the shifting control means 82 commands the hybrid control means 52 to positively change the engine speed $N_E$ by controlling the first electric motor M1 and/or the second electric motor M2, during the shifting action of the automatic transmission portion 20. According to the command from the shifting control means 2, the hybrid control means 52 positively changes the engine speed $N_E$ by controlling the first electric motor M1 and/or the second electric motor M2, such that a rate of change $N_E'$ (=dNE/dt) of the engine speed $N_E$ during the shifting action of the automatic transmission portion 20 approaches a target value $N_{Et}'$, for example.

In this manner, the rate of change $N_E'$ of the engine speed can be made closer to the target value $N_{Et}'$ in the present embodiment, than in the case where the engine speed $N_E$ is changed without the control by the shifting control means 82, according to a change of the vehicle speed V (speed of the drive wheels 38) in the process of the shifting action of the automatic transmission portion 20, even while the differential portion 11 is placed in the non-continuously-variable shifting state in which the engine speed $N_E$ is more difficult to be variable than in the continuously-variable shifting state in which the differential portion 11 performs the differential function. The target value $N_{Et}'$ is obtained by experimentation and stored in memory, as a value which provides a compromise between a high shifting response with a high value of the rate of change $N_{Et}'$ that is felt comfortable by the vehicle driver, and a low shifting response with a low value of the rate of change $N_{Et}'$ effective to reduce the shifting shock.

The shifting control means 82 is further configured to command the hybrid control means 52 to reduce a racing rise of the engine speed $N_E$ during the shifting action of the automatic transmission portion 20, by controlling the first electric motor M1 and/or the second electric motor M2, when the differential-state determining means 80 has determined that the differential portion 11 is not placed in the continuously-variable shifting state, after the determination of the shifting action of the automatic transmission portion 20 by the step-variable shifting control means 54. According to the command from the shifting control means 82, the hybrid control means 52 positively changes the engine speed $N_E$ by controlling the first electric motor M1 and/or the second electric motor M2, so as to reduce the racing rise of the engine speed $N_E$.

In this manner, the racing rise of the engine speed $N_E$ can be made smaller in the present embodiment, than in the case where the engine speed $N_E$ is changed without the control by the shifting control means 82, in the process of the shifting action of the automatic transmission portion 20, even while the differential portion 11 is placed in the non-continuously-variable shifting state in which the engine speed $N_E$ is more difficult to be variable than in the continuously-variable shifting state in which the differential portion 11 performs the differential function. For instance, the racing rise of the engine speed $N_E$ takes place at a moment of completion of a shift-up action of the automatic transmission portion 20, or in an insufficient overlapping state or light tie-up state of the two frictional coupling devices in the process of a shifting action of the automatic transmission portion 20.

The shifting control means 82 is further configured to command the step-variable shifting control means 54 to control the engaging pressure of the hydraulically operated frictional coupling device to be engaged to effect the relevant shifting action of the automatic transmission portion 20, such that the engaging pressure is higher when the differential-state determining means 80 has determined that the differential portion 11 is not placed in the continuously-variable shifting state, than when the differential-state determining means 80 has determined that the differential portion 11 is placed in the continuously-variable shifting state. According to the command from the shifting control means 82, the step-variable shifting control means 54 commands the hydraulic control unit 42 such that the engaging pressure of the hydraulically operated frictional coupling device to be engaged for effecting the relevant shifting action of the automatic transmission 20 is higher by a predetermined amount in the non-continuously-variable shifting state of the differential portion 11 than in the continuously-variable shifting state, for example.

In this manner, the hydraulically operated frictional coupling device in its engaging action in the process of the shifting action of the automatic transmission portion 20 has an adequate torque capacity even in the non-continuously-variable shifting state of the differential portion 11 in which the inertia during the shifting action of the automatic transmission portion 20 is larger due to a change of the engine speed $N_E$, that is, the inertial mass as viewed in the direction from the automatic transmission portion 20 toward the engine 8 during a change of the rotating speed of the power transmitting member 18 due to the shifting action of the automatic transmission portion 20 is larger, than in the continuously-variable shifting state of the differential portion 11 in which the amount of change of the engine speed $N_E$ due to the shifting action can be reduced by the differential function of the differential portion 11. The above-indicated predetermined amount of the engaging pressure of the hydraulically operated frictional coupling device in its engaging action is obtained by experimentation, as a value by which the engaging pressure in the non-continuously-variable shifting state of the differential portion 11 is higher than in the continuously-variable shifting state, and which assures an adequate value of the torque capacity of that frictional coupling device in the process of the shifting action of the automatic transmission portion 20 in the non-continuously-variable shifting state of the differential portion 11.

Torque-reduction control means 86 is arranged to reduce the vehicle drive torque to be transmitted to the drive wheels 38. For instance, the torque-reduction control means 86 is arranged to implement an engine torque reduction control to reduce the engine torque $T_E$, for thereby reducing the input torque $T_{IN}$ or output torque $T_{OUT}$ of the automatic transmission portion 20 to reduce the torque to be transmitted to the drive wheels 38. The engine torque reduction control is implemented by reducing the angle of opening of the electronic throttle valve 94 or the amount of fuel injection by the fuel injecting device 96, or retarding the timing of ignition of the engine 8 by the ignition device 98. The torque-reduction control means 86 may be arranged to implement an electric-motor torque reduction control in addition to or in place of the engine torque reduction control, for reducing the input torque $T_{IN}$. The electric-motor torque reduction control is implemented by controlling the inverter 58 to control the second electric motor M2, so as to temporarily generate a reverse vehicle drive torque, or generate a regenerative braking torque while charging the electric-energy storage device 60.

Where a shift-up action of the automatic transmission portion 20 takes place under the control of the step-variable shifting control means 54, for example, while the differential portion 11 (transmission mechanism 10) is placed in the step-variable shifting state by the switching control means 50 and the transmission mechanism 10 as a whole is functioning as a step-variable automatic transmission, the input speed of the automatic transmission portion 20, that is, the rotating speed of the power transmitting member 18 changes in the inertia phase of the shift-up action. In this inertia phase, there is a risk of generation of a shifting shock due to a so-called "inertia torque", which increases the input torque $T_{IN}$ or output torque $T_{OUT}$ due to an energy temporarily produced by the engine 8 while its speed $N_E$ is lowered. Where a shifting action of the automatic transmission portion 20 takes place under the control of the step-variable shifting control means 54, too, there is a risk of generation of a shifting shock due to the inertia torque in the inertia phase of the shifting action, which increases the torque transmitted to the drive wheels 38, due to a decrease of the rotating speed of the second rotary element RE2 or third rotary element RE3 of the differential portion 11, and/or a decrease of the rotating speed of at least one of the fourth through eighth rotary elements RE4-RE8 of the automatic transmission portion 20.

Where a shifting action of the automatic transmission portion 20 takes place under the control of the step-variable shifting control means 54 while the transmission mechanism 10 is placed in the continuously-variable shifting state by the switching control means 50 and the transmission mechanism 10 as a whole is functioning as a continuously variable transmission, the amount of change of the engine speed $N_E$ in the process of the shifting action of the differential portion 11 is zeroed or restricted by the control of the speed ratio of the differential portion 11 by the hybrid control means 52 so as to prevent a change of the overall speed ratio $\gamma T$ of the transmission mechanism 10 or to reduce a stepping change or assure a continuous change of the overall speed ratio $\gamma T$ during the shifting action of the automatic transmission portion 20. In this case, too, there is a risk of generation of a shifting shock due to the inertia torque in the inertia phase of the shifting action of the automatic transmission portion 20, which increases the torque transmitted to the drive wheels 38, due to a decrease of the rotating speed of the second rotary element RE2 or third rotary element RE3 of the differential portion 11, and/or a decrease of the rotating speed of at least one of the fourth through eighth rotary elements RE4-RE8 of the automatic transmission portion 20.

In this case, too, there is a risk of generation of a shifting shock due to an inertia torque generated in the inertia phase of the shifting action of the automatic transmission portion 20, which inertia torque increases the torque to be transmitted to the drive wheels 38 as a result of a decrease of the rotating speed of the second rotary element RE2 or third rotary element RE3 of the differential portion 11, and/or a decrease of the rotating speed of at least one of the fourth through eighth rotary elements RE4-RE8 of the automatic transmission portion 20.

In view of the facts described above, the torque-reduction control means 86 reduces the torque to be transmitted to the drive wheels 38, for example, the input torque $T_{IN}$ or output torque $T_{OUT}$ of the automatic transmission portion 20 upon a shifting action of the automatic transmission portion 20 under the control of the step-variable shifting control means 54. Described in detail, the torque-reduction control means 86 reduces the input torque $T_{IN}$ or output torque $T_{OUT}$ of the automatic transmission portion 20 by an amount corresponding to the inertia torque, by implementing the above-described engine torque reduction control or the electric-motor torque reduction control, or both of these two torque reduction controls, so that the shifting shock is reduced by offsetting the inertial torque with the reduction of the input torque $T_{IN}$ or output torque $T_{OUT}$. The reduction of the torque to be transmitted to the drive wheels 38 by the torque-reduction control means 86 is implemented in the inertial phase of the shifting action of the automatic transmission portion 20, like the above-described synchronous speed ratio control of the differential portion 11 by the hybrid control means 52.

The torque-reduction control means 86 is further arranged to reduce the torque to be transmitted to the drive wheels 38, for the purpose of offsetting a torque variation at the end of the engaging action of the frictional coupling device engaged to effect the shifting action of the automatic transmission portion 20 under the control of the step-variable shifting control means 54, so that an engaging shock of the frictional coupling device is reduced.

As described above, the shifting shock is reduced by the torque-reduction control means 86 arranged to reduce the input torque $T_{IN}$ so as to offset the inertia torque due to a change of the rotating speed of the rotary elements of the automatic transmission portion 20 during its shifting action, and the inertia torque due to a change of the rotating speed of the rotary elements of the differential portion 11, and/or so as to offset the torque variation at the end of the engaging action of the frictional coupling device engaged to effect the shifting action of the automatic transmission portion 20.

In the present embodiment, the hybrid control means 52 controls the speed ratio of the differential portion 11 to hold the engine speed $N_E$ substantially constant during the shifting action of the automatic transmission portion 20 under the control of the step-variable shifting control means 54 while the differential portion 11 is placed in the continuously-variable shifting state, so that the shifting shock is reduced, and the fuel economy is improved. Namely, the speed ratio of the differential portion 11 is initially controlled so as to hold the engine speed $N_E$ substantially constant for continuously changing the overall speed ratio γT, even while the target value of the overall speed ratio γT changes by a large amount before and after the shifting action of the automatic transmission portion 20. Subsequently, the speed ratio of the differential portion 11 is controlled so that the overall speed ratio γT changes toward the target value. However, the vehicle operator may desire a higher shifting response with a stepping (non-continuous) change of the overall speed ratio γT rather than a continuous change of the overall speed ratio γT.

Where the automatic transmission portion 20 is shifted as indicated by arrow "a" or "b" of solid line B in FIG. 6, as a result of a change of the vehicle speed V, the amount of change of the overall speed ratio γT before and after the shifting action of the automatic transmission portion 20 is small or almost zero. In this case, it is desirable to reduce the shifting shock and improve the fuel economy rather than to improve the shifting response. Where the automatic transmission portion 20 is shifted as indicated by arrow "c" or "d" of solid line C in FIG. 6, as a result of a change of the required output torque $T_{OUT}$ due to a depressing or releasing operation of the accelerator pedal, on the other hand, the amount of change of the overall speed ratio γT before and after the shifting action of the automatic transmission portion 20 is larger than in the case of the solid line B. In this case, it may be desirable to effect a stepping (non-continuous) change the overall speed ratio γT for thereby improving the shifting response rather than to effect a continuous change of the overall speed ratio γT for thereby reducing the shifting shock and improving the fuel economy.

Therefore, where the amount of change of the overall speed ratio γT before and after the shifting action of the automatic transmission portion 20 is large, the overall speed ratio γT is desirably changed non-continuously or in a stepping fashion. In other words, where the amount of change of the overall speed ratio γT before and after the shifting action of the automatic transmission portion 20 is large as a result of a depressing or releasing action of the accelerator pedal, the vehicle operator tends to feel comfortable with a stepping change of the overall speed ratio γT, a stepping change of the speed ratio γ of the automatic transmission portion 20 may be desirably utilized to effect the stepping change of the overall speed ratio γT.

Described in detail, the shifting control means 82 has not only the above-described function, but also an additional function of commanding the hybrid control means 52 to control the speed ratio of the differential portion 11 independently of a shifting action of the automatic transmission portion 20, for continuously changing the overall speed ratio γT toward the target value, where the amount of change of the overall speed ratio γT is large, when the differential-state determining means 80 has determined that the differential portion 11 is placed in the continuously-variable shifting state, after the determination of the shifting action of the automatic transmission portion 20 by the step-variable shifting control means 54. In this case, the stepping change of the speed ratio of the automatic transmission portion 20 is utilized, and the amount of change of the speed ratio of the differential portion 11 is added to (subtracted from) the amount of change of the speed ratio of the automatic transmission portion 20, so that the overall speed ratio γT changes toward the target value in the stepping fashion during the shifting action of the automatic transmission portion 20, whereby the shifting response is improved.

The amount of change of the overall speed ratio γT is large in the case of the shifting action indicated by the arrow "c" or "d" of solid line C of FIG. 6 as a result of the depressing or releasing operation of the accelerator pedal, in which the amount of change of the target value of the overall speed ratio γT is larger than a predetermined upper limit, and the actual value of the overall speed ratio γT has a non-continuous or stepping change. The predetermined upper limit is obtained by experimentation, as a value above which it is considered that the vehicle operator intended to have a non-continuous or stepping change of the target value of the overall speed ratio γT.

Figure 11:
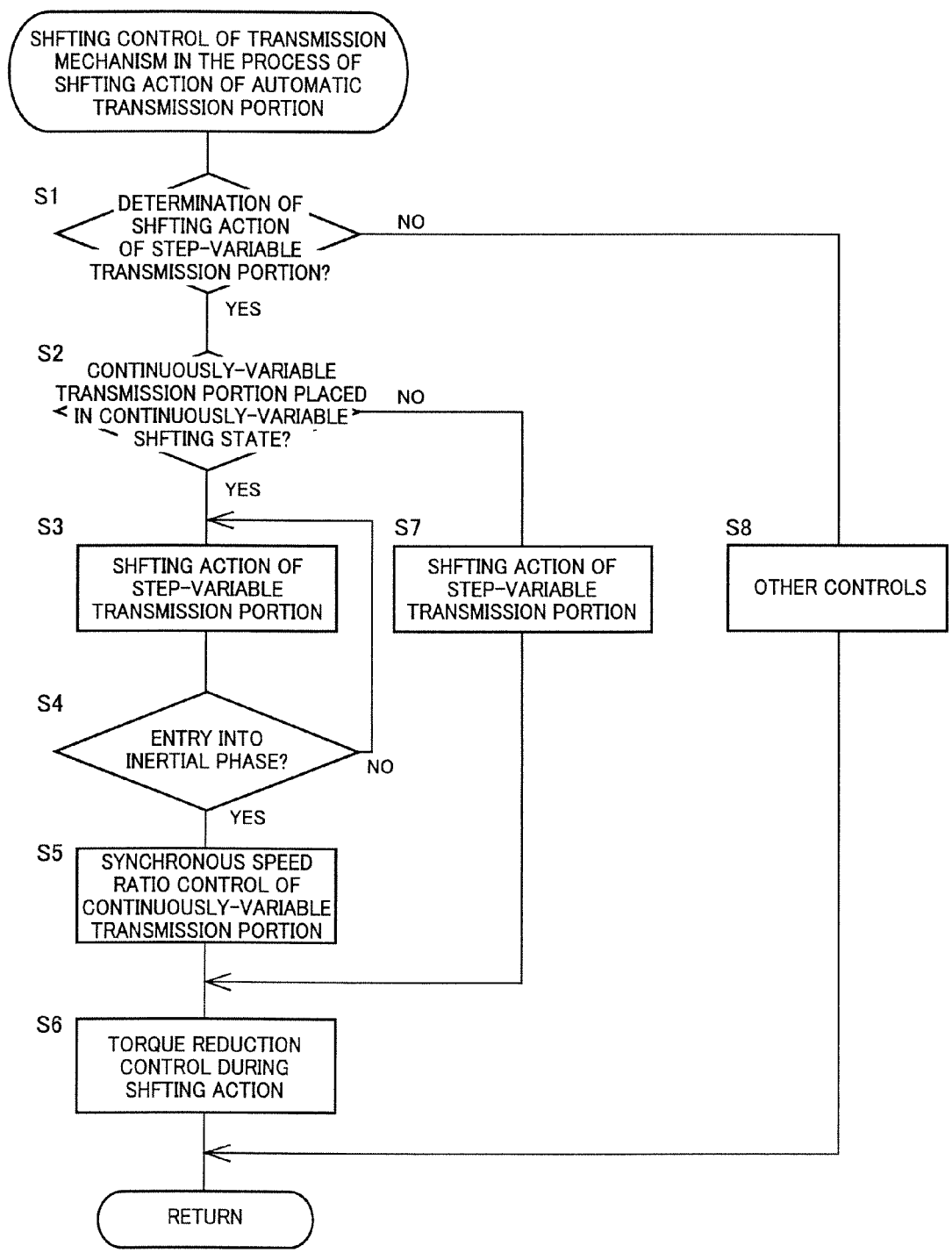
FIG. 11 is a flow chart illustrating a control operation of the electronic control device of FIG. 5, that is, a shifting control routine of the transmission mechanism upon a shifting action of the automatic transmission portion.

FIG. 11 is a flow chart illustrating a major portion of a control operation of the electronic control device 40, that is, a shifting control routine of the transmission mechanism 10 upon a shifting action of the automatic transmission portion 20. This shifting control routine is repeated executed with an extremely short cycle time of about several milliseconds to about several tens of milliseconds.

Figure 12:
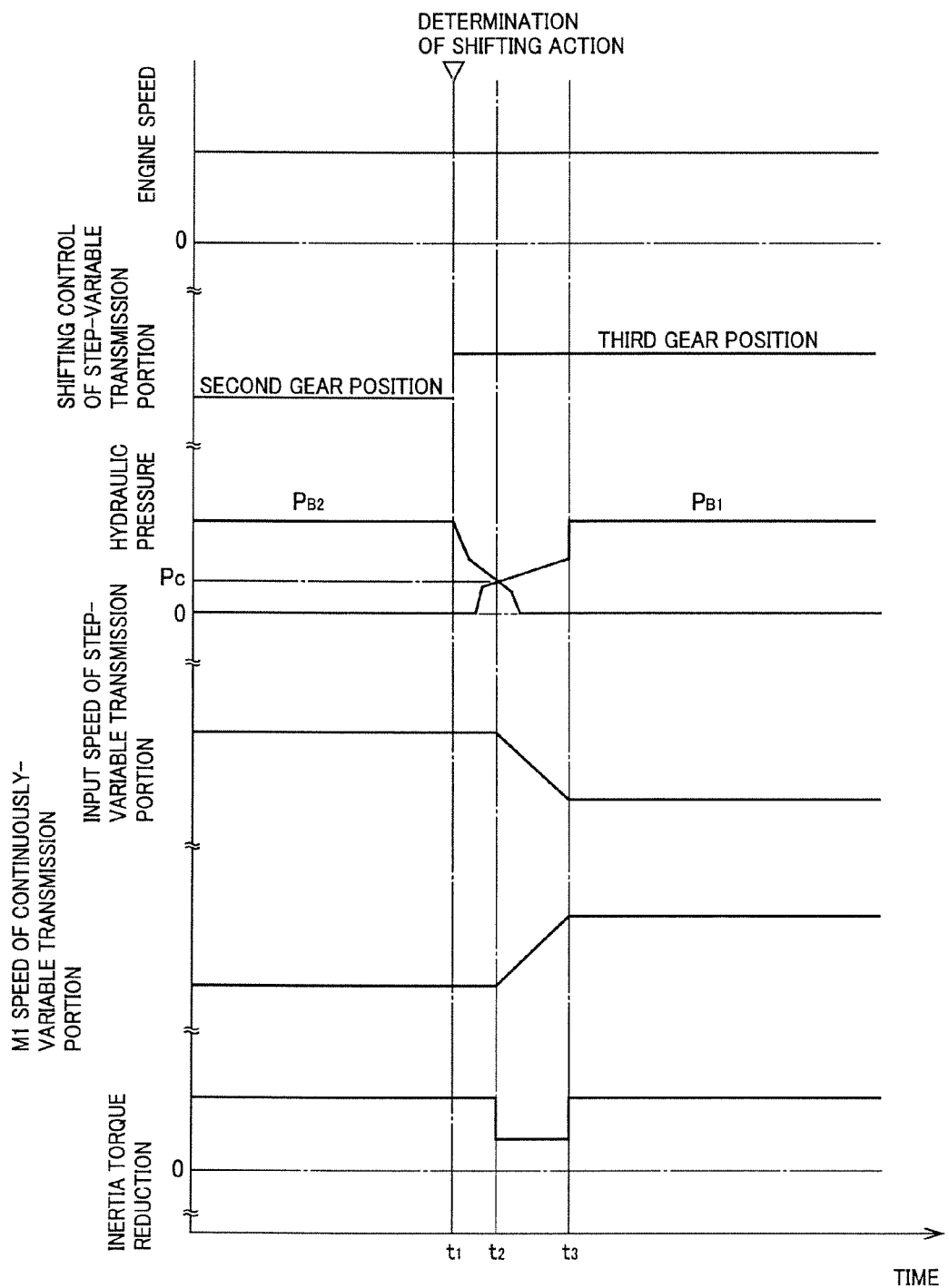
FIG. 12 is a time chart for explaining the control operation illustrated in the flow chart of FIG. 11, when the automatic transmission portion is commanded to effect a shift-up action from a second gear position to a third gear position while the differential portion is placed in a continuously-variable shifting state.

FIG. 12 is a time chart for explaining the control operation illustrated in the flow chart of FIG. 11, when the automatic transmission portion is commanded to effect a shift-up action from a second gear position to a third gear position while the differential portion is placed in a continuously-variable shifting state.

Figure 13:
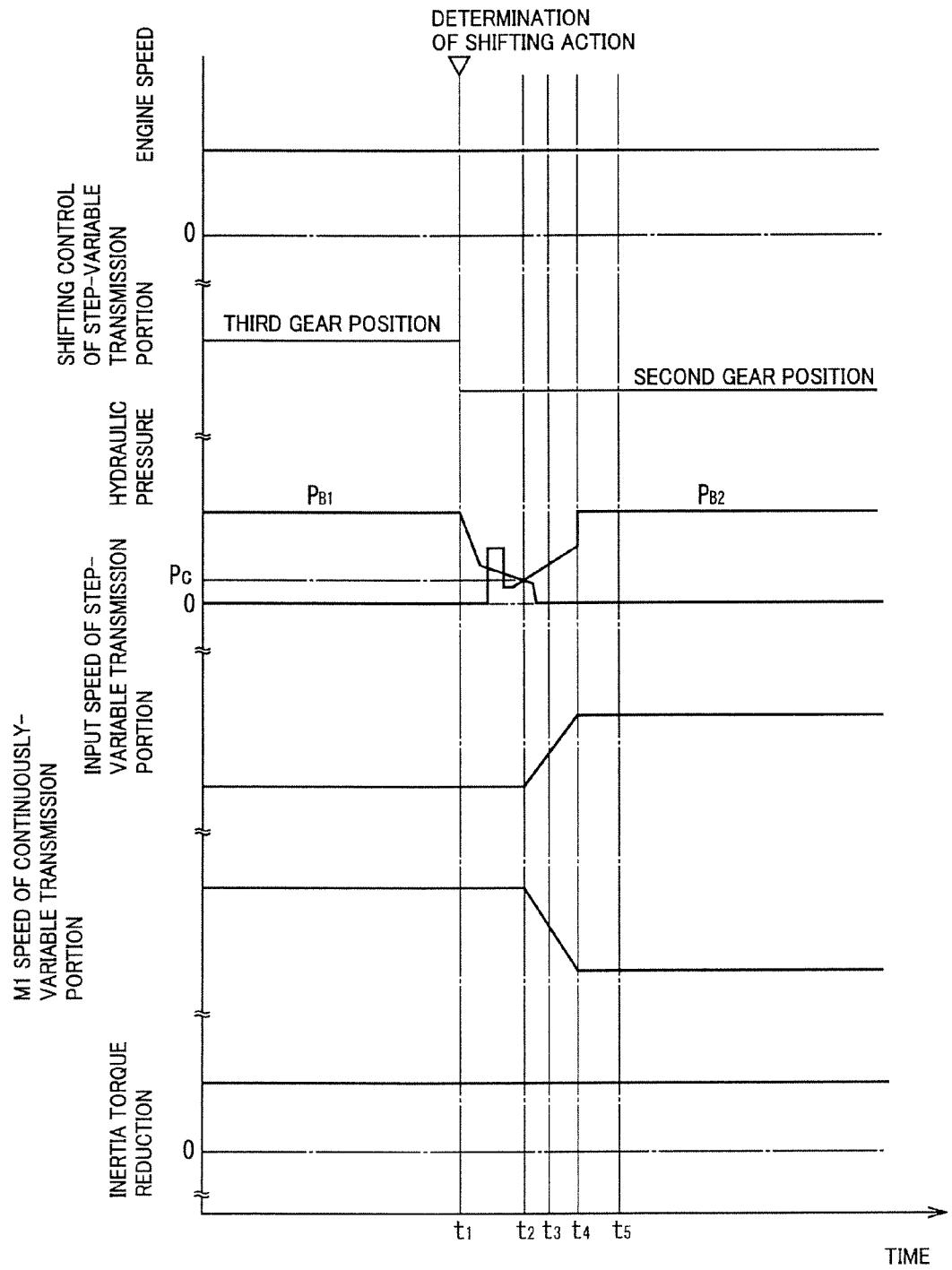
FIG. 13 is a time chart for explaining the control operation illustrated in the flow chart of FIG. 11, when the automatic transmission portion is commanded to effect a coasting shift-down action from the third gear position to the second third gear position while the differential portion is placed in the continuously-variable shifting state.

FIG. 13 is a time chart for explaining the control operation illustrated in the flow chart of FIG. 11, when the automatic transmission portion is commanded to effect a coasting shift-down action from the third gear position to the second third gear position while the differential portion is placed in the continuously-variable shifting state.

Figure 14:
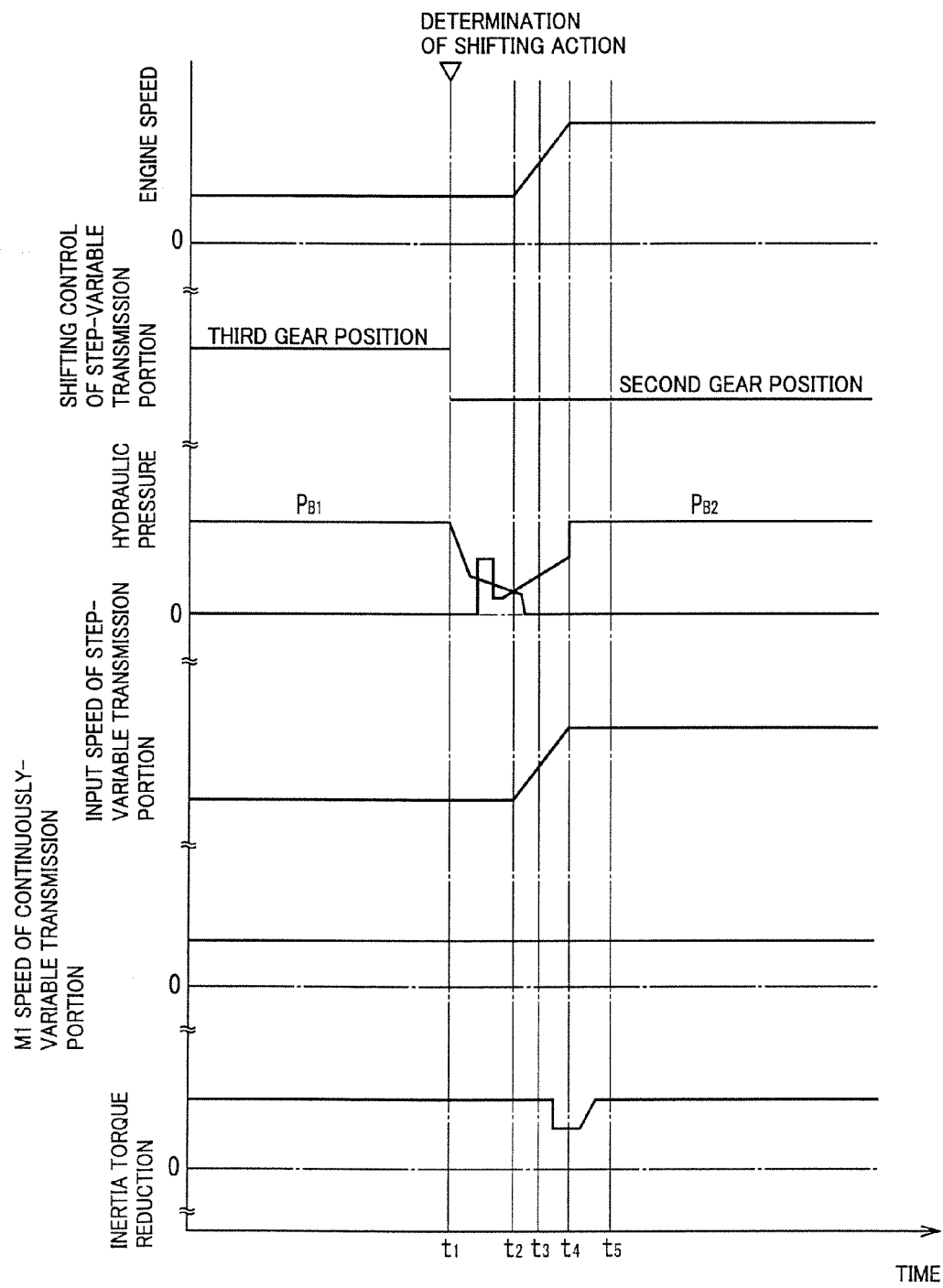
FIG. 14 is a time chart for explaining the control operation illustrated in the flow chart of FIG. 11, when the automatic transmission portion is commanded to effect a power-on shift-down action from the third gear position to the second gear position while the differential portion is placed in the continuously-variable shifting state.

FIG. 14 is a time chart for explaining the control operation illustrated in the flow chart of FIG. 11, when the automatic transmission portion is commanded to effect a power-on shift-down action from the third gear position to the second gear position while the differential portion is placed in the continuously-variable shifting state.

Figure 15:
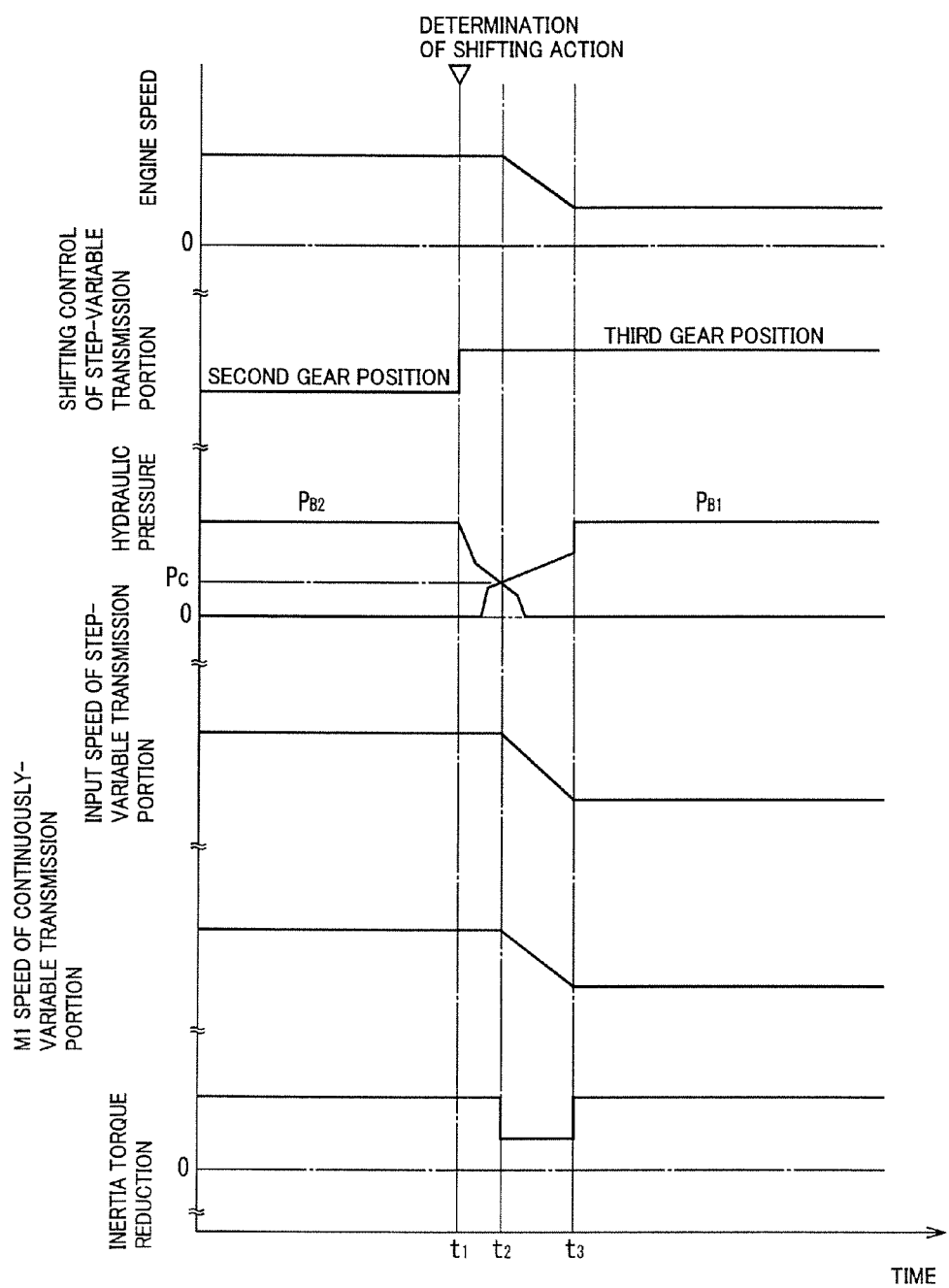
FIG. 15 is a time chart for explaining the control operation illustrated in the flow chart of FIG. 11, when the automatic transmission portion is commanded to effect a shift-up action from the second gear position to the third gear position while the differential portion placed in a locked state (step-variable shifting state).

FIG. 15 is a time chart for explaining the control operation illustrated in the flow chart of FIG. 11, when the automatic transmission portion is commanded to effect a shift-up action from the second gear position to the third gear position while the differential portion placed in a locked state (step-variable shifting state).

Figure 16:
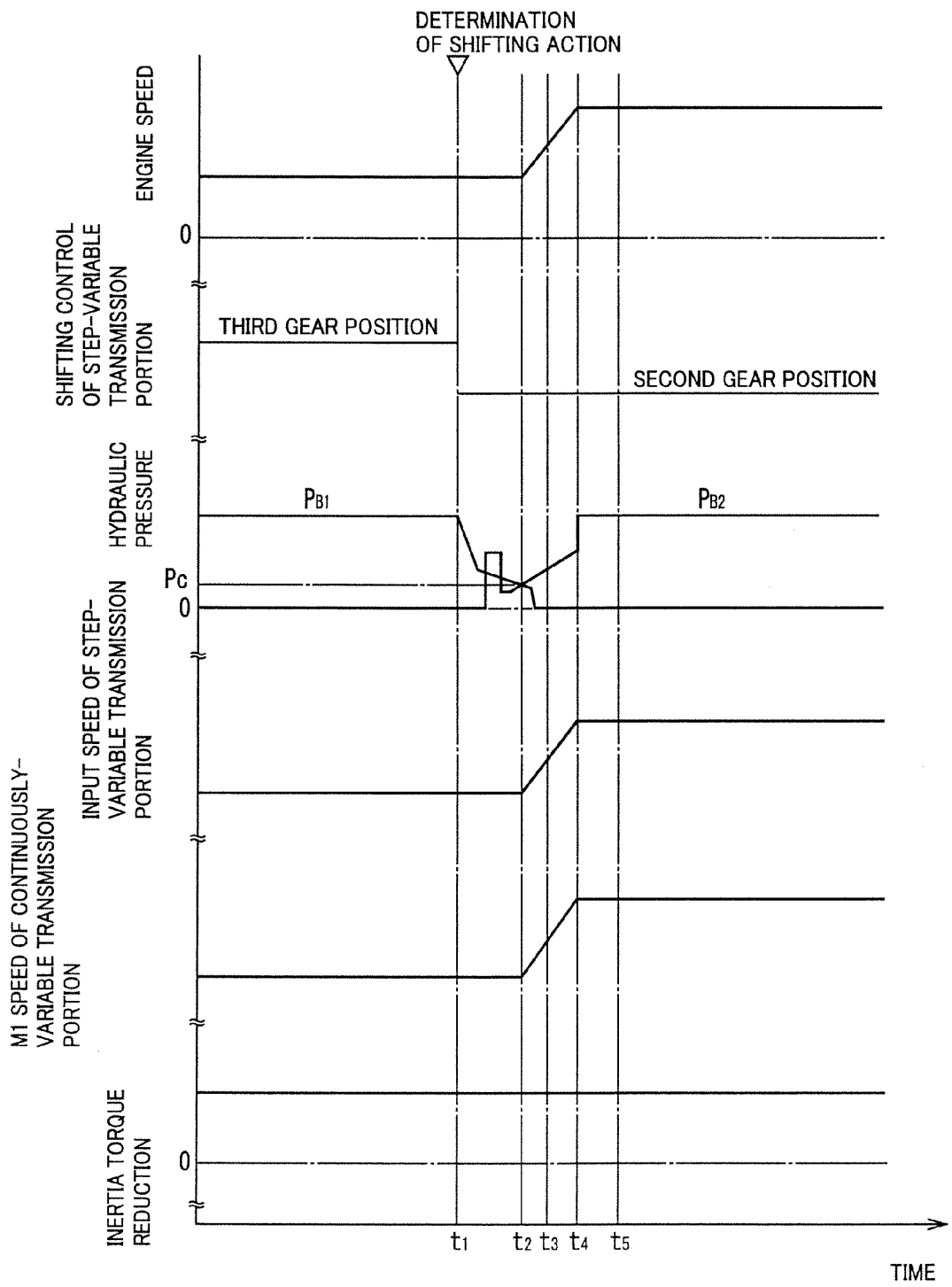
FIG. 16 is a time chart for explaining the control operation illustrated in the flow chart of FIG. 11, when the automatic transmission portion is commanded to effect a coasting shift-down action from the third gear position to the second gear position while the differential portion is placed in the locked state (step-variable shifting state).

FIG. 16 is a time chart for explaining the control operation illustrated in the flow chart of FIG. 11, when the automatic transmission portion is commanded to effect a coasting shift-down action from the third gear position to the second gear position while the differential portion is placed in the locked state (step-variable shifting state).

The shifting control routine is initiated with step S1 ("step" being hereinafter omitted) corresponding to the step-variable shifting control means 54, to determine whether a shifting action of the automatic transmission portion 20 should take place. For example, this determination is made by determining whether a gear position to which the automatic transmission portion 20 should be shifted has been determined according to the shifting map shown in FIG. 6 and on the basis of the vehicle condition represented by the vehicle speed V and the output torque $T_{OUT}$ of the automatic transmission portion 20.

In the examples of FIG. 12 and FIG. 15, the determination of the shift-up action of the automatic transmission portion 20 from the second gear position to the third gear position is made at a point of time t1. In the examples of FIG. 13, FIG. 14 and FIG. 16, the determination of the shift-down action of the automatic transmission portion 20 from the third gear position to the second gear position is made at a point of time t1.

If an affirmative decision is made in S1, the control flow goes to S2 corresponding to the differential-state determining means 80, to determine whether the power distributing mechanism 16 is placed in the differential state, that is, whether the differential portion 11 is placed in the continuously-variable shifting state. For example, this determination is made by determining whether the vehicle condition is in the continuously-variable shifting region which is defined by the switching map shown in FIG. 6 and in which the transmission mechanism 10 should be switched to the continuously-variable shifting state.

If a negative decision is obtained in S2, the control flow goes to S7 corresponding to the step-variable shifting control means 54, in which the shifting command is applied to the hydraulic control unit 42 to shift the automatic transmission portion 20 to the gear position determined in S1.

The above-indicated step S7 corresponds to the shifting control means 82, which is configured to command the hybrid control means 52 to positively change the engine speed $N_E$ by using the first electric motor M1 and/or the second electric motor M2, such that the rate of change $N_E'$ of the engine speed $N_E$ due to a shifting action of the automatic transmission portion 20 approaches the target value $N_{Et}'$. The shifting control means 82 is further configured to command the hybrid control means 52 to forcibly change the engine speed $N_E$ by using the first electric motor M1 and/or the second electric motor M2, so as to reduce the racing rise of the engine speed $N_E$ due to the shifting action of the automatic transmission portion 20. The shifting control means 82 is further configured to command the step-variable shifting control means 54 to control the engaging pressure of the hydraulically operated frictional coupling device in its engaging action for effecting the shifting action of the automatic transmission 20, such that the engaging pressure is higher by the predetermined amount in the step-variable shifting state of the differential portion 11, than in the continuously-variable shifting state, since the inertial during the shifting action is increased due to a change of the engine speed $N_E$.

At the point of time t1 in FIG. 15, the automatic transmission portion 20 is commanded to be shifted up to the third gear position while the differential portion 11 is held in its locked state, and the reduction of a hydraulic pressure $P_{B2}$ of the second brake B2 which is the frictional coupling device to be released is initiated. During a time period from the point of time t1 to a point of time t3, a hydraulic pressure $P_{B1}$ of the first brake B1 which is the frictional coupling device to be engaged is raised. At the point of time t3, the engaging action of the first brake B1 is completed, so that the shift-up action is terminated. In this example wherein the shift-up action is effected in the locked state of the differential portion 11, the transmission 10 as a whole functions as a step-variable transmission. Accordingly, the input speed $N_{IN}$ of the automatic transmission portion 20 (rotating speed of the power transmitting member 18) is lowered in the process of the shift-up action, and the engine speed $N_E$ is lowered in the process of the shift-up action, as indicated in FIG. 15, if the vehicle speed V is held constant. In the locked state of the differential portion 11 as in the case of FIG. 15, the positive change of the engine speed $N_E$ is initiated by using the first electric motor M1 and/or the second electric motor M2, at a point of time t2, that is, at the moment of initiation of the inertia phase, so that the rate of change $N_E'$ of the engine speed due to the shifting action of the automatic transmission portion 20 approaches the target value $N_{Et}'$. In the locked state of the differential portion 11 in which the inertia during the shifting action of the automatic transmission portion 20 is larger due to the change of the engine speed $N_E$ than in the differential state, the engaging pressure $P_{B1}$ is increased so as to absorb an increase of the inertia.

At the point of time t1 in FIG. 16, the automatic transmission portion 20 is commanded to be shifted down while the differential portion 11 is held in its locked state, and the reduction of the hydraulic pressure $P_{B1}$ of the first brake B1 which is the frictional coupling device to be released is initiated. During the time period from the point of time t1 to the point of time t3, the hydraulic pressure $P_{B2}$ of the second brake B2 which is the frictional coupling device to be engaged is raised. At the point of time t3, the engaging action of the second brake B2 is completed, so that the shift-down action is terminated. In this example wherein the shift-down action is effected in the locked state of the differential portion 11, the transmission mechanism 10 as a whole functions as a step-variable transmission. Accordingly, the input speed $N_{IN}$ of the automatic transmission portion 20 (rotating speed of the power transmitting member 18) is raised in the process of the shift-down action, and the engine speed $N_E$ is raised in the process of the shift-down action, as indicated in FIG. 16, if the vehicle speed V is held constant. In the locked state of the differential portion 11 in which the inertia during the shifting action of the automatic transmission portion 20 is larger due to the change of the engine speed $N_E$ than in the differential state, the engaging pressure $P_{B2}$ is increased so as to absorb an increase of the inertia. In the locked state of the differential portion 11 as in the case of FIG. 16, the positive change of the engine speed $N_E$ may be initiated by using the first electric motor M1 and/or the second electric motor M2, at a point of time t2, that is, at the moment of initiation of the inertia phase, so that the rate of change $N_E'$ of the engine speed due to the shifting action of the automatic transmission portion 20 approaches the target value $N_{Et}'$. For instance, the engine speed $N_E$ may be forcibly changed toward the value at the completion of the shifting action, by using the first electric motor M1 and/or the second electric motor M2, in synchronization with the inertia phase. Where this synchronous control of the engine speed $N_E$ is implemented, the engaging pressure $P_{B2}$ may be made lower than where the synchronous control is not implemented.

If an affirmative decision is obtained in S2, the control flow goes to S3 corresponding to the step-variable shifting control portion 54, in which the shifting command is applied to the hydraulic control unit 42 to shift the automatic transmission portion 20 to the gear position determined in S1.

At the point of time t1 in FIG. 12, the automatic transmission portion 20 is commanded to be shifted up to the third gear position, and the reduction of the hydraulic pressure $P_{B2}$ of the second brake B2 which is the frictional coupling device to be released is initiated. During the time period from the point of time t1 to the point of time t3, the hydraulic pressure $P_{B1}$ of the first brake B1 which is the frictional coupling device to be engaged is raised. At the point of time t3, the engaging action of the first brake B1 is completed, so that the shift-up action of the automatic transmission portion 20 is terminated.

At the point of time t1 in FIG. 13, the automatic transmission portion 20 is commanded to be shifted down to the second gear position, and the reduction of the hydraulic pressure $P_{B1}$ of the first brake B1 which is the frictional coupling device to be released is initiated. During the time period from the point of time t1 to the point of time t4, the hydraulic pressure $P_{B2}$ of the second brake B2 which is the frictional coupling device to be engaged is raised. At the point of time t4, the engaging action of the second brake B2 is completed, so that the shift-down action of the automatic transmission portion 20 is terminated.

The control flow then goes to S4 corresponding to the inertia-phase-entry determining means 84, to determine whether the automatic transmission portion 20 has entered the inertia-phase in the process of the shifting action. For example, the inertial-phase-entry determining means 84 determines whether the amount of change of the actual second electric motor speed $N_{M2}$ has reached a predetermined value which is obtained by experimentation to make the determination as to whether the inertia phase of the shifting action is initiated. Alternatively, the determination is made by determining whether the predetermined time has passed after the moment of the determination of the shifting action. This predetermined time is obtained by experimentation, as a length of time from the moment of the determination of the shifting action to the moment at which the frictional coupling device in the process of its engaging action begins to transmit a torque. Further alternatively, the determination is made by determining whether the transient hydraulic pressure (command value) applied to the frictional coupling device in its engaging action has reached the predetermined value $P_C$, which is obtained by experimentation, as the hydraulic pressure at which the frictional coupling device in its engaging action begins to transmit the torque.

At the point of time t2 in FIGS. 12 and 13, the entry of the automatic transmission portion 20 into the inertia phase has been determined, by confirming: that the amount of change of the actual second electric motor speed $N_{M2}$ has reached the predetermined value obtained by experimentation to make the determination as to whether the inertia phase is initiated; that the predetermined time obtained by experimentation to determine whether the frictional coupling device in the process of its engaging action begins to transmit a torque; or that the transient hydraulic pressure (command value) applied to the frictional coupling device in its engaging action has reached the predetermined value $P_C$ obtained by experimentation as the hydraulic pressure at which the frictional coupling device in its engaging action begins to transmit the torque. In the example of FIG. 13, the frictional coupling device in the engaging action is the first brake B1, and the hydraulic pressure $P_{B1}$ of this first brake B1 is checked. In the example of FIG. 14, the frictional coupling device in the engaging action is the second brake B2, and the hydraulic pressure $P_{B2}$ of this second brake B2 is checked.

If a negative decision is obtained in S4, this step S4 is repeatedly implemented. When an affirmative decision is obtained in S4, the control flow goes to S5 corresponding to the shifting control means 82, in which the hybrid control means 52 is commanded to change the speed ratio γ0 of the differential portion 11 in the direction opposite to the direction of change of the speed ratio γ of the automatic transmission portion 20, so that the engine speed $N_E$ is held substantially constant owing to the differential function or electric continuously shifting action of the differential portion 11. These steps S3-S5 are implemented to continuously change the overall speed ratio γT of the transmission mechanism 10 during the shifting action of the automatic transmission portion 20. The step S5 may be formulated also to determine whether the automatic transmission portion 20 has entered the inertia phase. In this case, the step S4 is eliminated.

During a time period from the point of time t2 to the point of time t3 in FIG. 12, or during a time period from the point of time t2 to the point of time t4 in FIG. 13, the speed ratio of the differential portion 11 is changed in the direction opposite to the direction of the stepping change of the speed ratio of the automatic transmission portion 20 as a result of the shifting action, by an amount equal to the amount of change of the speed ratio of the automatic transmission portion 20, by controlling the first electric motor speed $N_{M1}$ through the differential function of the differential portion 11, during the inertia phase of the automatic transmission portion 20, for the purpose of preventing a change of the overall speed ratio γT of the transmission mechanism 10, namely, to hold the engine speed $N_E$ substantially constant, during the shifting action of the automatic transmission portion 20.

In the above-indicated steps S3-S5, the overall speed ratio γT of the transmission mechanism 10 is continuously changed during the shifting action of the automatic transmission portion 20. Where the amount of change of the target value of the overall speed ratio γT is larger than the predetermined upper limit, as in the case of a large amount of depressing operation of the accelerator pedal as indicated by arrow "c" or "d" of the solid line C in FIG. 6, the speed ratio of the differential portion 11 may be controlled such that the overall speed ratio γT is changed non-continuously or in a stepping fashion. In this case, the above-indicated step S4 for controlling the differential portion 11 in synchronization with the shifting action of the automatic transmission portion 20 need not be implemented, and the steps S3 and S5 are implemented independently of each other, such that the differential portion 11 is controlled in step S5 to change the overall speed ratio γT toward the target value.

At the point of time t1 in FIG. 14, the automatic transmission portion 20 is commanded to be shifted down to the second gear position, and the reduction of the hydraulic pressure $P_{B1}$ of the first brake B1 which is the frictional coupling device to be released is initiated. During the time period from the point of time t1 to the point of time t4, the hydraulic pressure $P_{B2}$ of the second brake B2 which is the frictional coupling device to be engaged is raised. At the point of time t4, the engaging action of the second brake B2 is completed, so that the shift-down action of the automatic transmission portion 20 is terminated. The present example of FIG. 14 is different from the examples of FIGS. 12 and 13 in that the shifting action of the differential portion 11 is not controlled to hold the engine speed $N_E$ substantially constant in the inertia phase of the shifting action of the automatic transmission portion 20 initiated at the point of time t2. Accordingly, the input speed of the automatic transmission portion 20 (rotating speed of the power transmitting member 18) is raised during the shift-down action of the automatic transmission portion 20, and the engine speed $N_E$ is accordingly raised. The differential portion 11 is controlled by using at least the first electric motor M1, such that the overall speed ratio γT eventually coincides with the target value, through the differential function of the differential portion 11. Thus, the shifting action of the differential portion 11 is controlled to change the overall speed ratio γT in the stepping fashion or non-continuously toward the target value, that is, to establish the engine speed $N_E$ after completion of the shifting action, without synchronization with the shifting action of the automatic transmission 20, whereby the shifting response is improved.

During the shifting action in S3 and S5 and the shifting action in S7, the torque reduction control to reduce the torque to be transmitted to the drive wheels 38, for example, to reduce the input torque $T_{IN}$ or output torque $T_{OUT}$ of the automatic transmission portion 20 is implemented in S6 which corresponds to the torque-reduction control means 86.

An inertia torque generated as a result of a decrease of the rotating speed of the rotary elements of the automatic transmission portion 20 or a decrease of the rotating speed of the rotary element of the differential portion 11, for example, increases the torque to be transmitted to the drive wheels 38, for example, an increase of the output torque $T_{OUT}$. Alternatively, an inertia torque which increases the torque to be transmitted to the drive wheels 38 is generated due to a decrease of the engine speed $N_E$ during a shift-up action of the automatic transmission portion 20. Alternatively, there is a risk of generation of an engaging shock of the frictional coupling device due to a torque variation at the end of the engaging action of the frictional coupling device engaged to effect the shifting action of the automatic transmission portion 20. In view of these facts, the step S6 is implemented to reduce the input torque $T_{IN}$ or output torque $T_{OUT}$ of the automatic transmission portion 20 for offsetting or absorbing the above-indicted inertia torque to some extent, or for offsetting the toque variation to some extent to reduce the engaging shock of the frictional coupling device. For example, the torque to be transmitted to the drive wheels 38 is reduced by implementing the engine torque reduction control to reduce the engine torque $T_E$, or the electric motor torque reduction control using the second electric motor M2. However, the torque reduction control in S6 need not be implemented during deceleration of the vehicle without an operation of the accelerator pedal, that is, during a coasting shift-down of the automatic transmission portion 20.

During a time period from the point of time t2 to the point of time t3 in FIG. 12 wherein the change of the engine speed $N_E$ during the shifting action of the automatic transmission portion 20 is restricted, the torque reduction control is implemented to offset to some extent the inertia torque which is generated as a result of a change of the rotating speed of the rotary element or elements of the automatic transmission portion 20 or a change of the rotating speed of the rotary element of the differential portion 11, and which increases the torque to be transmitted to the drive wheels 38.

In the example of FIG. 13 wherein the coasting shift-down action of the automatic transmission portion 20 takes place, the torque reduction control is not implemented. In the case of a shift-down action of the automatic transmission portion 20 which causes a torque to be transmitted to the drive wheels 38, however, the torque reduction control to offset the inertia torque may be implemented, as in the case of FIG. 12.

During a time period from the point of time t3 to the point of time t5 in FIG. 14 wherein the power-on shift-down action of the automatic transmission portion 20 takes place, the input torque $T_{IN}$ is reduced in a terminal portion of the shift-down action, for reducing a shifting shock by offsetting to some extent the torque variation that is caused at the end of the engaging action of the frictional coupling device (or that would be caused by locking of a one-way clutch not provided in this embodiment, if this one-way clutch were provided).

During a time period from the point of time t2 to the point of time t3 in FIG. 15, the torque reduction control is implemented to offset to some extent the inertia torque which is generated as a result of a change of the engine speed $N_E$, a change of the rotating speed of the rotary element or elements of the automatic transmission portion 20 or a change of the rotating speed of the rotary element of the differential portion 11, and which increases the torque to be transmitted to the drive wheels 38.

In the example of FIG. 16 wherein the coasting shift-down action of the automatic transmission portion 20 takes place, the torque reduction control is not implemented. In the case of a shift-down action of the automatic transmission portion 20 that causes a torque to be transmitted to the drive wheels 38, however, the torque reduction control to offset the inertia torque may be implemented, as in the case of FIG. 15.

If a negative determination is obtained in S1, the control flow goes to S8 in which control operations by various control means of the control device 40 not associated with a shifting action of the automatic transmission portion 20 are implemented, or the present control routine is terminated. When the transmission mechanism 10 is placed in the continuously-variable shifting state, the shifting action of the differential portion 11 is controlled by the hybrid control means 52 on the basis of the vehicle condition.

In the present embodiment described above, the manner of controlling the shifting action of the transmission mechanism 10 during the shifting action of the automatic transmission portion 20 is changed by the shifting control means 82, depending upon whether the differential portion 11 is placed in the continuously-variable shifting state or not. Accordingly, the shifting shock of the transmission mechanism 10 can be reduced by controlling the amount of change of the engine speed $N_E$ during the shifting action of the automatic transmission portion 20 depending upon whether the differential portion 11 is placed in the continuously-variable shifting state in which the engine speed can be changed owing to its differential function (its operation as the electrically controlled continuously variable transmission) irrespective of the rotating speed of the power transmitting member 18 determined by the vehicle speed V, or in the non-continuously-variable shifting state in which the engine speed $N_E$ is more difficult to be variable than in the continuously-variable shifting state.

The present embodiment is further arranged such that the shifting control means 82 controls the shifting action of the differential portion 11 in the inertia phase of the shifting action of the automatic transmission portion 20 in the continuously-variable shifting state of the differential portion 11, so as to reduce the amount of change of the engine speed $N_E$, for example, so as to hold the engine speed $N_E$ substantially constant, through the differential function of the differential portion 11. Accordingly, the amount of change of the engine speed $N_E$ is reduced in the process of the shifting action of the automatic transmission portion 20, even when the speed ratio γ of the automatic transmission portion 20 is changed due to its shifting action, so that the shifting shock is reduced. Further, the transmission mechanism 10 can function as a continuously variable transmission, so that the fuel economy is improved.

The present embodiment is also arranged such that the shifting control means 82 changes the speed ratio γ0 of the differential portion 11 in the direction opposite to the direction of change of the speed ratio γ of the automatic transmission portion 20, so as to hold the engine speed $N_E$ substantially constant. Accordingly, an amount of change of the overall speed ratio γT determined by the speed ratio γ0 of the differential portion 11 and the speed ratio γ of the automatic transmission portion can be reduced, so that the amount of change of the engine speed $N_E$ is reduced.

The present embodiment is further arranged such that the shifting control means 82 positively change the engine speed $N_E$ during the shifting action of the automatic transmission portion 29, in the non-continuously-variable shifting state of the differential portion 11, by using the first electric motor M1 and/or the second electric motor M2. Accordingly, the rate of change NEt of the engine speed can be made closer to a target value $N_{Et}'$ than in the case where the engine speed $N_E$ is changed without the control by the shifting control means 82, even while the differential portion 11 is placed in the non-continuously-variable shifting state in which the engine speed $N_E$ is more difficult to be variable than in the continuously-variable shifting state.

The present embodiment is further arranged such that the shifting control means 82 reduces the racing rise of the engine speed $N_E$ due to the shifting action of the automatic transmission portion 20, in the continuously-variable shifting state of the differential portion 11, by using the first electric motor M1 and/or the second electric motor M2. Accordingly, the racing rise of the engine speed $N_E$ can be made smaller in the present embodiment, than in the case where the engine speed $N_E$ is changed without the control by the shifting control means 82, in the process of the shifting action of the automatic transmission portion 20, even while the differential portion 11 is placed in the non-continuously-variable shifting state in which the engine speed $N_E$ is more difficult to be variable than in the continuously-variable shifting state. Thus, the shifting shock is reduced.

The present embodiment is further arranged such that the shifting control means 82 controls the engaging pressure of the frictional coupling device in its engaging action during the shifting action of the automatic transmission portion 20 such that the engaging pressure is higher when the differential portion 11 is placed in the non-continuously-variable shifting state than when the differential portion 11 is placed in the continuously-variable shifting state. In this case, the frictional coupling device in its engaging action in the process of the shifting action of the automatic transmission portion 20 has an adequate torque capacity even in the non-continuously-variable shifting state of the differential portion 11 in which the inertia during the shifting action of the automatic transmission portion 20 is larger due to a change of the engine speed $N_E$ than in the continuously-variable shifting state of the differential portion 11 in which the amount of change of the engine speed $N_E$ due to the shifting action can be reduced.

The present embodiment is further arranged such that the torque-reduction control means 86 reduces the torque to be transmitted to the drive wheels 38 during the shifting action of the automatic transmission portion 20, so as to offset the inertia torque generated as a result of a change of the rotating speed of the rotary element of the automatic transmission portion 20 or a change of the rotating speed of the rotary element of the differential portion 11, whereby the shifting shock is reduced.

In the present embodiment wherein the automatic transmission portion 20 is a step-variable automatic transmission, the overall speed ratio γT of the transmission mechanism 10 is changed in steps as a result of a shifting action of the automatic transmission portion 20, so that the overall speed ratio γT is more rapidly changed in a stepping fashion, than when the overall speed ratio is changed continuously. Thus, the transmission mechanism 10 is not only able to function as a continuously variable transmission which permits a smooth change of the vehicle drive torque, but also permits a stepping change of the overall speed ratio γT and a rapid change of the vehicle drive torque.

The other embodiments of the present invention will be described. In the following descriptions, the same reference as used in the preceding embodiment signs will be used to identify the corresponding elements which will not be described.

Embodiment 2

Figures 17, 18:
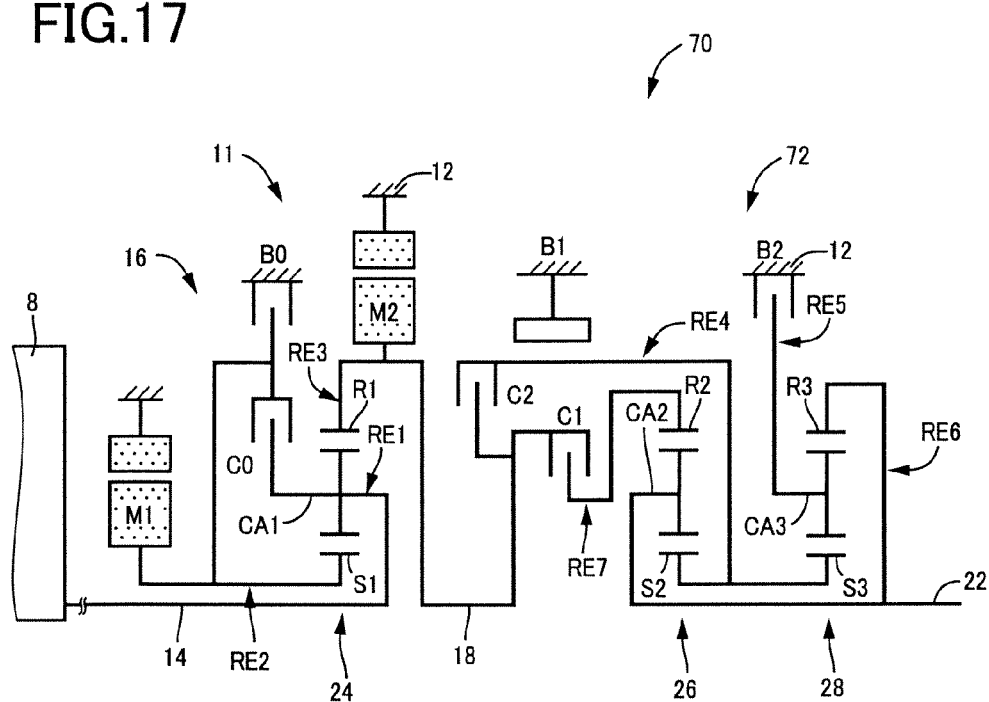
FIG. 17 is a schematic view corresponding to that of FIG. 1, showing an arrangement of another hybrid vehicle drive system according to another embodiment of the present invention.
FIG. 18 is a table corresponding to that of FIG. 2, indicating shifting actions of the hybrid vehicle drive system of FIG. 17, which is operable in a selected one of the continuously-variable and step-variable shifting states, in relation to different combinations of operating states of hydraulically operated frictional coupling devices to effect the respective shifting actions.
Figure 19:
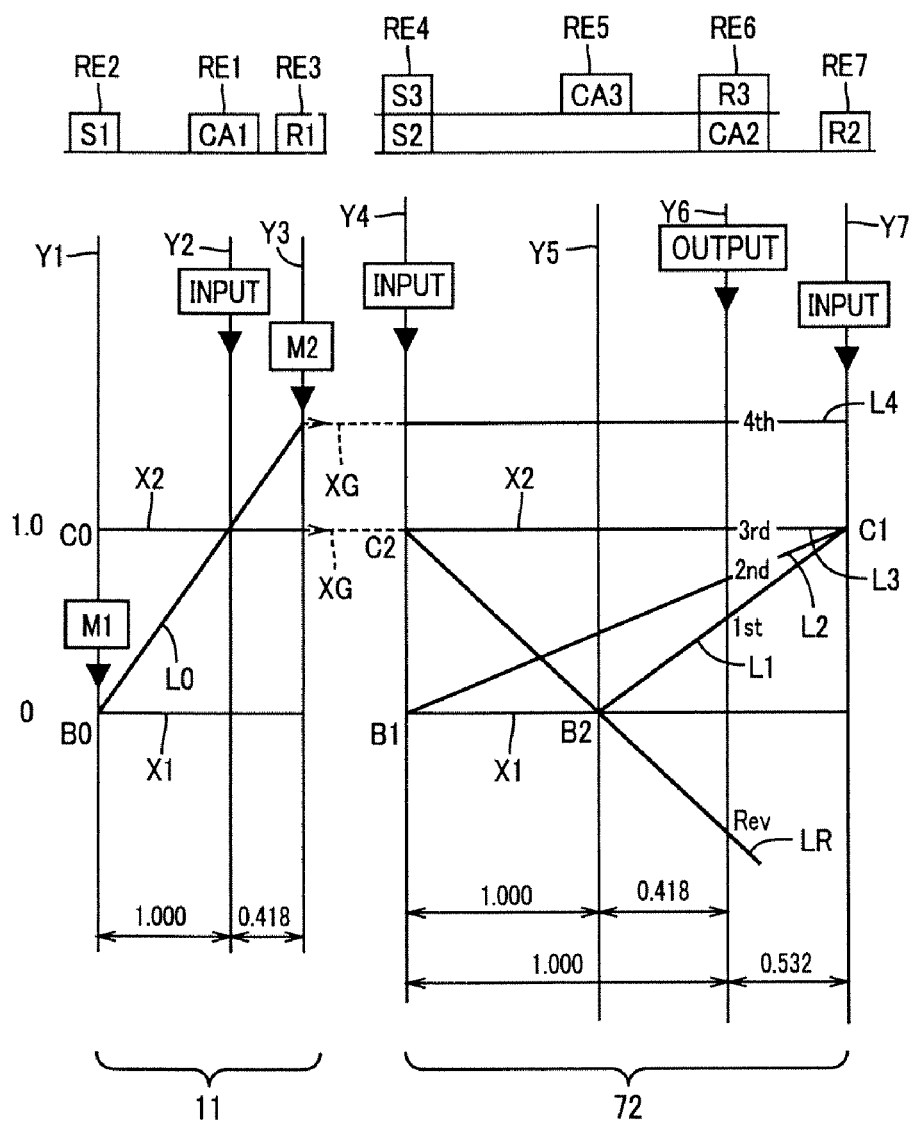
FIG. 19 is a collinear chart corresponding to that of FIG. 3, indicating relative rotating speeds of the rotary elements of the hybrid vehicle drive system of FIG. 17 in the step-variable shifting state, in the different gear positions.

FIG. 17 is a schematic view for explaining an arrangement of a transmission mechanism 70 in another embodiment of this invention, and FIG. 18 a table indicating a relationship between the gear positions of the transmission mechanism 70 and different combinations of engaged states of the hydraulically operated frictional coupling devices for respectively establishing those gear positions, while FIG. 19 is a collinear chart for explaining a shifting operation of the transmission mechanism 70.

The transmission mechanism 70 includes the differential portion 11 having the first electric motor M1, power distributing mechanism 16 and second electric motor M2, as in the preceding embodiment. The transmission mechanism 70 further includes an automatic transmission portion 72 having three forward drive positions. The automatic transmission portion 72 is disposed between the differential portion 11 and the output shaft 22 and is connected in series to the differential portion 11 and output shaft 22 through the power transmitting member 18. The power distributing mechanism 16 includes the single-pinion type first planetary gear set 24 having a gear ratio ρ1 of about 0.418, for example, and the switching clutch C0 and the switching brake B0. The automatic transmission portion 72 includes the single-pinion type second planetary gear set 26 having a gear ratio ρ2 of about 0.532, for example, and the single-pinion type third planetary gear set 28 having a gear ratio ρ3 of about 0.418, for example. The second sun gear S2 of the second planetary gear set 26 and the third sun gear S3 of the third planetary gear set 28 are integrally fixed to each other as a unit, selectively connected to the power transmitting member 18 through the second clutch C2, and selectively fixed to the casing 12 through the first brake B1. The second carrier CA2 of the second planetary gear set 26 and the third ring gear R3 of the third planetary gear set 28 are integrally fixed to each other and fixed to the output shaft 22. The second ring gear R2 is selectively connected to the power transmitting member 18 through the first clutch C1, and the third carrier CA3 is selectively fixed to the casing 12 through the second brake B2.

In the transmission mechanism 70 constructed as described above, one of a first gear position (first speed position) through a fourth gear position (fourth speed position), a reverse gear position (rear-drive position) and a neural position is selectively established by engaging actions of a corresponding combination of the frictional coupling devices selected from the above-described switching clutch C0, first clutch C1, second clutch C2, switching brake B0, first brake B1 and second brake B2, as indicated in the table of FIG. 18. Those gear positions have respective speed ratios γ (input shaft speed $N_{IN}$/output shaft speed $N_{OUT}$) which change as geometric series. In particular, it is noted that the power distributing mechanism 16 provided with the switching clutch C0 and brake B0 can be selectively placed by engagement of the switching clutch C0 or switching brake B0, in the fixed-speed-ratio shifting state in which the mechanism 16 is operable as a transmission having fixed speed ratio or ratios, as well as in the continuously-variable shifting state in which the mechanism 16 is operable as the continuously variable transmission described above. In the present transmission mechanism 70, therefore, a step-variable transmission is constituted by the transmission portion 20, and the differential portion 11 which is placed in the fixed-speed-ratio shifting state by engagement of the switching clutch C0 or switching brake B0. Further, a continuously variable transmission is constituted by the transmission portion 20, and the differential portion 11 which is placed in the continuously-variable shifting state, with none of the switching clutch C0 and brake B0 being engaged. In other words, the transmission mechanism 70 is switched to the step-variable shifting state, by engaging one of the switching clutch C0 and switching brake B0, and to the continuously-variable shifting state by releasing both of the switching clutch C0 and switching brake B0.

Where the transmission mechanism 70 functions as the step-variable transmission, for example, the first gear position having the highest speed ratio γ1 of about 2.804, for example, is established by engaging actions of the switching clutch C0, first clutch C1 and second brake B2, and the second gear position having the speed ratio γ2 of about 1.531, for example, which is lower than the speed ratio γ1, is established by engaging actions of the switching clutch C0, first clutch C1 and first brake B1, as indicated in FIG. 18. Further, the third gear position having the speed ratio γ3 of about 1.000, for example, which is lower than the speed ratio γ2, is established by engaging actions of the switching clutch C0, first clutch C1 and second clutch C2, and the fourth gear position having the speed ratio γ4 of about 0.705, for example, which is lower than the speed ratio γ3, is established by engaging actions of the first clutch C1, second clutch C2, and switching brake B0. Further, the reverse gear position having the speed ratio γR of about 2.393, for example, which is intermediate between the speed ratios γ1 and γ2, is established by engaging actions of the second clutch C2 and the second brake B2. The neutral position N is established by engaging only the switching clutch C0.

When the transmission mechanism 70 functions as the continuously-variable transmission, on the other hand, the switching clutch C0 and the switching brake B0 are both released, as indicated in FIG. 18, so that the differential portion 11 functions as the continuously variable transmission, while the automatic transmission portion 72 connected in series to the differential portion 11 functions as the step-variable transmission, whereby the speed of the rotary motion transmitted to the automatic transmission portion 72 placed in one of the first through third gear positions, namely, the rotating speed of the power transmitting member 18 is continuously changed, so that the speed ratio of the transmission mechanism 10 when the automatic transmission portion 72 is placed in one of those gear positions is continuously variable over a predetermined range. Accordingly, the total speed ratio of the automatic transmission portion 72 is continuously variable across the adjacent gear positions, whereby the overall speed ratio γT of the transmission mechanism 70 a whole is continuously variable.

The collinear chart of FIG. 19 indicates, by straight lines, a relationship among the rotating speeds of the rotary elements in each of the gear positions of the transmission mechanism 70, which is constituted by the differential portion 11 functioning as the continuously-variable shifting portion or first shifting portion, and the automatic transmission portion 72 functioning as the step-variable shifting portion or second shifting portion. The rotating speeds of the individual elements of the power distributing mechanism 16 when the switching clutch C0 and brake B0 are both released, and the rotating speeds of those elements when the switching clutch C0 or brake B0 is engaged, are the same as in the preceding embodiment.

In FIG. 19, four vertical lines Y4, Y5, Y6 and Y7 corresponding to the automatic transmission portion 72 and arranged in the rightward direction respectively represent the relative rotating speeds of a fourth rotary element (fourth element) RE4 in the form of the second and third sun gears S2, S3 integrally fixed to each other, a fifth rotary element (fifth element) RE5 in the form of the third carrier CA3, a sixth rotary element (sixth element) RE6 in the form of the second carrier CA2 and third ring gear R3 that are integrally fixed to each other, and a seventh rotary element (seventh element) RE7 in the form of the second ring gear R2. In the automatic transmission portion 72, the fourth rotary element RE4 is selectively connected to the power transmitting member 18 through the second clutch C2, and is selectively fixed to the casing 12 through the first brake B1, and the fifth rotary element RE5 is selectively fixed to the casing 12 through the second brake B2. The sixth rotary element RE6 is fixed to the output shaft 22 of the automatic transmission portion 72, and the seventh rotary element RE7 is selectively connected to the power transmitting member 18 through the first clutch C1.

When the first clutch C1 and the second brake B2 are engaged, the automatic transmission portion 72 is placed in the first gear position. The rotating speed of the output shaft 22 in the first gear position is represented by a point of intersection between the vertical line Y6 indicative of the rotating speed of the sixth rotary element RE6 fixed to the output shaft 22 and an inclined straight line L1 which passes a point of intersection between the vertical line Y7 indicative of the rotating speed of the seventh rotary element RE7 (R2) and the horizontal line X2, and a point of intersection between the vertical line Y5 indicative of the rotating speed of the fifth rotary element RE5 (CA3) and the horizontal line X1, as indicated in FIG. 19. Similarly, the rotating speed of the output shaft 22 in the second gear position established by the engaging actions of the first clutch C1 and first brake B1 is represented by a point of intersection between an inclined straight line L2 determined by those engaging actions and the vertical line Y6 indicative of the rotating speed of the sixth rotary element RE6 (CA2, R3) fixed to the output shaft 22. The rotating speed of the output shaft 22 in the third speed position established by the engaging actions of the first clutch C1 and second clutch C2 is represented by a point of intersection between an inclined straight line L3 determined by those engaging actions and the vertical line Y6 indicative of the rotating speed of the sixth rotary element RE6 fixed to the output shaft 22. In the first through third gear positions in which the switching clutch C0 is placed in the engaged state, the seventh rotary element RE7 is rotated at the same speed as the engine speed $N_E$, with the drive force received from the differential portion 11. When the switching clutch B0 is engaged in place of the switching clutch C0, the sixth rotary element RE6 is rotated at a speed higher than the engine speed $N_E$, with the drive force received from the differential portion 11. The rotating speed of the output shaft 22 in the fourth gear position established by the engaging actions of the first clutch C1, second clutch C2 and switching brake B0 is represented by a point of intersection between a horizontal line L4 determined by those engaging actions and the vertical line Y6 indicative of the rotating speed of the sixth rotary element RE6 fixed to the output shaft 22.

The transmission mechanism 70 according to the present embodiment is also constituted by the differential portion 11 functioning as the continuously-variable shifting portion or first shifting portion, and the automatic transmission portion 72 functioning as the transmission portion (step-variable transmission portion) or second shifting portion, so that the present transmission mechanism 70 has advantages similar to those of the first embodiment.

Embodiment 3

Figure 20:
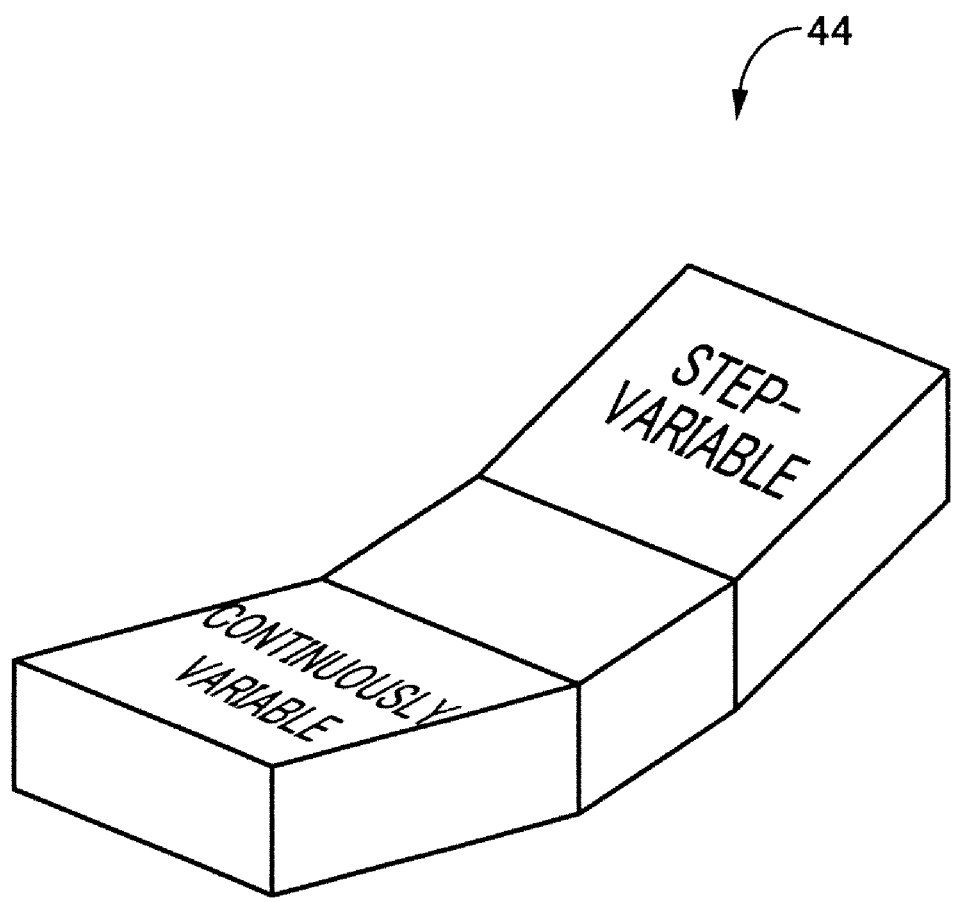
FIG. 20 is a perspective view showing an example of a manually operable shifting-state selecting device in the form of a seesaw switch operated by a user to select the shifting state.

FIG. 20 shows an example of a seesaw switch 44 (hereinafter referred to as "switch 44") functioning as a shifting-state selecting device manually operable to select the differential state (non-locked state) and or non-differential state (locked state) of the power distributing mechanism 16, that is, to select the continuously-variable shifting state or step-variable shifting state of the transmission mechanism 10. This switch 44 permits the user to select the desired shifting state during running of the vehicle. The switch 44 has a continuously-variable-shifting running button labeled "STEP-VARIABLE" for running of the vehicle in the continuously-variable shifting state, and a step-variable-shifting running button labeled "CONTINUOUSLY-VARIABLE" for running of the vehicle in the step-variable shifting state, as shown in FIG. 20. When the continuously-variable-shifting running button is depressed by the user, the switch 44 is placed in a continuously-variable shifting position for selecting the continuously-variable shifting state in which the transmission mechanism 10 is operable as the electrically controlled continuously variable transmission. When the step-variable-shifting running button is depressed by the user, the switch 44 is placed in a step-variable shifting position for selecting in the step-variable shifting state in which the transmission mechanism is operable as the step-variable transmission.

In the preceding embodiments, the shifting state of the transmission mechanism 10 is automatically switched on the basis of the vehicle condition and according to the switching boundary line map shown in FIG. 6 by way of example. However, the shifting state of the transmission mechanism 10 may be switched by a manual operation of the switch 44, in place of or in addition to the automatic switching operation. Namely, the switching control means 50 may be arranged to selectively place the transmission mechanism 10 in the continuously-variable shifting state or the step-variable shifting state, depending upon whether the switch 44 is placed in its continuously-variable shifting position or step-variable shifting position. For instance, the user manually operates the switch 44 to place the transmission mechanism 10 in the continuously-variable shifting state when the user likes the transmission mechanism 10 to operate as a continuously variable transmission or wants to improve the fuel economy of the engine, or alternatively in the step-variable shifting state when the user likes a rhythmical change of the engine speed as a result of a shifting action of the step-variable transmission.

The switch 44 may have a neutral position in which none of the continuously-variable and step-variable shifting states are selected. In this case, the switch 44 may be placed in its neutral position when the user has not selected the desired shifting state or likes the transmission mechanism 10 to be automatically placed in one of the continuously-variable and step-variable shifting states.

Where the shifting state of the transmission mechanism 10 is not automatically selected, but is manually selected by a manual operation of the switch 44, step S2 in the flow chart of FIG. 11 is formulated such that the determination as to whether the power distributing mechanism 16 is placed in the differential state, that is, whether the differential portion 11 is placed in the continuously-variable shifting state, is effected depending upon whether the switch 44 has been operated to select the differential state of the power distributing mechanism 16 or the continuously-variable shifting state of the transmission mechanism 10.

While the preferred embodiments of this invention have been described in detail by reference to the accompanying drawings, it is to be understood that the present invention may be otherwise embodied.

In the illustrated embodiments, the transmission mechanism 10, 70 is switchable between its continuously-variable shifting state and the step-variable shifting states by placing the differential portion 11 (power distributing mechanism 16) selectively in one of its differential state in which the differential portion 11 is operable as the electrically controlled continuously variable transmission, and the non-differential state (locked state) in which the differential portion 11 is not operable as the electrically controlled continuously variable transmission. However, the differential portion 11 placed in its differential state can be operable as the step-variable transmission the speed ratio of which is variable in steps rather than continuously. In other words, the differential and non-differential states of the differential portion 11 do not respectively correspond to the continuously-variable and step-variable shifting states of the transmission mechanism 10, 70, and therefore the differential portion 11 need not be switchable between the continuously-variable and step-variable shifting states. The principle of this invention is applicable to any transmission mechanism which is switchable between the differential and non-differential states, or wherein the differential portion 11 (power distributing mechanism 16) is switchable between the differential and non-differential states.

The present embodiment is arranged such that the speed ratio of the differential portion 11 is controlled so as to hold the engine speed $N_E$ substantially constant, that is, so as to prevent a change of the overall speed ratio γT of the transmission mechanism 10, during the shifting action of the automatic transmission portion 20, as illustrated in the time charts of FIGS. 12 and 13. However, the speed ratio of the differential portion 11 need not be controlled so as to hold the engine speed $N_E$ substantially constant, but may be controlled so as to reduce the amount of stepping change of the engine speed $N_E$, for permitting a continuous change of the engine speed $N_E$. Some advantage of the present invention is obtained according to this modification.

In the embodiments described above, the differential-state determining means 80 (step S2 of FIG. 11) is arranged to determine whether the power distributing mechanism 16 is placed in the differential state or not, by determining whether the vehicle condition is in the continuously-variable shifting region defined by the switching map shown in FIG. 6 by way of example. However, the determination as to whether the power distributing mechanism 16 is placed in the differential state may be made on the basis of a determination by the switching control means 50 as to whether the transmission mechanism 10 is in the step-variable shifting region or in the continuously-variable shifting region.

In the power distributing mechanism 16 in the illustrated embodiments, the first carrier CA1 is fixed to the engine 8, and the first sun gear S1 is fixed to the first electric motor M1 while the first ring gear R1 is fixed to the power transmitting member 18. However, this arrangement is not essential. The engine 8, first electric motor M1 and power transmitting member 18 may be fixed to any other elements selected from the three elements CA1, S1 and R1 of the first planetary gear set 24.

While the engine 8 is directly fixed to the input shaft 14 in the illustrated embodiments, the engine 8 may be operatively connected to the input shaft 14 through any suitable member such as gears and a belt, and need not be disposed coaxially with the input shaft 14.

In the illustrated embodiments, the first electric motor M1 and the second electric motor M2 are disposed coaxially with the input shaft 14, and are fixed to the first sun gear S1 and the power transmitting member 18, respectively. However, this arrangement is not essential. For example, the first and second electric motors M1, M2 may be operatively connected to the first sun gear S1 and the power transmitting member 18 or output shaft 20, respectively, through gears or belts.

Although the power distributing mechanism 16 in the illustrated embodiments is provided with the switching clutch C0 and the switching brake B0, the power distributing mechanism 16 need not be provided with both of the switching clutch C0 and brake B0. While the switching clutch C0 is provided to selectively connect the first sun gear S1 and the first carrier CA1 to each other, the switching clutch C0 may be provided to selectively connect the first sun gear S1 and the first ring gear R1 to each other, or selectively connect the first carrier CA1 and the first ring gear R1. Namely, the switching clutch C0 may be arranged to connect any two elements of the three elements of the first planetary gear set 24.

While the switching clutch C0 is engaged to establish the neutral position N in the transmission mechanism 10, 70 in the illustrated embodiments, the switching clutch C0 need not be engaged to establish the neutral position.

The hydraulically operated frictional coupling devices used as the switching clutch C0, switching brake B0, etc. in the illustrated embodiments may be replaced by a coupling device of a magnetic-power type, an electromagnetic type or a mechanical type, such as a powder clutch (magnetic powder clutch), an electromagnetic clutch and a meshing type dog clutch.

While the second electric motor M2 is connected to the power transmitting member 18 or the output shaft 22 in the illustrated embodiments, the second electric motor M2 may be connected to a rotary member of the automatic transmission portion 20, 70.

In the illustrated embodiments, the automatic transmission portion 20, 72 is disposed in the power transmitting path between the drive wheels 38, and the power transmitting member 18 which is the output member of the differential portion 11 or power distributing mechanism 16. However, the automatic transmission portion 20, 72 may be replaced by any other type of power transmitting device such: an automatic transmission in the form of a continuously variable transmission (CVT); an automatic transmission which is a permanent-mesh parallel-two-axes type transmission well known as a manual transmission and which is automatically shifted by select cylinders and shift cylinders; and a manual transmission of synchronous meshing type which is manually shifted. Where the step-variable transmission portion is replaced by the continuously variable transmission (CVT), the transmission mechanism as a whole is placed in the step-variable shifting state when the power distributing mechanism 16 is placed in its fixed-speed-ratio shifting state. In the step-variable shifting state, the drive force is transmitted primarily through a mechanical power transmitting path, and not through an electric path. The above-indicated continuously variable transmission may be controlled to change its speed ratio to a selected one of a plurality of fixed values which correspond to respective gear position of a step-variable transmission and which are stored in a memory, so that the speed ratio of the transmission mechanism can be changed in steps.

While the automatic transmission portion 20, 72 in the preceding embodiments is connected in series to the differential portion 11 through the power transmitting member 18, the automatic transmission portion 20, 72 may be mounted on and disposed coaxially with a counter shaft which is parallel to the input shaft 14. In this case, the differential portion 11 and the automatic transmission portion 20, 72 are operatively connected to each other through a suitable power transmitting device or a set of two power transmitting members such as a pair of counter gears, and a combination of a sprocket wheel and a chain.

The power distributing mechanism 16 provided as a differential mechanism in the preceding embodiments may be replaced by a differential gear device including a pinion rotated by the engine, and a pair of bevel gears which are respectively operatively connected to the first and second electric motors M1, M2.

While the power distributing mechanism 16 in the illustrated embodiments is constituted by one planetary gear set 24, it may be constituted by two or more planetary gear sets so that the power distributing mechanism 16 is operable as a transmission having three or more gear positions in the non-differential state (fixed-speed-ratio shifting state).

The shifting device 90 in the illustrated embodiments is provided with the shift lever 92 for selecting a plurality of shift positions. However, the shift lever 92 may be replaced by a pushbutton switch, a slide type switch or any other switch for selecting a plurality of shift positions, a device operable to select a plurality of shift positions in response to a voice of the vehicle operator rather than a manual operation of the vehicle operator, or a device operable to select a plurality of shift positions in response to a foot operation of the vehicle operator. When the shift lever 92 is placed in the position M, the number of the selectable gear positions can be selected. However, the highest gear position selectable can be selected by the shift lever 92 placed in the position M. In this case, the step-variable transmission 20, 72 is shifted when the highest gear position selectable is changed. When the shift lever 92 is manually operated from the position M to the shift-up position "+" or the shift-down position "−", the step-variable transmission 20 is shiftable to any one of the first through fourth gear positions.

While the switch 44 is of a seesaw type switch in the preceding embodiments, the seesaw switch 44 may be replaced by a single pushbutton switch, two pushbutton switches that are selectively pressed into operated positions, a lever type switch, a slide-type switch or any other type of switch or switching device that is operable to select a desired one of the continuously-variable shifting state (differential state) and the step-variable shifting state (non-differential state). The seesaw switch 44 may or may not have a neutral position. Where the seesaw switch 44 does not have the neutral position, an additional switch may be provided to enable and disable the seesaw switch 44. The function of this additional switch corresponds to the neutral position of the seesaw switch 44. The seesaw switch 44 may be replaced by a switching device operable by a voice generated by the vehicle operator or a foot of the vehicle operator, rather than by hand, to select one of the continuously-variable shifting state (differential state) and the step-variable shifting state (non-differential state).

It is to be understood that the embodiments of the invention have been descried for illustrative purpose only, and that the present invention may be embodied with various changes and modifications which may occur to those skilled in the art.

The invention claimed is:

1. A control apparatus for a vehicular drive system provided with a transmission mechanism constituted by a continuously-variable transmission portion operable as an electrically controlled continuously variable transmission, and a transmission portion, said continuously-variable transmission portion having a differential mechanism operable to distribute an output of an engine to a first electric motor and a power transmitting member, and a second electric motor disposed in a power transmitting path between the power transmitting member and a drive wheel of a vehicle, said transmission portion constituting a part of said power transmitting path, said control apparatus comprising:
    a differential-state switching device provided in said differential mechanism and operable to place said continuously-variable transmission portion in a selected one of a continuously-variable shifting state in which said continuously-variable transmission portion is operable as said electrically controlled continuously variable transmission portion, and a non-continuously-variable shifting state in which the continuously-variable transmission portion is not operable as the electrically controlled continuously variable transmission; and
    shifting control means for changing a manner of controlling a shifting action of said transmission mechanism during a shifting action of said transmission portion, depending upon whether the differential-state switching device places said continuously-variable transmission portion in said continuously-variable shifting state or in said non-continuously-variable shifting state,
    wherein said shifting control means positively changes a speed of said engine during the shifting action of said transmission portion, in said non-continuously-variable shifting state of said continuously-variable transmission portion, by using said first electric motor and/or said second electric motor.

2. The control apparatus according to claim 1, wherein said shifting control means controls a shifting action of said continuously-variable transmission portion in an inertia phase of the shifting action of said transmission portion in said continuously-variable shifting state of said continuously-variable transmission portion, so as to reduce an amount of change of the speed of said engine through an operation of said continuously-variable transmission portion as the electrically controlled continuously variable transmission.

3. The control apparatus according to claim 2, wherein said shifting control means changes a speed ratio of said continuously-variable transmission portion in a direction opposite to a direction of change of a speed ratio of said transmission portion, so as to reduce the amount of change of the speed of the engine.

4. The control apparatus according to claim 1, wherein said shifting control means reduces a racing rise of the speed of said engine due to the shifting action of said transmission portion, in said continuously-variable shifting state of said continuously-variable transmission portion, by using said first electric motor and/or said second electric motor.

5. The control apparatus according to claim 1, wherein said transmission portion is an automatic transmission a speed ratio of which is automatically changed by an engaging action of a frictional coupling device and a releasing action of another frictional coupling device,
    and wherein said shifting control means controls an engaging pressure of the frictional coupling device in its engaging action during the shifting action of said transmission portion such that the engaging pressure is higher when said continuously-variable transmission portion is placed in said non-continuously-variable shifting state than when the continuously-variable transmission portion is placed in said continuously-variable shifting state.

6. The control apparatus according to claim 1, further comprising torque-reduction control means for reducing a torque to be transmitted to said drive wheel, and wherein said torque-reduction control means reduces the torque to be transmitted to said drive wheels during the shifting action of said transmission portion.

7. The control apparatus according to claim 1, wherein said transmission portion is a step-variable automatic transmission.

8. The control apparatus according to claim 1, wherein said differential-state switching device places said continuously-variable transmission portion in the selected one of the continuously-variable shifting state and the non-continuously-variable shifting state, on the basis of a required output torque of said transmission portion.

9. The control apparatus according to claim 1, wherein said differential-state switching device places said continuously-variable transmission portion in the selected one of the continuously-variable shifting state and the non-continuously-variable shifting state, on the basis of a running speed of the vehicle.

10. The control apparatus according to claim 1, wherein said differential-state switching device places said continuously-variable transmission portion in the selected one of the continuously-variable shifting state and the non-continuously-variable shifting state, on the basis of a torque of said engine.

11. The control apparatus according to claim 1, wherein said differential-state switching device places said continuously-variable transmission portion in the selected one of the continuously-variable shifting state and the non-continuously-variable shifting state, on the basis of an operating speed of said engine.

12. A control apparatus for a vehicular drive system provided with a transmission mechanism constituted by a differential portion operable as an electrically controlled continuously variable transmission, and a transmission portion, said differential portion having a differential mechanism operable to distribute an output of an engine to a first electric motor and a power transmitting member, and a second electric motor disposed in a power transmitting path between the power transmitting member and a drive wheel of a vehicle, said transmission portion constituting a part of said power transmitting path, said control apparatus comprising:
    a differential-state switching device provided in said differential mechanism and operable to place said differential portion in a selected one of a continuously-variable shifting state in which said differential portion is operable as said electrically controlled differential portion, and a non-continuously-variable shifting state in which the differential portion is not operable as the electrically controlled continuously variable transmission; and
    shifting control means for changing a manner of controlling a shifting action of said transmission mechanism during a shifting action of said transmission portion, depending upon whether the differential-state switching device places said differential portion in said continuously-variable shifting state or in said non-continuously-variable shifting stat;
    wherein said shifting control means positively changes a speed of said engine during the shifting action of said transmission portion, in said non-continuously-variable shifting state of said differential portion, by using said first electric motor and/or said second electric motor.

13. The control apparatus according to claim 12, wherein said shifting control means controls a shifting action of said differential portion in an inertia phase of the shifting action of said transmission portion in said continuously-variable shifting state of said differential portion, so as to reduce an amount of change of the speed of said engine through an operation of said differential portion as the electrically controlled continuously variable transmission.

14. The control apparatus according to claim 13, wherein said shifting control means changes a speed ratio of said differential portion in a direction opposite to a direction of change of a speed ratio of said transmission portion, so as to reduce the amount of change of the speed of the engine.

15. The control apparatus according to claim 12, wherein said shifting control means reduces a racing rise of the speed of said engine due to the shifting action of said transmission portion, in said continuously-variable shifting state of said differential portion, by using said first electric motor and/or said second electric motor.

16. The control apparatus according to claim 12, wherein said transmission portion is an automatic transmission a speed ratio of which is automatically changed by an engaging action of a frictional coupling device and a releasing action of another frictional coupling device,
and wherein said shifting control means controls an engaging pressure of the frictional coupling device in its engaging action during the shifting action of said transmission portion such that the engaging pressure is higher when said differential portion is placed in said non-continuously-variable shifting state than when the differential portion is placed in said continuously-variable shifting state.

17. The control apparatus according to claim 12, wherein said differential-state switching device places said continuously-variable transmission portion in the selected one of the continuously-variable shifting state and the non-continuously-variable shifting state, on the basis of a required output torque of said transmission portion.

18. The control apparatus according to claim 12, wherein said differential-state switching device places said continuously-variable transmission portion in the selected one of the continuously-variable shifting state and the non-continuously-variable shifting state, on the basis of a running speed of the vehicle.

19. The control apparatus according to claim 12, wherein said differential-state switching device places said continuously-variable transmission portion in the selected one of the continuously-variable shifting state and the non-continuously-variable shifting state, on the basis of a torque of said engine.

20. The control apparatus according to claim 12, wherein said differential-state switching device places said continuously-variable transmission portion in the selected one of the continuously-variable shifting state and the non-continuously-variable shifting state, on the basis of an operating speed of said engine.

* * * * *